(12) United States Patent
Huang et al.

(10) Patent No.: US 11,803,062 B1
(45) Date of Patent: Oct. 31, 2023

(54) OPTICAL SYSTEM AND HEAD-MOUNTED DEVICE

(71) Applicant: LARGAN INDUSTRIAL OPTICS CO., LTD., Taichung (TW)

(72) Inventors: Jih Chung Huang, Taichung (TW); Yu Jie Hong, Taichung (TW)

(73) Assignee: LARGAN INDUSTRIAL OPTICS CO., LTD., Taichung (TW)

( * ) Notice: Subject to any disclaimer, the term of this patent is extended or adjusted under 35 U.S.C. 154(b) by 0 days.

(21) Appl. No.: 17/952,178

(22) Filed: Sep. 23, 2022

(30) Foreign Application Priority Data

Aug. 19, 2022 (TW) .................................. 111131220

(51) Int. Cl.
*G02B 27/01* (2006.01)
*G02B 9/12* (2006.01)
*G02B 27/28* (2006.01)

(52) U.S. Cl.
CPC ........... *G02B 27/0172* (2013.01); *G02B 9/12* (2013.01); *G02B 27/28* (2013.01)

(58) Field of Classification Search
None
See application file for complete search history.

(56) References Cited

U.S. PATENT DOCUMENTS

| | | |
|---|---|---|
| 3,443,858 A | 5/1969 | Russa |
| 9,555,589 B1 | 1/2017 | Ambur |
| 9,557,568 B1 | 1/2017 | Ouderkirk |
| 9,581,744 B1 | 2/2017 | Yun |
| 9,581,827 B1 | 2/2017 | Wong |
| 9,599,761 B1 | 3/2017 | Ambur |
| 9,715,114 B2 | 7/2017 | Yun |
| 9,829,616 B2 | 11/2017 | Yun |
| 9,835,777 B2 | 12/2017 | Ouderkirk |
| 9,945,998 B2 | 4/2018 | Ouderkirk |
| 9,945,999 B2 | 4/2018 | Wong |
| 9,952,371 B2 | 4/2018 | Ambur |
| 9,995,939 B2 | 6/2018 | Yun |
| 10,007,035 B2 | 6/2018 | Ouderkirk |
| 10,007,043 B2 | 6/2018 | Ambur |

(Continued)

FOREIGN PATENT DOCUMENTS

| | | |
|---|---|---|
| CN | 112596238 A | 4/2021 |
| CN | 113219666 A | 8/2021 |

(Continued)

*Primary Examiner* — Nicholas J Lee
(74) *Attorney, Agent, or Firm* — Maschoff Brennan

(57) ABSTRACT

An optical system includes an aperture stop, an image display surface, a reflective polarizer, a partial reflector, first and second quarter-wave plates, and first, second and third optical lens elements. The aperture stop and the image display surface are respectively at front side and rear side of the optical system. The reflective polarizer is between the aperture stop and the image display surface. The partial reflector is between the reflective polarizer and the image display surface. The first quarter-wave plate is between the reflective polarizer and the partial reflector. The second quarter-wave plate is between the partial reflector and the image display surface. The first, second and third optical lens elements are between the aperture stop and the image display surface in order from the front side to the rear side. The first optical lens element has negative refractive power. The second optical lens element has planar front-side surface.

28 Claims, 18 Drawing Sheets

(56) References Cited

U.S. PATENT DOCUMENTS

| | | |
|---|---|---|
| 10,078,164 B2 | 9/2018 | Yun |
| 10,185,148 B2 | 1/2019 | Li |
| 10,203,489 B2 | 2/2019 | Khan |
| 10,302,950 B2 | 5/2019 | Ouderkirk |
| 10,324,292 B2 | 6/2019 | Li |
| 10,330,930 B2 | 6/2019 | Wong |
| 10,338,380 B2 | 7/2019 | Yun |
| 10,338,393 B2 | 7/2019 | Yun |
| 10,394,040 B2 | 8/2019 | Gollier |
| 10,444,496 B2 | 10/2019 | Ambur |
| 10,564,427 B2 | 2/2020 | Ouderkirk |
| 10,663,727 B2 | 5/2020 | Ouderkirk |
| 10,670,867 B2 | 6/2020 | Yun |
| 10,678,052 B2 | 6/2020 | Ouderkirk |
| 10,747,002 B2 | 8/2020 | Yun |
| 10,747,003 B2 | 8/2020 | Ouderkirk |
| 10,754,159 B2 | 8/2020 | Ouderkirk |
| 10,838,208 B2 | 11/2020 | Ouderkirk |
| 10,921,594 B2 | 2/2021 | Ambur |
| 11,156,814 B2 | 10/2021 | Steiner |
| 2019/0265465 A1 | 8/2019 | Wong |
| 2019/0265466 A1 | 8/2019 | Wong |
| 2020/0096780 A1 | 3/2020 | Ouderkirk |
| 2020/0124856 A1 | 4/2020 | Ouderkirk |
| 2020/0241305 A1 | 7/2020 | Ouderkirk |
| 2020/0348527 A1 | 11/2020 | Jamali |
| 2021/0003901 A1 | 1/2021 | Yaroshchuk |

FOREIGN PATENT DOCUMENTS

| | | |
|---|---|---|
| CN | 114236863 A | 3/2022 |
| TW | 201835639 A | 10/2018 |
| TW | 202045982 A | 12/2020 |

OPTICAL SYSTEM AND HEAD-MOUNTED DEVICE

RELATED APPLICATIONS

This application claims priority to Taiwan Application 111131220, filed on Aug. 19, 2022, which is incorporated by reference herein in its entirety.

BACKGROUND

Technical Field

The present disclosure relates to an optical system and a head-mounted device, more particularly to an optical system applicable to a head-mounted device.

Description of Related Art

With the advancement of semiconductor manufacturing technology, electronic components have been miniaturized and the performance of miniature electronic components has been improved, and image sensors for having more pixels has been scaled down. Therefore, featuring high image quality becomes one of the indispensable features of a miniature optical system nowadays. Furthermore, due to the popularization of high-performance microprocessors and microdisplays, the technology related to smart head-mounted devices rapidly develops in recent years. With the rise of artificial intelligence, electronic devices equipped with optical systems are trending towards multi-functionality for various applications, and the functional requirements for computer vision have been increasing.

The head-mounted devices have become smaller and more lightweight, and also have various intelligent applications such as virtual reality (VR), augmented reality (AR) and mixed reality (MR) in the rapidly developing technology landscape. VR has been widely applied in medical health areas and engineering, real estate, education, video game and entertainment industries. However, the head-mounted devices are still in the developing stage, and there are still many areas that need to be improved, such as the weight and size of the head-mounted devices and the quality of images. In the early stages, the VR head-mounted devices usually use conventional optical lenses or Fresnel lenses. Conventional optical lenses may provide good image quality, but it is hard to effectively reduce the device size. On the other hand, the use of Fresnel lenses may reduce the device size, but the image quality may be poor. Therefore, researchers and developers are looking for lens combinations that are small in size and provide high image quality.

SUMMARY

According to one aspect of the present disclosure, an optical system includes an aperture stop, an image display surface, a reflective polarizer, a partial reflector, a first quarter-wave plate, a second quarter-wave plate, a first optical lens element, a second optical lens element and a third optical lens element. The aperture stop is located at a front side of the optical system. The image display surface is located at a rear side of the optical system. The reflective polarizer is located between the aperture stop and the image display surface. The partial reflector is located between the reflective polarizer and the image display surface. The first quarter-wave plate is located between the reflective polarizer and the partial reflector. The second quarter-wave plate is located between the partial reflector and the image display surface. The first optical lens element is located between the aperture stop and the image display surface. The second optical lens element is located between the first optical lens element and the image display surface. The third optical lens element is located between the second optical lens element and the image display surface. In addition, the first optical lens element has negative refractive power, the third optical lens element has positive refractive power, and the second optical lens element has a front-side surface being planar. When a curvature radius of a front-side surface of the third optical lens element is R5, and a curvature radius of a rear-side surface of the third optical lens element is R6, the following condition is satisfied:

$$0.13 < R6/R5.$$

According to another aspect of the present disclosure, an optical system includes an aperture stop, an image display surface, a reflective polarizer, a partial reflector, a first quarter-wave plate, a second quarter-wave plate, a first optical lens element, a second optical lens element and a third optical lens element. The aperture stop is located at a front side of the optical system. The image display surface is located at a rear side of the optical system. The reflective polarizer is located between the aperture stop and the image display surface. The partial reflector is located between the reflective polarizer and the image display surface. The first quarter-wave plate is located between the reflective polarizer and the partial reflector. The second quarter-wave plate is located between the partial reflector and the image display surface. The first optical lens element is located between the aperture stop and the image display surface. The second optical lens element is located between the first optical lens element and the image display surface. The third optical lens element is located between the second optical lens element and the image display surface. In addition, the first optical lens element has negative refractive power, and the second optical lens element has a front-side surface being planar.

When a curvature radius of a front-side surface of the first optical lens element is R1, and a curvature radius of a rear-side surface of the first optical lens element is R2, the following condition is satisfied:

$$|R2/R1| < 1000.$$

According to another aspect of the present disclosure, a head-mounted device includes one of the aforementioned optical systems.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
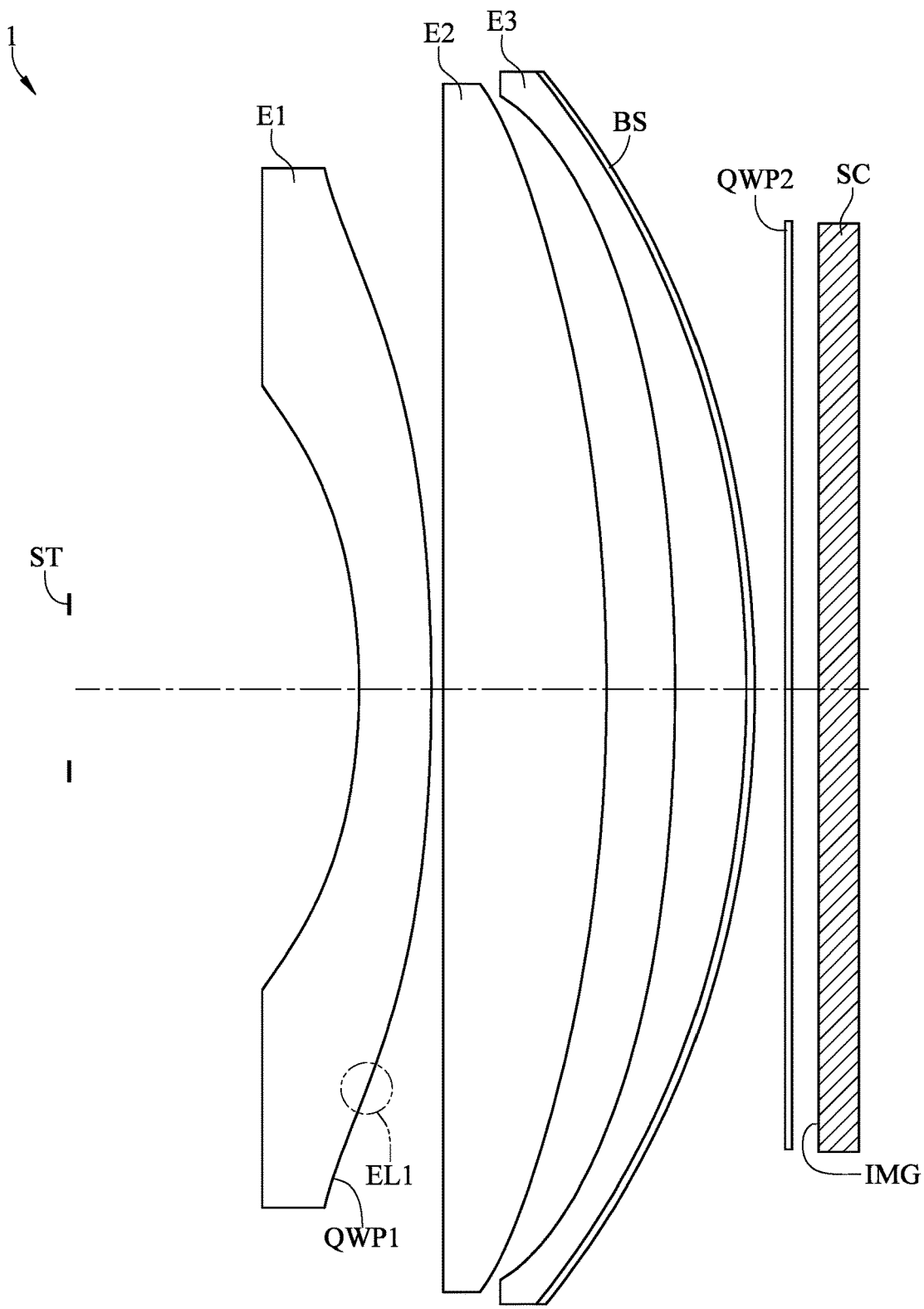
FIG. 1 is a schematic view of an optical system and a display unit according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an optical system. The optical system preferably includes an aperture stop, an image display surface, a reflective polarizer, a partial reflector, a first quarter-wave plate, a second quarter-wave plate, a first optical lens element, a second optical lens element and a third optical lens element. The aperture stop is preferably located at a front side of the optical system, and the image display surface is preferably located at a rear side of the optical system. Said front side of the optical system refers to one side of the optical system located relatively close to, for example, a viewer's eye, and said rear side of the optical system refers to one side of the optical system located relatively close to a display unit which displays images. In addition, the image display surface can be located at the display unit, and the aperture stop can be located at a position close to the viewer's eye.

The reflective polarizer is preferably located between the aperture stop and the image display surface. The partial reflector is preferably located between the reflective polarizer and the image display surface. The first quarter-wave plate is preferably located between the reflective polarizer and the partial reflector. The second quarter-wave plate is preferably located between the partial reflector and the image display surface. The first optical lens element is preferably located between the aperture stop and the image display surface. The second optical lens element is preferably located between the first optical lens element and the image display surface. The third optical lens element is preferably located between the second optical lens element and the image display surface. The first optical lens element preferably has negative refractive power, and the second optical lens element preferably has a front-side surface being planar. There is preferably an air gap in a paraxial region between the first optical lens element and the second optical lens element. There is preferably an air gap in a paraxial region between the second optical lens element and the third optical lens element. The partial reflector preferably has an average light reflectivity of, for example, at least 35%. Said average light reflectivity may refer to an average of light reflectivities of the partial reflector for various wavelengths of light.

According to the present disclosure, by the arrangement of the wave plates, the reflective polarizer, the partial reflector and the lens elements, the polarization state of imaging light travelling in the optical system can be converted, and the imaging light can be reflected by components of the optical system, thereby forming a catadioptric optical system, so that the total track length of the optical system can be reduced and stray light can be eliminated so as to provide high image quality and reduce the size and weight of a head-mounted device having the optical system. In addition, the front-side surface of the second optical lens element being planar is favorable for the arrangement of optic components. The imaging light emitted from the image display surface sequentially preferably passes through the second quarter-wave plate, the partial reflector, the first quarter-wave plate and the reflective polarizer, such that the particular imaging light path is favorable for the accuracy of light polarization, reflection and refraction. In detail, please refer to FIG. 19, which shows the track of imaging light travelling in the optical system 1. At first, an imaging light in a vertical polarization state emitted by the display unit SC propagates into the optical system 1 from the image display surface IMG, then the imaging light passes through the second quarter-wave plate QWP2 and is converted into a circular polarization state, and then, the imaging light in the circular polarization state passes through the partial reflector BS and the first quarter-wave plate QWP1 and is converted into a horizontal polarization state. The reflective polarizer RP only allows imaging light in a vertical polarization state to pass, so the imaging light in the horizontal polarization state is reflected by the reflective polarizer RP and passes through the first quarter-wave plate QWP1 again and is converted into a circular polarization state. Then, the imaging light in the circular polarization state is reflected by the partial reflector BS and passes through the first quarter-wave plate QWP1 for the third time and is converted into a vertical polarization state, and then, the imaging light in the vertical polarization state can pass through the reflective polarizer RP. Therefore, by such means of reflection, the required optical path can be folded, and thus, the total track length of lens assembly can be reduced. The first quarter-wave plate, the second quarter-wave plate and the partial reflector are preferably coated on (or attached to) the optical lens surfaces, respectively, or they may be individual components with respect to the optical lens elements, and the present disclosure is not limited thereto. The partial reflector is preferably, for example but not limited to, a mirror having a reflection surface configured to reflect a portion of light. For example, in some cases, the partial reflector is configured to allow a portion of light to pass therethrough and reflect the other portion of the light.

When a curvature radius of a front-side surface of the third optical lens element is R5, and a curvature radius of a rear-side surface of the third optical lens element is R6, the following condition is preferably satisfied: $0.13<R6/R5$. Therefore, it is favorable for improving the image quality. Moreover, the following condition is also preferably satisfied: $0.15<R6/R5$. Moreover, the following condition is also preferably satisfied: $0.25<R6/R5<1000$. Moreover, the following condition is also preferably satisfied: $0.50<R6/R5<500$. Moreover, the following condition is also preferably satisfied: $1.2<R6/R5$. Moreover, the following condition is also preferably satisfied: $1.5<R6/R5$. Moreover, the following condition is also preferably satisfied: $2.0<R6/R5<1000$.

The third optical lens element preferably has positive refractive power. Therefore, when the optical system satisfies the above conditions of R6/R5, the third optical lens element along with the first optical lens element having negative refractive power is favorable for further improving the image quality.

When a curvature radius of a front-side surface of the first optical lens element is R1, and a curvature radius of a rear-side surface of the first optical lens element is R2, the following condition is preferably satisfied: $|R2/R1|<1000$. Therefore, along with the first optical lens element having negative refractive power, it is favorable for improving the image quality. Moreover, the following condition is also preferably satisfied: $|R2/R1|<500$. Moreover, the following condition is also preferably satisfied: $|R2/R1|<100$. Moreover, the following condition is also preferably satisfied: $|R2/R1|<50$. Moreover, the following condition is also preferably satisfied: $|R2/R1|<10$.

Figure 19:
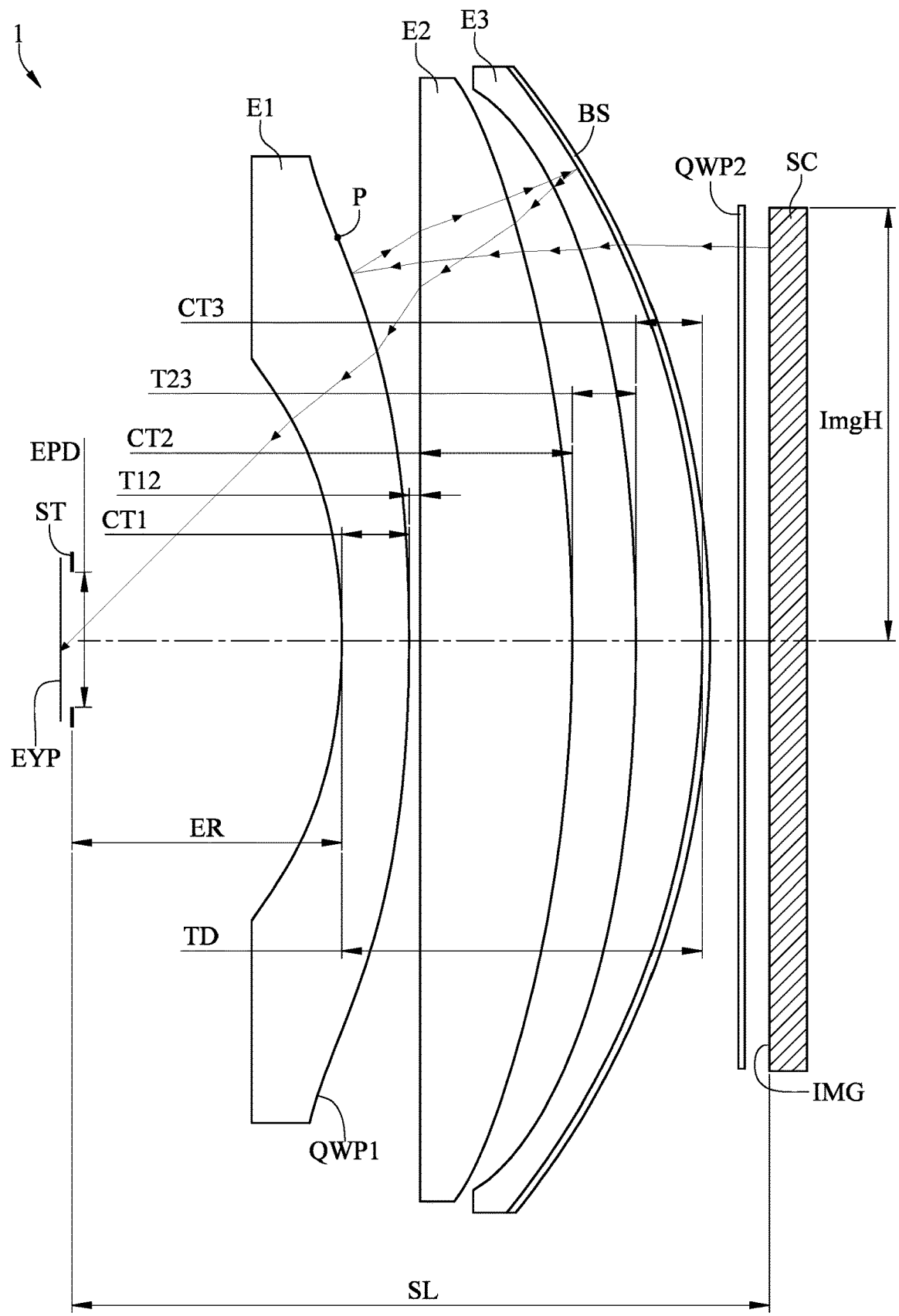
FIG. 19 shows a schematic view of ImgH, EPD, CT1, CT2, CT3, T12, T23, ER, TD, SL and one inflection point of a rear-side surface of a first optical lens element according to the 1st embodiment of the present disclosure.

At least one optical lens element of the optical system preferably has an inflection point. Therefore, it is favorable for correcting off-axis aberrations. The rear-side surface of the first optical lens element preferably has at least one inflection point. Therefore, it is favorable for further correcting off-axis aberrations. The rear-side surface of the third optical lens element preferably has at least one inflection point. Therefore, it is favorable for further correcting off-axis aberrations. Please refer to FIG. 19, which shows a schematic view of the inflection point P of the rear-side surface of the first optical lens element E1 according to the 1st embodiment of the present disclosure. The inflection point P of the rear-side surface of the first optical lens element E1 in FIG. 19 is only exemplary. Each of the optical lens elements in various embodiments of the present disclosure can have one or more inflection points.

When an Abbe number of the first optical lens element is V1, an Abbe number of the second optical lens element is V2, an Abbe number of the third optical lens element is V3, an Abbe number of the i-th optical lens element is Vi, a refractive index of the first optical lens element is N1, a refractive index of the second optical lens element is N2, a refractive index of the third optical lens element is N3, and a refractive index of the i-th optical lens element is Ni, at least one optical lens element of the optical system preferably satisfies the following condition: $10<Vi/Ni<50$, wherein $i=1$, 2 or 3. Therefore, it is favorable for preventing overly large differences in refractive indices caused by angle difference due to light reflections, thereby ensuring the image quality. Moreover, the following condition is also preferably satisfied: $12<Vi/Ni<45$, wherein $i=1$, 2 or 3. Moreover, the following condition is also preferably satisfied: $30<Vi/Ni<40$, wherein $i=1$, 2 or 3.

When a focal length of the optical system is f, and an image height on the image display surface (which can be half of a diagonal length of the display unit) is ImgH, the following condition is preferably satisfied: $1.00<f/ImgH<1.50$. Therefore, it is favorable for providing larger images. Moreover, the following condition is also preferably satisfied: $1.00<f/ImgH<1.25$. Moreover, the following condition is also preferably satisfied: $1.05<f/ImgH<1.25$. Please refer to FIG. 19, which shows a schematic view of ImgH according to the 1st embodiment of the present disclosure.

When an axial distance between the aperture stop and the image display surface is SL, and the image height on the image display surface is ImgH, the following condition is preferably satisfied: $1.2<SL/ImgH<2.0$. Therefore, it is favorable for balancing the image size and the length of the optical system. Moreover, the following condition is also preferably satisfied: $1.45<SL/ImgH<1.90$. Moreover, the following condition is also preferably satisfied: $1.50<SL/ImgH<1.80$. Moreover, the following condition is also preferably satisfied: $1.55<SL/ImgH<1.80$. Please refer to FIG. 19, which shows a schematic view of SL and ImgH according to the 1st embodiment of the present disclosure.

When the axial distance between the aperture stop and the image display surface is SL, and the focal length of the optical system is f, the following condition is preferably satisfied: $1.2<SL/f<2.0$. Therefore, it is favorable for balancing the image quality and the length of the optical system. Moreover, the following condition is also preferably satisfied: $1.25<SL/f<1.75$. Moreover, the following condition is also preferably satisfied: $1.30<SL/f<1.70$.

When an axial distance between the aperture stop and the front-side surface of the first optical lens element is ER, and the axial distance between the aperture stop and the image display surface is SL, the following condition is preferably satisfied: $0.30<ER/SL<0.50$. Therefore, it is favorable for reducing dizziness for users. Moreover, the following condition is also preferably satisfied: $0.35<ER/SL<0.45$. Please refer to FIG. 19, which shows a schematic view of ER and SL according to the 1st embodiment of the present disclosure.

When an axial distance between the front-side surface of the first optical lens element and the rear-side surface of the third optical lens element is TD, and the axial distance between the aperture stop and the image display surface is SL, the following condition is preferably satisfied: $0.40<TD/SL<0.60$. Therefore, it is favorable for reducing the length of lens assembly. Moreover, the following condition is also preferably satisfied: $0.42<TD/SL<0.58$. Moreover, the following condition is also preferably satisfied: $0.45<TD/SL<0.58$. Moreover, the following condition is also preferably satisfied: $0.45<TD/SL<0.55$. Moreover, the following condition is also preferably satisfied: $0.50<TD/SL<0.55$. Please refer to FIG. 19, which shows a schematic view of TD and SL according to the 1st embodiment of the present disclosure.

When a central thickness of the first optical lens element is CT1, a central thickness of the second optical lens element is CT2, a central thickness of the third optical lens element is CT3, an axial distance between a rear-side surface of the first optical lens element and the front-side surface of the second optical lens element is T12, and an axial distance between a rear-side surface of the second optical lens element and the front-side surface of the third optical lens element is T23, the following condition is preferably satisfied: $1<(CT1+CT2+CT3)/(T12+T23)<20$. Therefore, it is favorable for increasing lens element utilization. Moreover, the following condition is also preferably satisfied: $2<(CT1+CT2+CT3)/(T12+T23)<18$. Moreover, the following condition is also preferably satisfied: $2<(CT1+CT2+CT3)/(T12+T23)<15$. Moreover, the following condition is also preferably satisfied: $3<(CT1+CT2+CT3)/(T12+T23)<13$. Moreover, the following condition is also preferably satisfied: $3.5<(CT1+CT2+CT3)/(T12+T23)<13$. Please refer to FIG. 19, which shows a schematic view of CT1, CT2, CT3, T12 and T23 according to the 1st embodiment of the present disclosure.

When the central thickness of the first optical lens element is CT1, the central thickness of the second optical lens element is CT2, the central thickness of the third optical lens element is CT3, and the axial distance between the aperture stop and the image display surface is SL, the following condition is preferably satisfied: $0.20<(CT1+CT2+CT3)/SL<1.00$. Therefore, it is favorable for reducing the length of the optical system. Moreover, the following condition is also preferably satisfied: $0.30<(CT1+CT2+CT3)/SL<0.80$. Moreover, the following condition is also preferably satisfied: $0.35<(CT1+CT2+CT3)/SL<0.60$.

The present disclosure provides a head-mounted device. The head-mounted device preferably includes the aforementioned optical system. The head-mounted device preferably further includes a display unit, a digital signal processor, an inertial measurement unit and a support structure. The display unit is preferably configured to face a user's eye to display an image, the digital signal processor is in signal communication with the display unit and the inertial measurement unit, and the support structure is configured to be worn on the user's head. The optical system preferably corresponds to an eye of the user. In some configurations, the head-mounted device preferably includes two optical systems as described above, and the two optical systems respectively correspond to two eyes of the user.

The head-mounted device preferably further includes an iris recognition module in signal communication with the digital signal processor, and the iris recognition module is configured to recognize the user's iris. Therefore, it is favorable for providing convenient and safe account verification for the user.

The display unit is preferably an organic light emitting diode (OLED) panel and can include a color filter. Therefore, the organic light emitting diode panel provides better color images. The OLED panel preferably filters light by the color filter, and the OLED panel can include a polarizing element therein for polarizing light. The OLED panel is preferably a micro LED panel or a mini LED panel.

The head-mounted device preferably further includes a folding mechanism configured for reducing dimensions of the head-mounted device. For example, the folding mechanism is helpful for reducing the dimensions of the head-mounted device can be reduced (e.g., folding the head-mounted device) when the head-mounted device is not in use.

The head-mounted device preferably further includes an auto focus unit disposed corresponding to the optical system, and the auto focus unit is configured to move at least one optical lens element of the optical system. Therefore, the auto focus unit provides the optical system with a focus function, so that the focal length is adjustable according to the vision of various users. In some configurations, the number of the optical systems is two, the number of the auto focus unit is one, and the auto focus unit is capable of adjusting the focal lengths of the two optical systems. In some other configurations, the number of the optical systems is two, the number of the auto focus units is two, and the two auto focus units are configured to adjust the focal lengths of the two optical systems, respectively.

The head-mounted device preferably further includes a camera in signal communication with the digital signal processor, and the camera is configured to capture an image of external environment for displaying on the display unit. Therefore, the image of external environment captured by the camera can be instantly displayed on the display unit, so that the user wearing the head-mounted device is able to recognize the environment.

The head-mounted device preferably further includes an eye tracking unit configured to face the user's eye(s) so as to track the gaze position of the eye(s). Therefore, it is favorable for providing the user with data analysis of various usage scenarios (e.g., user's gaze target analysis or concentration analysis when the user is playing video games or watching movies), and adjusting the clarity of each area of an image according to the gaze area of the eye(s).

Note that when one component is said to be in signal communication with another component in the descriptions above and below, the two components may transfer and receive signals between each other wirelessly or via a signal cable.

According to the present disclosure, the aforementioned features and conditions can be utilized in numerous combinations so as to achieve corresponding effects.

According to the present disclosure, the optical lens elements of the optical system can be made of either glass or plastic material. When the optical lens elements are made of glass material, the refractive power distribution of the optical system may be more flexible, and the influence on imaging caused by external environment temperature change may be reduced. The glass optical lens element can either be made by grinding or molding. When the optical lens elements are made of plastic material, the manufacturing costs can be effectively reduced. Furthermore, lens surfaces of each optical lens element can be arranged to be spherical or aspheric. Spherical optical lens elements are simple in manufacture. Aspheric optical lens element design allows more control variables for eliminating aberrations thereof and reducing the required number of optical lens elements, and the length of the optical system can therefore be effectively shortened. Additionally, the aspheric lens surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the optical lens elements' material may optionally include an additive which alters the optical lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material optical lens element by injection molding. Moreover, the additive may be coated on the lens surfaces to provide the abovementioned effects.

According to the present disclosure, each of a front-side surface and a rear-side surface has a paraxial region and an off-axis region. The paraxial region refers to the region of the surface where light rays travel close to the optical axis, and the off-axis region refers to the region of the surface away from the paraxial region. Particularly, unless otherwise stated, when the optical lens element has a convex surface, it indicates that the surface is convex in the paraxial region thereof; when the optical lens element has a concave surface, it indicates that the surface is concave in the paraxial region thereof. Moreover, when a region of refractive power or focus of an optical lens element is not defined, it indicates that the region of refractive power or focus of the optical lens element is in the paraxial region thereof.

According to the present disclosure, an inflection point is a point on the lens surface of the optical lens element at which the lens surface changes from concave to convex, or vice versa.

According to the present disclosure, the image display surface of the optical system, based on the corresponding display unit, can be flat or curved, especially a curved surface being concave facing towards the front side of the optical system.

According to the present disclosure, an image correction unit, such as a field flattener, can be optionally disposed between the optical lens element closest to the rear side of the optical system along the optical path and the image display surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the head-mounted device. In general, a preferable image correction unit is, for example, a thin transparent element having a concave front-side surface and a planar rear-side surface, and the thin transparent element is disposed near the image display surface.

According to the present disclosure, the optical system can include at least one stop, such as an aperture stop, a glare stop or a field stop. Said glare stop or said field stop is set for eliminating the stray light and thereby improving image quality thereof.

According to the present disclosure, the optical system can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or exposure speed.

According to the present disclosure, the optical system can include one or more optical elements for limiting the form of light passing through the optical system. Each optical element can be, but not limited to, a filter, a polarizer, etc., and each optical element can be, but not limited to, a single-piece element, a composite component, a thin film, etc. The optical element can be located at the front side or the rear side of the optical system or between any two adjacent optical lens elements so as to allow light in a specific form to pass through, thereby meeting application requirements.

According to the above description of the present disclosure, the following specific embodiments are provided for further explanation.

1st Embodiment

Figure 2:
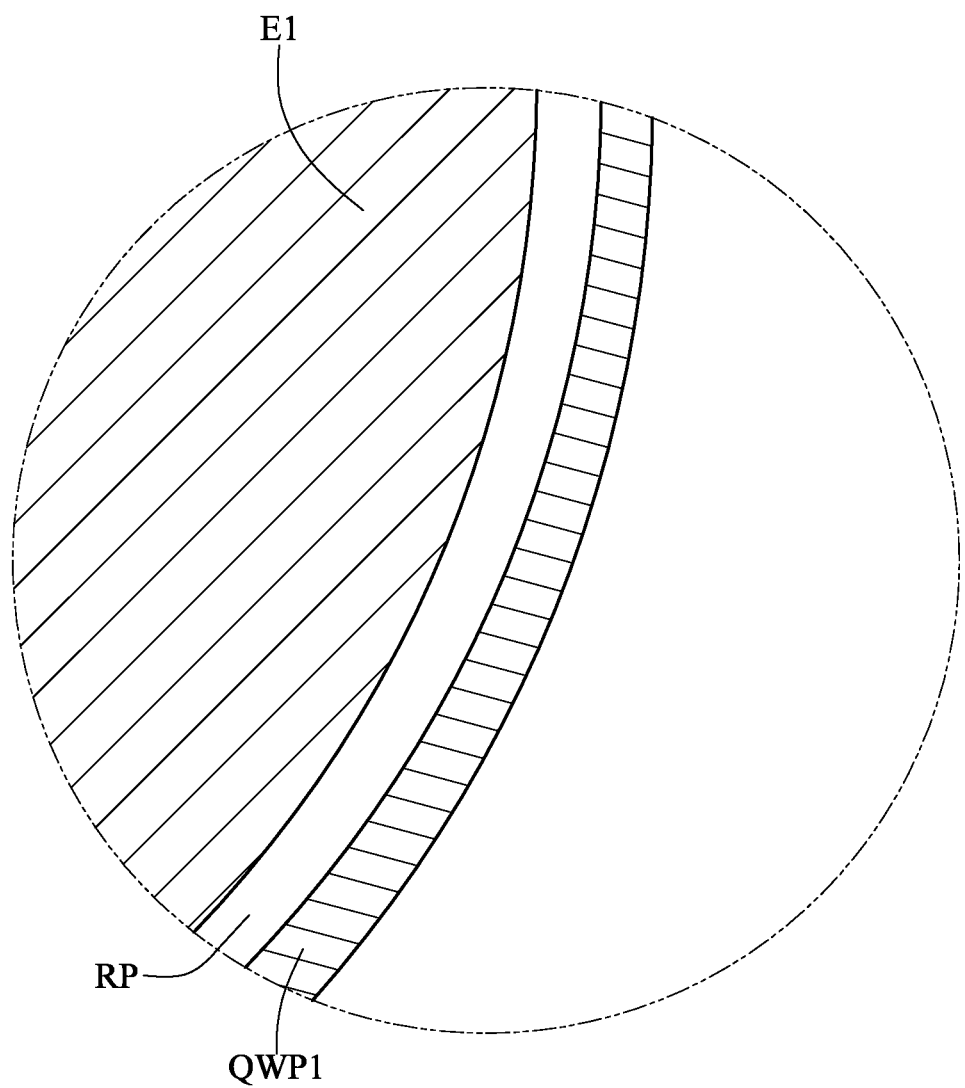
FIG. 2 is an enlarged view of region EL1 in FIG. 1.
Figure 3:
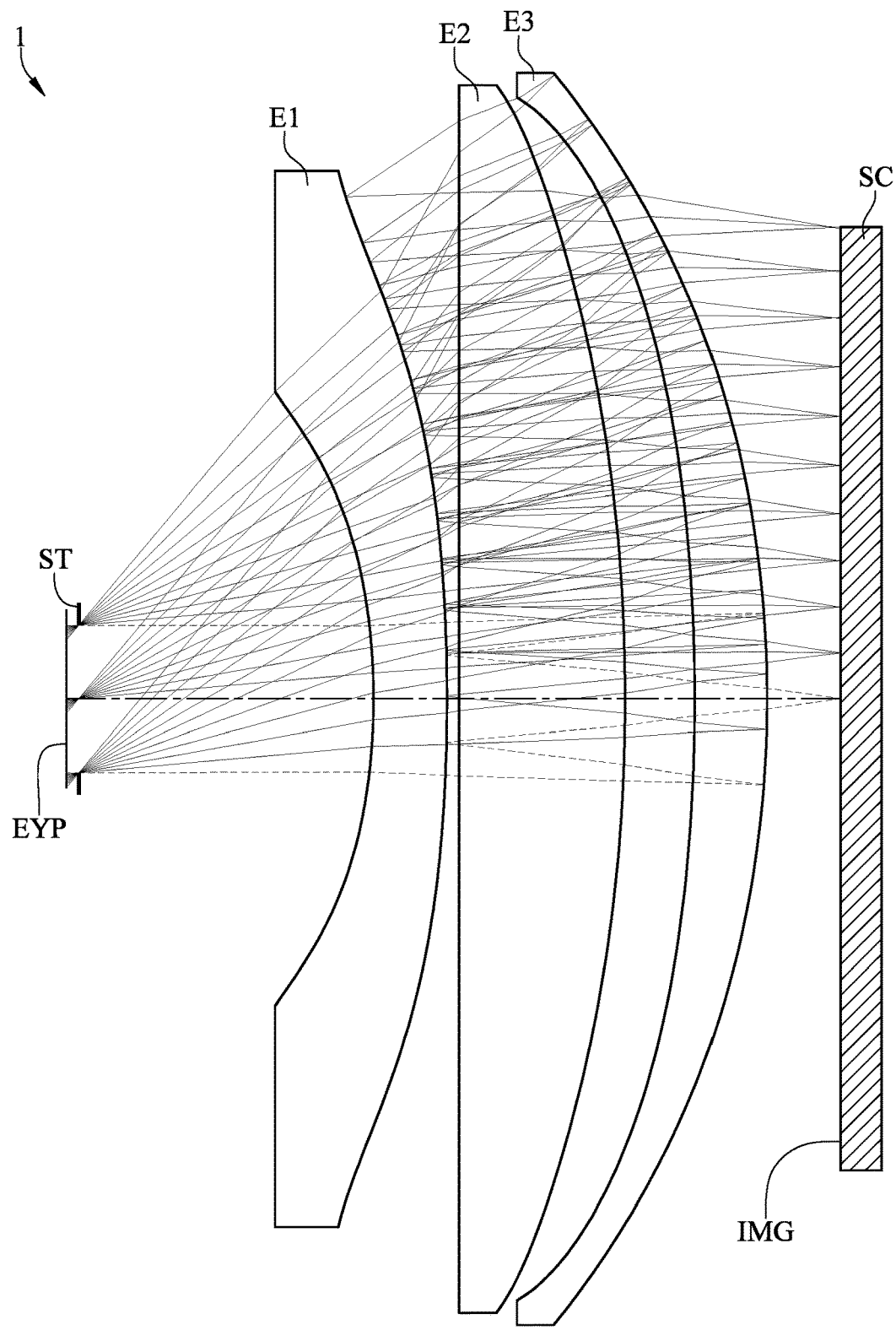
FIG. 3 is a schematic view of an aperture stop, a first optical lens element, a second optical lens element and a third optical lens element and an image display surface of the optical system and the display unit in FIG. 1 and tracks of imaging light rays from various fields of the image display surface.

FIG. 1 is a schematic view of an optical system and a display unit according to the 1st embodiment of the present disclosure, FIG. 2 is an enlarged view of region EU in FIG. 1, and FIG. 3 is a schematic view of an aperture stop, a first optical lens element, a second optical lens element and a third optical lens element and an image display surface of the optical system and the display unit in FIG. 1 and tracks of imaging light rays from various fields of the image display surface. The optical system 1 includes, in order from a front side to a rear side, an aperture stop ST, a first optical lens element E1, a reflective polarizer RP, a first quarter-wave plate QWP1, a second optical lens element E2, a third optical lens element E3, a partial reflector BS, a second quarter-wave plate QWP2 and an image display surface IMG. The display unit SC is disposed on the image display surface IMG. The optical system 1 includes three optical lens elements (E1, E2, and E3) with no additional optical lens element disposed between each of the adjacent three optical lens elements.

The first optical lens element E1 with negative refractive power has a front-side surface being concave and a rear-side surface being convex. The first optical lens element E1 is made of plastic material and has the front-side surface and the rear-side surface being both aspheric. The rear-side surface of the first optical lens element E1 has at least one inflection point.

The second optical lens element E2 with positive refractive power has a front-side surface being planar and a rear-side surface being convex. The second optical lens element E2 is made of plastic material and has the rear-side surface being aspheric.

The third optical lens element E3 with positive refractive power has a front-side surface being concave and a rear-side surface being convex. The third optical lens element E3 is made of plastic material and has the front-side surface and the rear-side surface being both aspheric.

As shown in FIG. 2, the reflective polarizer RP is attached to the rear-side surface of the first optical lens element E1, and the first quarter-wave plate QWP1 is attached to one side of the reflective polarizer RP located away from the first optical lens element E1.

The partial reflector BS is attached to the rear-side surface of the third optical lens element E3.

The second quarter-wave plate QWP2 is located between the partial reflector BS and the image display surface IMG.

An imaging light emitted by the display unit SC from the image display surface IMG sequentially passes through the second quarter-wave plate QWP2, the partial reflector BS, the first quarter-wave plate QWP1 and the reflective polarizer RP. More specifically, an imaging light in a vertical polarization state is emitted from the image display surface IMG, then the imaging light passes through the second quarter-wave plate QWP2 and is converted into a circular polarization state by the second quarter-wave plate QWP2, and then, the imaging light in the circular polarization state passes through the partial reflector BS, the third optical lens element E3, the second optical lens element E2 and the first quarter-wave plate QWP1, and the polarization state of the imaging light is converted by the first quarter-wave plate QWP1 for the first time into a horizontal polarization state. Then, the imaging light in the horizontal polarization state is reflected by the reflective polarizer RP and passes through the first quarter-wave plate QWP1 again, and the polarization state of the imaging light is converted by the first quarter-wave plate QWP1 for the second time into a circular polarization state. Then, the imaging light in the circular polarization state passes through the second optical lens element E2 and third optical lens element E3 and is reflected by the partial reflector BS. Then, the imaging light passes through the third optical lens element E3, the second optical lens element E2 and the first quarter-wave plate QWP1, and the polarization state of the imaging light is converted by the first quarter-wave plate QWP1 for the third time into a vertical polarization state, such that the imaging light in the vertical polarization state can pass through the reflective polarizer RP. Then, the imaging light sequentially passes through the first optical lens element E1 and the aperture stop ST, and arrives at, for example, a position EYP where a user's eye is located.

The equation of the aspheric surface profiles of the aforementioned optical lens elements of the 1st embodiment is expressed as follows:

$$X(Y)=(Y^2/R)/(1+\mathrm{sqrt}(1-(1+k)\times(Y/R)^2))+\Sigma(Ai)\times(Y^i),$$

where,

X is the displacement in parallel with an optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10 and 12.

In the optical system 1 according to the 1st embodiment, when a focal length of the optical system 1 is f, an f-number of the optical system 1 is Fno, and half of a maximum field of view of the optical system 1 is HFOV, these parameters have the following values: f=21.31 millimeters (mm), Fno=3.55, and HFOV=50.0 degrees (deg.).

When an axial distance between the aperture stop ST and the front-side surface of the first optical lens element E1 is ER, the following condition is satisfied: ER=12.00 mm.

When a size of the aperture stop ST is EPD, the following condition is satisfied: EPD=6.00 mm.

When an image height on the image display surface IMG is ImgH, the following condition is satisfied: ImgH=19.20 mm.

When a focal length of the first optical lens element E1 is f1, the following condition is satisfied: f1=−67.56 mm.

When a focal length of the second optical lens element E2 is f2, the following condition is satisfied: f2=151.24 mm.

When a focal length of the third optical lens element E3 is f3, the following condition is satisfied: f3=224.72 mm.

When a curvature radius of the front-side surface of the third optical lens element E3 is R5, and a curvature radius of the rear-side surface of the third optical lens element E3 is R6, the following condition is satisfied: R6/R5=0.59.

When a curvature radius of the front-side surface of the first optical lens element E1 is R1, and a curvature radius of the rear-side surface of the first optical lens element E1 is R2, the following condition is satisfied: |R2/R1|=2.78.

When the focal length of the optical system 1 is f, and the focal length of the first optical lens element E1 is f1, the following condition is satisfied: f/f1=−0.32.

When the focal length of the optical system 1 is f, and the focal length of the second optical lens element E2 is f2, the following condition is satisfied: f/f2=0.14.

When the focal length of the optical system 1 is f, and the focal length of the third optical lens element E3 is f3, the following condition is satisfied: f/f3=0.09.

When an Abbe number of the first optical lens element E1 is V1, and a refractive index of the first optical lens element E1 is N1, the following condition is satisfied: V1/N1=13.03.

When an Abbe number of the second optical lens element E2 is V2, and a refractive index of the second optical lens element E2 is N2, the following condition is satisfied: V2/N2=38.42.

When an Abbe number of the third optical lens element E3 is V3, and a refractive index of the third optical lens element E3 is N3, the following condition is satisfied: V3/N3=38.42.

When the focal length of the optical system 1 is f, and the image height on the image display surface IMG is ImgH, the following condition is satisfied: f/ImgH=1.11.

When an axial distance between the aperture stop ST and the image display surface IMG is SL, and the image height on the image display surface IMG is ImgH, the following condition is satisfied: SL/ImgH=1.61.

When the axial distance between the aperture stop ST and the image display surface IMG is SL, and the focal length of the optical system 1 is f, the following condition is satisfied: SL/f=1.46.

When the size of the aperture stop ST is EPD, and the image height on the image display surface IMG is ImgH, the following condition is satisfied: EPD/ImgH=0.31.

When half of the maximum field of view of the optical system 1 is HFOV, and the focal length of the optical system 1 is f, the following condition is satisfied: tan(HFOV)/f=0.06.

When the axial distance between the aperture stop ST and the front-side surface of the first optical lens element E1 is ER, and the axial distance between the aperture stop ST and the image display surface IMG is SL, the following condition is satisfied: ER/SL=0.39.

When an axial distance between the front-side surface of the first optical lens element E1 and the rear-side surface of the third optical lens element E3 is TD, and the axial distance between the aperture stop ST and the image display surface IMG is SL, the following condition is satisfied: TD/SL=0.52.

When a central thickness of the first optical lens element E1 is CT1, a central thickness of the second optical lens element E2 is CT2, a central thickness of the third optical lens element E3 is CT3, an axial distance between the rear-side surface of the first optical lens element E1 and the front-side surface of the second optical lens element E2 is T12, and an axial distance between the rear-side surface of the second optical lens element E2 and the front-side surface of the third optical lens element E3 is T23, the following condition is satisfied: (CT1+CT2+CT3)/(T12+T23)=3.82.

When the central thickness of the first optical lens element E1 is CT1, the central thickness of the second optical lens element E2 is CT2, the central thickness of the third optical lens element E3 is CT3, and the axial distance between the aperture stop ST and the image display surface IMG is SL, the following condition is satisfied: (CT1+CT2+CT3)/SL=0.41.

When the axial distance between the rear-side surface of the first optical lens element E1 and the front-side surface of the second optical lens element E2 is T12, the axial distance between the rear-side surface of the second optical lens element E2 and the front-side surface of the third optical lens element E3 is T23, and the axial distance between the front-side surface of the first optical lens element E1 and the rear-side surface of the third optical lens element E3 is TD, the following condition is satisfied: (T12+T23)/TD=0.21.

When the curvature radius of the front-side surface of the first optical lens element E1 is R1, and the curvature radius of the rear-side surface of the third optical lens element E3 is R6, the following condition is satisfied: R1/R6=0.59.

When the curvature radius of the front-side surface of the first optical lens element E1 is R1, and the curvature radius of the rear-side surface of the first optical lens element E1 is R2, the following condition is satisfied: (R1+R2)/(R1−R2)= −2.12.

When the curvature radius of the front-side surface of the third optical lens element E3 is R5, and the curvature radius of the rear-side surface of the third optical lens element E3 is R6, the following condition is satisfied: (R5+R6)/(R5−R6)=3.92.

The detailed optical data of the 1st embodiment are shown in Table 1A and the aspheric surface data are shown in Table 1B below.

TABLE 1A

1st Embodiment
f = 21.31 mm, Fno = 3.55, HFOV = 50.0 deg.

| Surface # | | Curvature Radius | Thickness | Material | Index | Abbe # | Refraction/Reflection |
|---|---|---|---|---|---|---|---|
| 0 | | Plano | −1500.000 | | | | Refraction |
| 1 | ST | Plano | 12.000 | | | | Refraction |
| 2 | E1 | −27.4692 (ASP) | 2.998 | Plastic | 1.650 | 21.5 | Refraction |
| 3 | | −76.3364 (ASP) | 0.494 | | | | Refraction |
| 4 | E2 | Plano | 6.748 | Plastic | 1.490 | 57.3 | Refraction |
| 5 | | −74.3759 (ASP) | 2.837 | | | | Refraction |
| 6 | E3 | −77.9795 (ASP) | 2.932 | Plastic | 1.490 | 57.3 | Refraction |
| 7 | E3 | −46.2859 (ASP) | −2.932 | Plastic | 1.490 | 57.3 | Reflection |
| 8 | | −77.9795 (ASP) | −2.837 | | | | Refraction |
| 9 | E2 | −74.3759 (ASP) | −6.748 | Plastic | 1.490 | 57.3 | Refraction |
| 10 | | Plano | −0.494 | | | | Refraction |
| 11 | | −76.3364 (ASP) | 0.494 | | | | Reflection |
| 12 | E2 | Plano | 6.748 | Plastic | 1.490 | 57.3 | Refraction |
| 13 | | −74.3759 (ASP) | 2.837 | | | | Refraction |
| 14 | E3 | −77.9795 (ASP) | 2.932 | Plastic | 1.490 | 57.3 | Refraction |
| 15 | | −46.2859 (ASP) | 3.000 | | | | Refraction |
| 16 | IMG | Plano | 0.000 | | | | Refraction |

Note:
Reference wavelength is 587.6 nm (d-line).

TABLE 1B

Aspheric Coefficients

| Surface # | 2 | 3 | 4 | 5 | 6 | 7 |
|---|---|---|---|---|---|---|
| k = | 0.00000 | 0.00000 | — | 6.96255 | 8.75500 | −0.43298 |
| A4 = | −5.28065E−05 | −1.30250E−05 | — | −7.24273E−07 | −3.09160E−06 | −3.39751E−06 |
| A6 = | 1.97708E−07 | −9.04136E−09 | — | 5.78578E−09 | 1.48933E−09 | 3.94958E−10 |
| A8 = | −2.82041E−09 | 6.21739E−11 | — | — | — | — |
| A10 = | 1.30723E−11 | −2.40940E−14 | — | — | — | — |
| A12 = | −7.59770E−16 | 2.73251E−19 | — | — | — | — |

Corresponding to FIG. 3, only the structural data of the first optical lens element E1, the second optical lens element E2 and the third optical lens element E3 of the optical system 1 are disclosed in Table 1A. In Table 1A, the curvature radius and the thickness are shown in millimeters (mm). Surface numbers 16-0 represent the surfaces sequentially passed through by imaging light from the image display surface IMG to the position EYP where the user's eye is located. It should be understood that each component in the optical system 1 can have a thickness. However, for clarity and conciseness of the optical characteristics of the optical lens elements in the optical system 1, structural data of the second quarter-wave plate QWP2, the partial reflector BS, the first quarter-wave plate QWP1 and the reflective polarizer RP are omitted in Table 1A.

In Table 1B, k represents the conic coefficient of the equation of the aspheric surface profiles. A4-A12 represent the aspheric coefficients ranging from the 4th order to the 12th order.

The tables presented below for each embodiment are the corresponding schematic parameter and aberration curves, and the definitions of the tables are the same as Table 1A and Table 1B of the 1st embodiment. Therefore, an explanation in this regard will not be provided again.

2nd Embodiment

Figure 4:
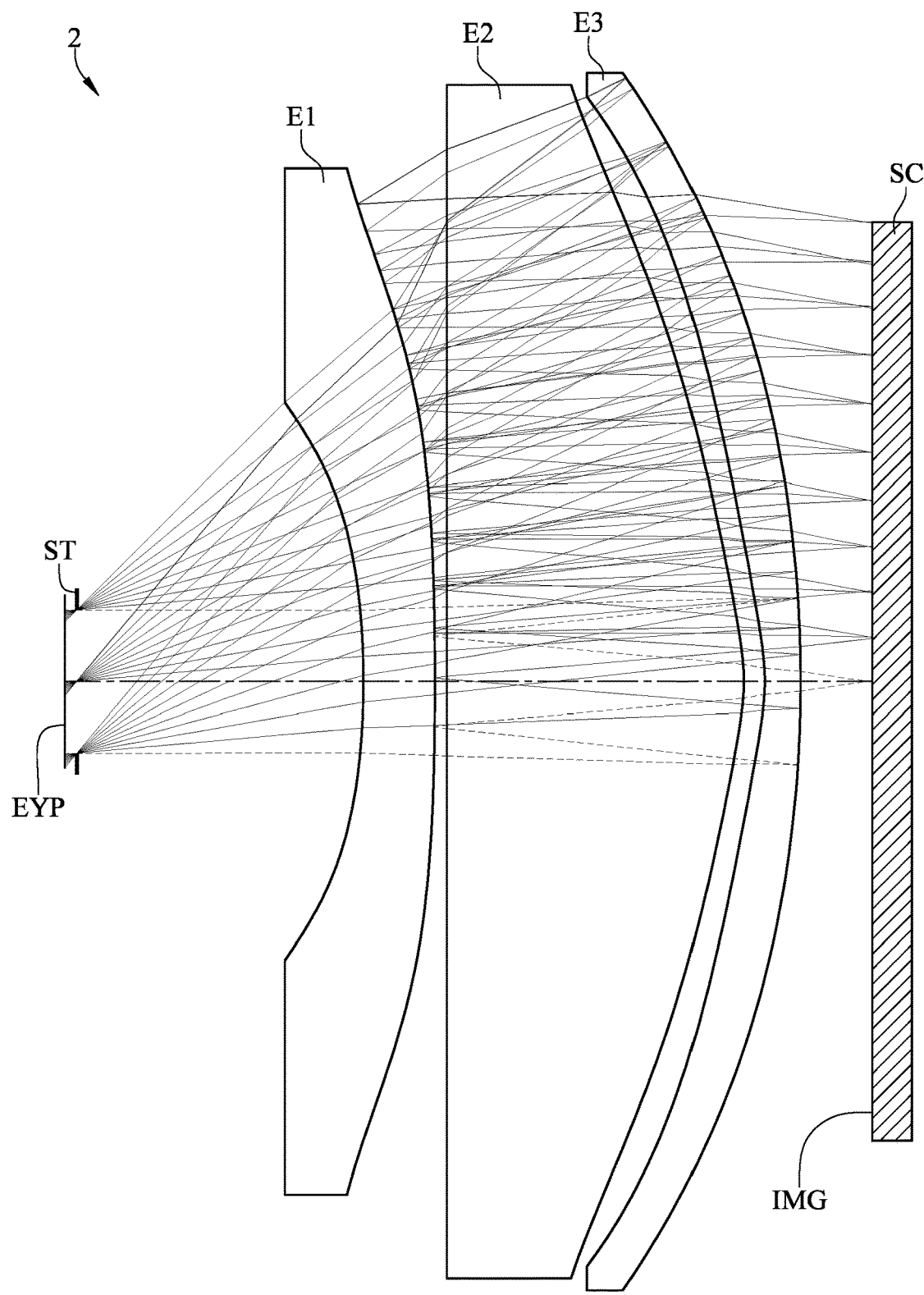
FIG. 4 is a schematic view of an optical system and a display unit according to the 2nd embodiment of the present disclosure.

FIG. 4 is a schematic view of an optical system and a display unit according to the 2nd embodiment of the present disclosure. The optical system 2 includes, in order from a front side to a rear side, an aperture stop ST, a first optical lens element E1, a reflective polarizer (not shown in figure), a first quarter-wave plate (not shown in figure), a second optical lens element E2, a third optical lens element E3, a partial reflector (not shown in figure), a second quarter-wave plate (not shown in figure) and an image display surface IMG. The display unit SC is disposed on the image display surface IMG. The optical system 2 includes three optical lens elements (E1, E2, and E3) with no additional optical lens element disposed between each of the adjacent three optical lens elements. The reflective polarizer, the first quarter-wave plate, the partial reflector and the second quarter-wave plate of the optical system 2 mentioned above in this embodiment have the same or similar structural features as those of the optical system 1 in the 1st embodiment, so the components are not shown in FIG. 4 for the purpose of clarity and conciseness.

The first optical lens element E1 with negative refractive power has a front-side surface being concave and a rear-side surface being convex. The first optical lens element E1 is made of plastic material and has the front-side surface and the rear-side surface being both aspheric. The rear-side surface of the first optical lens element E1 has at least one inflection point.

The second optical lens element E2 with positive refractive power has a front-side surface being planar and a rear-side surface being convex. The second optical lens element E2 is made of plastic material and has the rear-side surface being aspheric.

The third optical lens element E3 with negative refractive power has a front-side surface being concave and a rear-side surface being convex. The third optical lens element E3 is made of plastic material and has the front-side surface and the rear-side surface being both aspheric.

The reflective polarizer is attached to the rear-side surface of the first optical lens element E1, and the first quarter-wave plate is attached to one side of the reflective polarizer located away from the first optical lens element E1.

The partial reflector is attached to the rear-side surface of the third optical lens element E3.

The second quarter-wave plate is located between the partial reflector and the image display surface IMG.

An imaging light emitted by the display unit SC from the image display surface IMG sequentially passes through the second quarter-wave plate, the partial reflector, the first quarter-wave plate and the reflective polarizer. More specifically, an imaging light in a vertical polarization state is emitted from the image display surface IMG, then the imaging light passes through the second quarter-wave plate and is converted into a circular polarization state by the second quarter-wave plate, and then, the imaging light in the circular polarization state passes through the partial reflector, the third optical lens element E3, the second optical lens element E2 and the first quarter-wave plate, and the polarization state of the imaging light is converted by the first quarter-wave plate for the first time into a horizontal polarization state. Then, the imaging light in the horizontal polarization state is reflected by the reflective polarizer and passes through the first quarter-wave plate again, and the polarization state of the imaging light is converted by the first quarter-wave plate for the second time into a circular polarization state. Then, the imaging light in the circular polarization state passes through the second optical lens element E2 and third optical lens element E3 and is reflected by the partial reflector. Then, the imaging light passes through the third optical lens element E3, the second optical lens element E2 and the first quarter-wave plate, and the polarization state of the imaging light is converted by the first quarter-wave plate for the third time into a vertical polarization state, such that the imaging light in the vertical polarization state can pass through the reflective polarizer. Then, the imaging light sequentially passes through the first optical lens element E1 and the aperture stop ST, and arrives at, for example, a position EYP where a user's eye is located.

The detailed optical data of the 2nd embodiment are shown in Table 2A and the aspheric surface data are shown in Table 2B below.

TABLE 2A

2nd Embodiment
f = 21.27 mm, Fno = 3.55, HFOV = 50.0 deg.

| Surface # | | Curvature Radius | | Thickness | Material | Index | Abbe # | Refraction/ Reflection |
|---|---|---|---|---|---|---|---|---|
| 0 | | Plano | | −1500.000 | | | | Refraction |
| 1 | ST | Plano | | 12.000 | | | | Refraction |
| 2 | E1 | −34.0840 | (ASP) | 3.000 | Plastic | 1.650 | 21.5 | Refraction |
| 3 | | −153.7760 | (ASP) | 0.499 | | | | Refraction |
| 4 | E2 | Plano | | 12.417 | Plastic | 1.490 | 57.3 | Refraction |

TABLE 2A-continued

2nd Embodiment
f = 21.27 mm, Fno = 3.55, HFOV = 50.0 deg.

| Surface # | | Curvature Radius | | Thickness | Material | Index | Abbe # | Refraction/Reflection |
|---|---|---|---|---|---|---|---|---|
| 5 | | −7.7704 | (ASP) | 0.882 | | | | Refraction |
| 6 | E3 | −7.7024 | (ASP) | 1.499 | Plastic | 1.490 | 57.3 | Refraction |
| 7 | E3 | −53.9167 | (ASP) | −1.499 | Plastic | 1.490 | 57.3 | Reflection |
| 8 | | −7.7024 | (ASP) | −0.882 | | | | Refraction |
| 9 | E2 | −7.7704 | (ASP) | −12.417 | Plastic | 1.490 | 57.3 | Refraction |
| 10 | | Plano | | −0.499 | | | | Refraction |
| 11 | | −153.7760 | (ASP) | 0.499 | | | | Reflection |
| 12 | E2 | Plano | | 12.417 | Plastic | 1.490 | 57.3 | Refraction |
| 13 | | −7.7704 | (ASP) | 0.882 | | | | Refraction |
| 14 | E3 | −7.7024 | (ASP) | 1.499 | Plastic | 1.490 | 57.3 | Refraction |
| 15 | | −53.9167 | (ASP) | 3.000 | | | | Refraction |
| 16 | IMG | Plano | | 0.000 | | | | Refraction |

Note:
Reference wavelength is 587.6 nm (d-line).

TABLE 2B

Aspheric Coefficients

| Surface # | 2 | 3 | 4 | 5 | 6 | 7 |
|---|---|---|---|---|---|---|
| k = | 0.00000 | 0.00000 | — | −25.67581 | −28.56949 | −5.40214 |
| A4 = | −6.49341E−05 | −1.28019E−05 | — | −1.51562E−05 | −6.40026E−06 | −6.60810E−06 |
| A6 = | −5.15421E−09 | 6.46087E−08 | — | 1.40102E−08 | −3.42691E−09 | 1.30621E−09 |
| A8 = | −2.66034E−09 | 2.64073E−10 | — | — | — | — |
| A10 = | 2.46187E−11 | −2.71631E−13 | — | — | — | — |
| A12 = | −3.89220E−14 | 6.20810E−17 | — | — | — | — |

In the 2nd embodiment, the equation of the aspheric surface profiles of the aforementioned optical lens elements is the same as the equation of the 1st embodiment. Also, the definitions of these parameters shown in Table 2C below are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions:

TABLE 2C

Values of Conditional Expressions

| f [mm] | 21.27 | V2/N2 | 38.42 |
|---|---|---|---|
| Fno | 3.55 | V3/N3 | 38.42 |
| HFOV [deg.] | 50.0 | f/ImgH | 1.11 |
| ER [mm] | 12.00 | SL/ImgH | 1.73 |
| EPD [mm] | 6.00 | SL/f | 1.57 |
| ImgH [mm] | 19.20 | EPD/ImgH | 0.31 |
| f1 [mm] | −67.94 | tan(HFOV)/f | 0.06 |
| f2 [mm] | 15.80 | ER/SL | 0.36 |
| f3 [mm] | −18.47 | TD/SL | 0.55 |
| R6/R5 | 7.00 | (CT1 + CT2 + CT3)/(T12 + T23) | 12.25 |
| |R2/R1| | 4.51 | (CT1 + CT2 + CT3)/SL | 0.51 |
| f/f1 | −0.31 | (T12 + T23)/TD | 0.08 |
| f/f2 | 1.35 | R1/R6 | 0.63 |
| f/f3 | −1.15 | (R1 + R2)/(R1 − R2) | −1.57 |
| V1/N1 | 13.03 | (R5 + R6)/(R5 − R6) | −1.33 |

Figure 5:
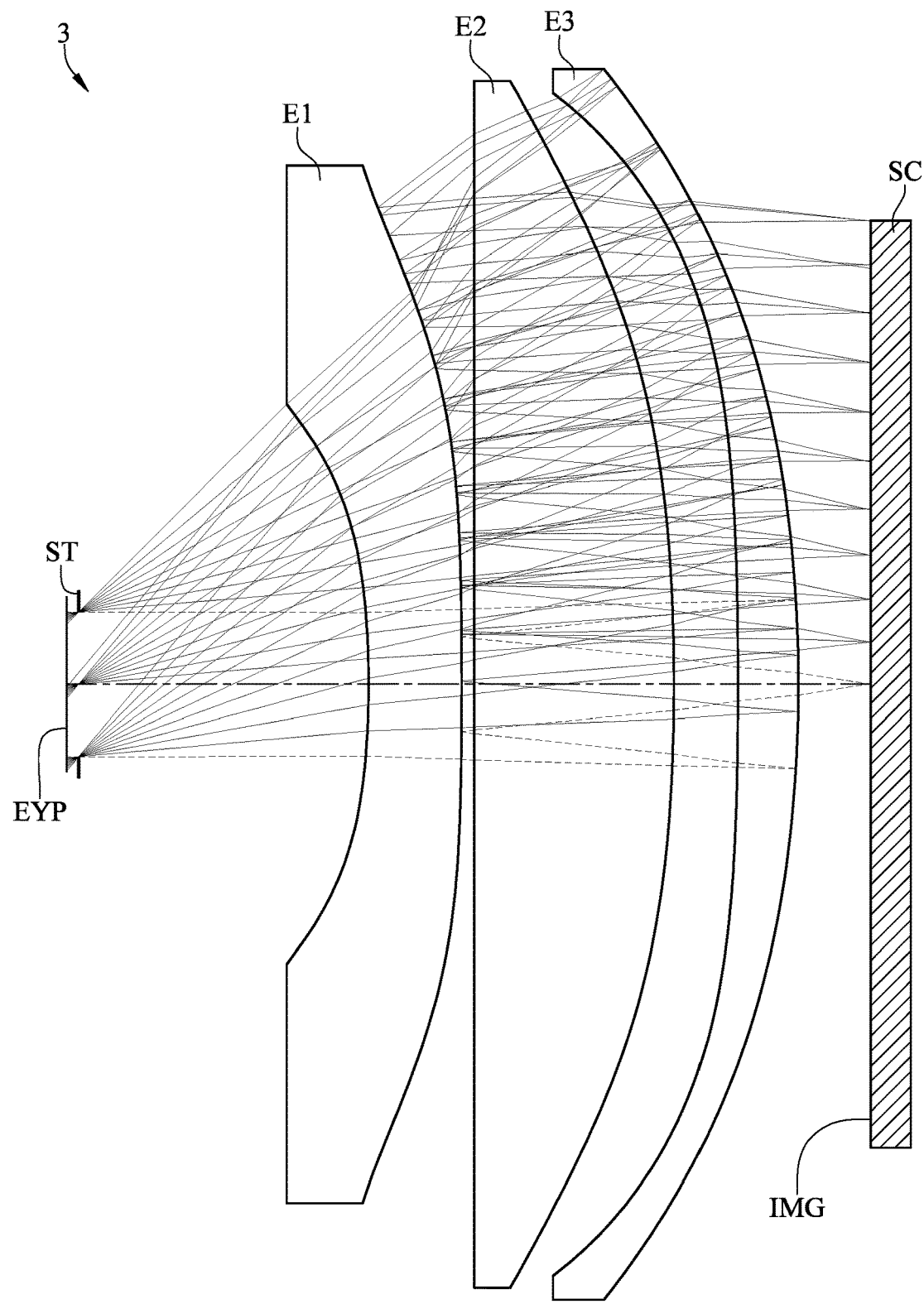
FIG. 5 is a schematic view of an optical system and a display unit according to the 3rd embodiment of the present disclosure.

FIG. 5 is a schematic view of an optical system and a display unit according to the 3rd embodiment of the present disclosure. The optical system 3 includes, in order from a front side to a rear side, an aperture stop ST, a first optical lens element E1, a reflective polarizer (not shown in figure), a first quarter-wave plate (not shown in figure), a second optical lens element E2, a third optical lens element E3, a partial reflector (not shown in figure), a second quarter-wave plate (not shown in figure) and an image display surface IMG. The display unit SC is disposed on the image display surface IMG. The optical system 3 includes three optical lens elements (E1, E2, and E3) with no additional optical lens element disposed between each of the adjacent three optical lens elements. The reflective polarizer, the first quarter-wave plate, the partial reflector and the second quarter-wave plate of the optical system 3 mentioned above in this embodiment have the same or similar structural features as those of the optical system 1 in the 1st embodiment, so the components are not shown in FIG. 5 for the purpose of clarity and conciseness.

The first optical lens element E1 with negative refractive power has a front-side surface being concave and a rear-side surface being convex. The first optical lens element E1 is made of plastic material and has the front-side surface and the rear-side surface being both aspheric. The rear-side surface of the first optical lens element E1 has at least one inflection point.

The second optical lens element E2 with positive refractive power has a front-side surface being planar and a rear-side surface being convex. The second optical lens element E2 is made of plastic material and has the rear-side surface being aspheric.

The third optical lens element E3 with positive refractive power has a front-side surface being concave and a rear-side surface being convex. The third optical lens element E3 is made of plastic material and has the front-side surface and the rear-side surface being both aspheric.

The reflective polarizer is attached to the rear-side surface of the first optical lens element E1, and the first quarter-wave plate is attached to one side of the reflective polarizer located away from the first optical lens element E1.

The partial reflector is attached to the rear-side surface of the third optical lens element E3.

The second quarter-wave plate is located between the partial reflector and the image display surface IMG.

An imaging light emitted by the display unit SC from the image display surface IMG sequentially passes through the second quarter-wave plate, the partial reflector, the first quarter-wave plate and the reflective polarizer. More specifically, an imaging light in a vertical polarization state is emitted from the image display surface IMG, then the imaging light passes through the second quarter-wave plate and is converted into a circular polarization state by the second quarter-wave plate, and then, the imaging light in the circular polarization state passes through the partial reflector, the third optical lens element E3, the second optical lens element E2 and the first quarter-wave plate, and the polarization state of the imaging light is converted by the first quarter-wave plate for the first time into a horizontal polarization state. Then, the imaging light in the horizontal polarization state is reflected by the reflective polarizer and passes through the first quarter-wave plate again, and the polarization state of the imaging light is converted by the first quarter-wave plate for the second time into a circular polarization state. Then, the imaging light in the circular polarization state passes through the second optical lens element E2 and third optical lens element E3 and is reflected by the partial reflector. Then, the imaging light passes through the third optical lens element E3, the second optical lens element E2 and the first quarter-wave plate, and the polarization state of the imaging light is converted by the first quarter-wave plate for the third time into a vertical polarization state, such that the imaging light in the vertical polarization state can pass through the reflective polarizer. Then, the imaging light sequentially passes through the first optical lens element E1 and the aperture stop ST, and arrives at, for example, a position EYP where a user's eye is located.

The detailed optical data of the 3rd embodiment are shown in Table 3A and the aspheric surface data are shown in Table 3B below.

TABLE 3A

3rd Embodiment
f = 19.90 mm, Fno = 3.32, HFOV = 50.0 deg.

| Surface # | | Curvature Radius | | Thickness | Material | Index | Abbe # | Refraction/Reflection |
|---|---|---|---|---|---|---|---|---|
| 0 | | Plano | | −1500.000 | | | | Refraction |
| 1 | ST | Plano | | 12.000 | | | | Refraction |
| 2 | E1 | −40.6142 | (ASP) | 3.859 | Plastic | 1.650 | 21.5 | Refraction |
| 3 | | −399.7856 | (ASP) | 0.500 | | | | Refraction |
| 4 | E2 | Plano | | 8.288 | Plastic | 1.490 | 57.3 | Refraction |
| 5 | | −85.4711 | (ASP) | 2.635 | | | | Refraction |
| 6 | E3 | −208.5953 | (ASP) | 2.504 | Plastic | 1.490 | 57.3 | Refraction |
| 7 | E3 | −59.5536 | (ASP) | −2.504 | Plastic | 1.490 | 57.3 | Reflection |
| 8 | | −208.5953 | (ASP) | −2.635 | | | | Refraction |
| 9 | E2 | −85.4711 | (ASP) | −8.288 | Plastic | 1.490 | 57.3 | Refraction |
| 10 | | Plano | | −0.500 | | | | Refraction |
| 11 | | −399.7856 | (ASP) | 0.500 | | | | Reflection |
| 12 | E2 | Plano | | 8.288 | Plastic | 1.490 | 57.3 | Refraction |
| 13 | | −85.4711 | (ASP) | 2.635 | | | | Refraction |
| 14 | E3 | −208.5953 | (ASP) | 2.504 | Plastic | 1.490 | 57.3 | Refraction |
| 15 | | −59.5536 | (ASP) | 3.000 | | | | Refraction |
| 16 | IMG | Plano | | 0.000 | | | | Refraction |

Note:
Reference wavelength is 587.6 nm (d-line).

TABLE 3B

Aspheric Coefficients

| Surface # | 2 | 3 | 4 | 5 | 6 | 7 |
|---|---|---|---|---|---|---|
| k = | 0.00000 | 0.00000 | — | 8.41229 | 66.57265 | 1.47147 |
| A4 = | −9.17569E−05 | −3.12341E−05 | — | −1.60674E−05 | −1.40667E−05 | −6.17038E−06 |
| A6 = | −5.85522E−07 | −2.38991E−08 | — | 1.86854E−08 | −1.40234E−09 | 3.07733E−09 |
| A8 = | 9.21065E−09 | 3.04130E−10 | — | — | — | — |
| A10 = | −6.05754E−11 | −5.93576E−13 | — | — | — | — |
| A12 = | 1.73691E−13 | 4.25300E−16 | — | — | — | — |

In the 3rd embodiment, the equation of the aspheric surface profiles of the aforementioned optical lens elements is the same as the equation of the 1st embodiment. Also, the definitions of these parameters shown in Table 3C below are the same as those stated in the 1st embodiment with corresponding values for the 3rd embodiment, so an explanation in this regard will not be provided again.

Moreover, these parameters can be calculated from Table 3A and Table 3B

TABLE 3C

Values of Conditional Expressions

| | | | |
|---|---|---|---|
| f [mm] | 19.90 | V2/N2 | 38.42 |
| Fno | 3.32 | V3/N3 | 38.42 |
| HFOV [deg.] | 50.0 | f/ImgH | 1.04 |
| ER [mm] | 12.00 | SL/ImgH | 1.71 |
| EPD [mm] | 6.00 | SL/ | 1.65 |
| ImgH [mm] | 19.20 | EPD/ImgH | 0.31 |

TABLE 3C-continued

Values of Conditional Expressions

| f1 [mm] | −69.74 | tan(HFOV)/f | 0.06 |
|---|---|---|---|
| f2 [mm] | 173.80 | ER/SL | 0.37 |
| f3 [mm] | 168.55 | TD/SL | 0.54 |
| R6/R5 | 0.29 | (CT1 + CT2 + CT3)/(T12 + T23) | 4.67 |
| \|R2/R1\| | 9.84 | (CT1 + CT2 + CT3)/SL | 0.45 |
| f/f1 | −0.29 | (T12 + T23)/TD | 0.18 |
| f/f2 | 0.11 | R1/R6 | 0.68 |
| f/f3 | 0.12 | (R1 + R2)/(R1 − R2) | −1.23 |
| V1/N1 | 13.03 | (R5 + R6)/(R5 − R6) | 1.80 |

4th Embodiment

Figure 6:
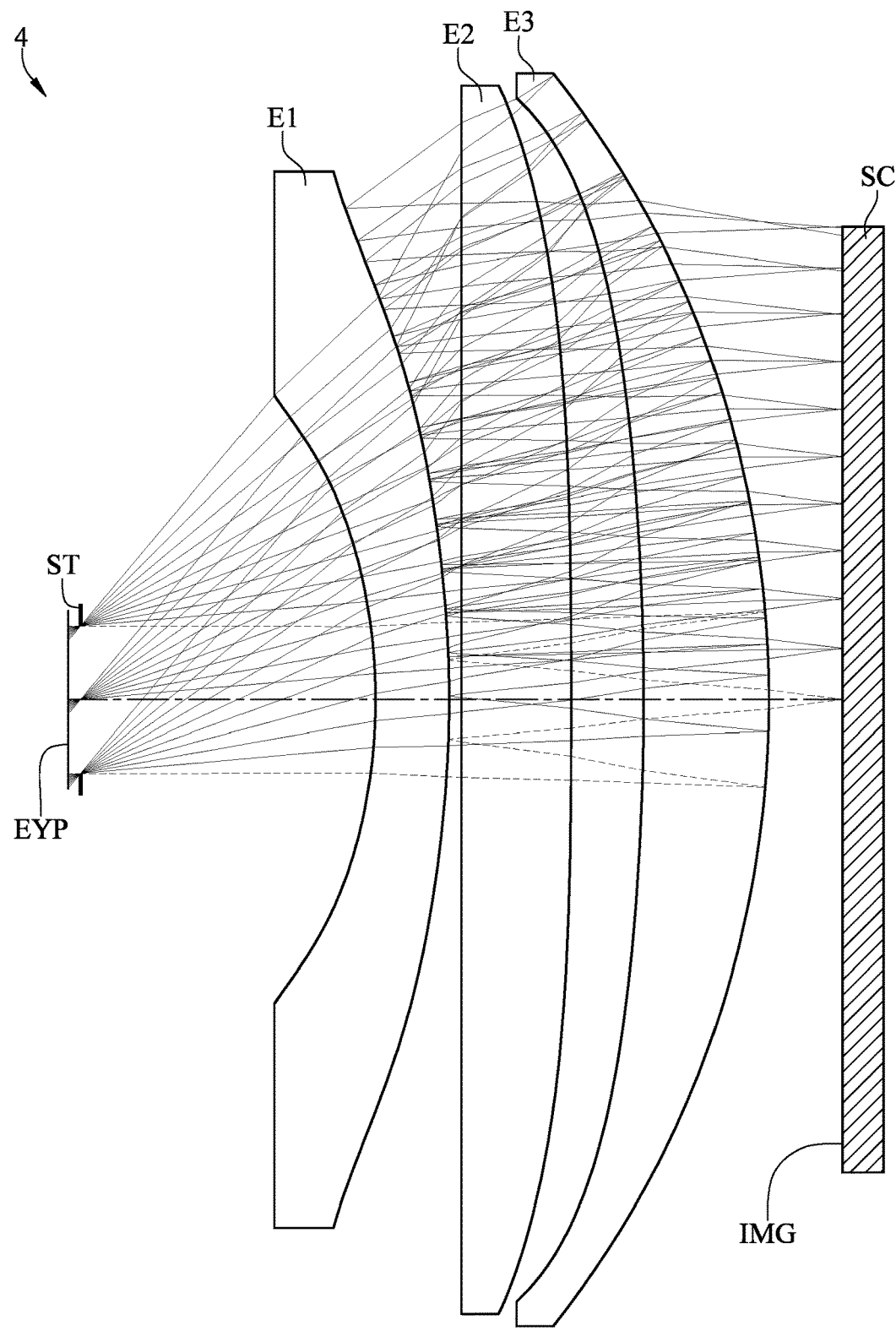
FIG. 6 is a schematic view of an optical system and a display unit according to the 4th embodiment of the present disclosure.

FIG. 6 is a schematic view of an optical system and a display unit according to the 4th embodiment of the present disclosure. The optical system 4 includes, in order from a front side to a rear side, an aperture stop ST, a first optical lens element E1, a reflective polarizer (not shown in figure), a first quarter-wave plate (not shown in figure), a second optical lens element E2, a third optical lens element E3, a partial reflector (not shown in figure), a second quarter-wave plate (not shown in figure) and an image display surface IMG. The display unit SC is disposed on the image display surface IMG. The optical system 4 includes three optical lens elements (E1, E2, and E3) with no additional optical lens element disposed between each of the adjacent three optical lens elements. The reflective polarizer, the first quarter-wave plate, the partial reflector and the second quarter-wave plate of the optical system 4 mentioned above in this embodiment have the same or similar structural features as those of the optical system 1 in the 1st embodiment, so the components are not shown in FIG. 6 for the purpose of clarity and conciseness.

The first optical lens element E1 with negative refractive power has a front-side surface being concave and a rear-side surface being convex. The first optical lens element E1 is made of plastic material and has the front-side surface and the rear-side surface being both aspheric. The rear-side surface of the first optical lens element E1 has at least one inflection point.

The second optical lens element E2 with positive refractive power has a front-side surface being planar and a rear-side surface being convex. The second optical lens element E2 is made of plastic material and has the rear-side surface being aspheric.

The third optical lens element E3 with positive refractive power has a front-side surface being concave and a rear-side surface being convex. The third optical lens element E3 is made of plastic material and has the front-side surface and the rear-side surface being both aspheric.

The reflective polarizer is attached to the rear-side surface of the first optical lens element E1, and the first quarter-wave plate is attached to one side of the reflective polarizer located away from the first optical lens element E1.

The partial reflector is attached to the rear-side surface of the third optical lens element E3.

The second quarter-wave plate is located between the partial reflector and the image display surface IMG.

An imaging light emitted by the display unit SC from the image display surface IMG sequentially passes through the second quarter-wave plate, the partial reflector, the first quarter-wave plate and the reflective polarizer. More specifically, an imaging light in a vertical polarization state is emitted from the image display surface IMG, then the imaging light passes through the second quarter-wave plate and is converted into a circular polarization state by the second quarter-wave plate, and then, the imaging light in the circular polarization state passes through the partial reflector, the third optical lens element E3, the second optical lens element E2 and the first quarter-wave plate, and the polarization state of the imaging light is converted by the first quarter-wave plate for the first time into a horizontal polarization state. Then, the imaging light in the horizontal polarization state is reflected by the reflective polarizer and passes through the first quarter-wave plate again, and the polarization state of the imaging light is converted by the first quarter-wave plate for the second time into a circular polarization state. Then, the imaging light in the circular polarization state passes through the second optical lens element E2 and third optical lens element E3 and is reflected by the partial reflector. Then, the imaging light passes through the third optical lens element E3, the second optical lens element E2 and the first quarter-wave plate, and the polarization state of the imaging light is converted by the first quarter-wave plate for the third time into a vertical polarization state, such that the imaging light in the vertical polarization state can pass through the reflective polarizer. Then, the imaging light sequentially passes through the first optical lens element E1 and the aperture stop ST, and arrives at, for example, a position EYP where a user's eye is located.

The detailed optical data of the 4th embodiment are shown in Table 4A and the aspheric surface data are shown in Table 4B below.

TABLE 4A

4th Embodiment
f = 23.60 mm, Fno = 3.93, HFOV = 50.0 deg.

| Surface # | | Curvature Radius | | Thickness | Material | Index | Abbe # | Refraction/Reflection |
|---|---|---|---|---|---|---|---|---|
| 0 | | Plano | | −1500.000 | | | | Refraction |
| 1 | ST | Plano | | 12.000 | | | | Refraction |
| 2 | E1 | −22.3407 | (ASP) | 3.000 | Plastic | 1.650 | 21.5 | Refraction |
| 3 | | −45.0520 | (ASP) | 0.498 | | | | Refraction |
| 4 | E2 | Plano | | 4.456 | Plastic | 1.490 | 57.3 | Refraction |
| 5 | | −471.4422 | (ASP) | 2.949 | | | | Refraction |
| 6 | E3 | −110.4731 | (ASP) | 5.084 | Plastic | 1.490 | 57.3 | Refraction |
| 7 | E3 | −41.1379 | (ASP) | −5.084 | Plastic | 1.490 | 57.3 | Reflection |
| 8 | | −110.4731 | (ASP) | −2.949 | | | | Refraction |
| 9 | E2 | −471.4422 | (ASP) | −4.456 | Plastic | 1.490 | 57.3 | Refraction |
| 10 | | Plano | | −0.498 | | | | Refraction |
| 11 | | −45.0520 | (ASP) | 0.498 | | | | Reflection |
| 12 | E2 | Plano | | 4.456 | Plastic | 1.490 | 57.3 | Refraction |

TABLE 4A-continued

4th Embodiment
f = 23.60 mm, Fno = 3.93, HFOV = 50.0 deg.

| Surface # | | Curvature Radius | | Thickness | Material | Index | Abbe # | Refraction/Reflection |
|---|---|---|---|---|---|---|---|---|
| 13 | | −471.4422 | (ASP) | 2.949 | | | | Refraction |
| 14 | E3 | −110.4731 | (ASP) | 5.084 | Plastic | 1.490 | 57.3 | Refraction |
| 15 | | −41.1379 | (ASP) | 3.000 | | | | Refraction |
| 16 | IMG | Plano | | 0.000 | | | | Refraction |

Note:
Reference wavelength is 587.6 nm (d-line).

TABLE 4B

| | Aspheric Coefficients | | | | | |
|---|---|---|---|---|---|---|
| Surface # | 2 | 3 | 4 | 5 | 6 | 7 |
| k = | 0.00000 | 0.00000 | — | 327.63032 | 18.00585 | −6.79496 |
| A4 = | −3.94406E−01 | 6.44466E−01 | — | −5.52078E−06 | 2.01724E−06 | −8.77115E−06 |
| A6 = | −6.25383E−02 | −4.17215E−02 | — | 9.78041E−10 | −7.31158E−09 | 2.15717E−09 |
| A8 = | 5.98395E−02 | 1.79561E−01 | — | — | — | — |
| A10 = | 8.67281E−03 | −4.75298E−02 | — | — | — | — |
| A12 = | 2.80632E−03 | 4.10981E−03 | — | — | — | — |

In the 4th embodiment, the equation of the aspheric surface profiles of the aforementioned optical lens elements is the same as the equation of the 1st embodiment. Also, the definitions of these parameters shown in Table 4C below are the same as those stated in the 1st embodiment with corresponding values for the 4th embodiment, so an explanation in this regard will not be provided again.

Moreover, these parameters can be calculated from Table 4A and Table 4B as the following values and satisfy the following conditions:

TABLE 4C

| Values of Conditional Expressions | | | |
|---|---|---|---|
| f [mm] | 23.60 | V2/N2 | 38.42 |
| Fno | 3.93 | V3/N3 | 38.42 |
| HFOV [deg.] | 50.0 | f/ImgH | 1.23 |
| ER [mm] | 12.00 | SL/ImgH | 1.61 |
| EPD [mm] | 6.00 | SL/f | 1.31 |
| ImgH [mm] | 19.20 | EPD/ImgH | 0.31 |
| f1 [mm] | −71.82 | tan(HFOV)/f | 0.05 |
| f2 [mm] | 958.63 | ER/SL | 0.39 |
| f3 [mm] | 130.14 | TD/SL | 0.52 |
| R6/R5 | 0.37 | (CT1 + CT2 + CT3)/(T12 + T23) | 3.64 |
| |R2/R1| | 2.02 | (CT1 + CT2 + CT3)/SL | 0.40 |
| f/f1 | −0.33 | (T12 + T23)/TD | 0.22 |
| f/f2 | 0.02 | R1/R6 | 0.54 |
| f/f3 | 0.18 | (R1 + R2)/(R1 − R2) | −2.97 |
| V1/N1 | 13.03 | (R5 + R6)/(R5 − R6) | 2.19 |

Figure 7:
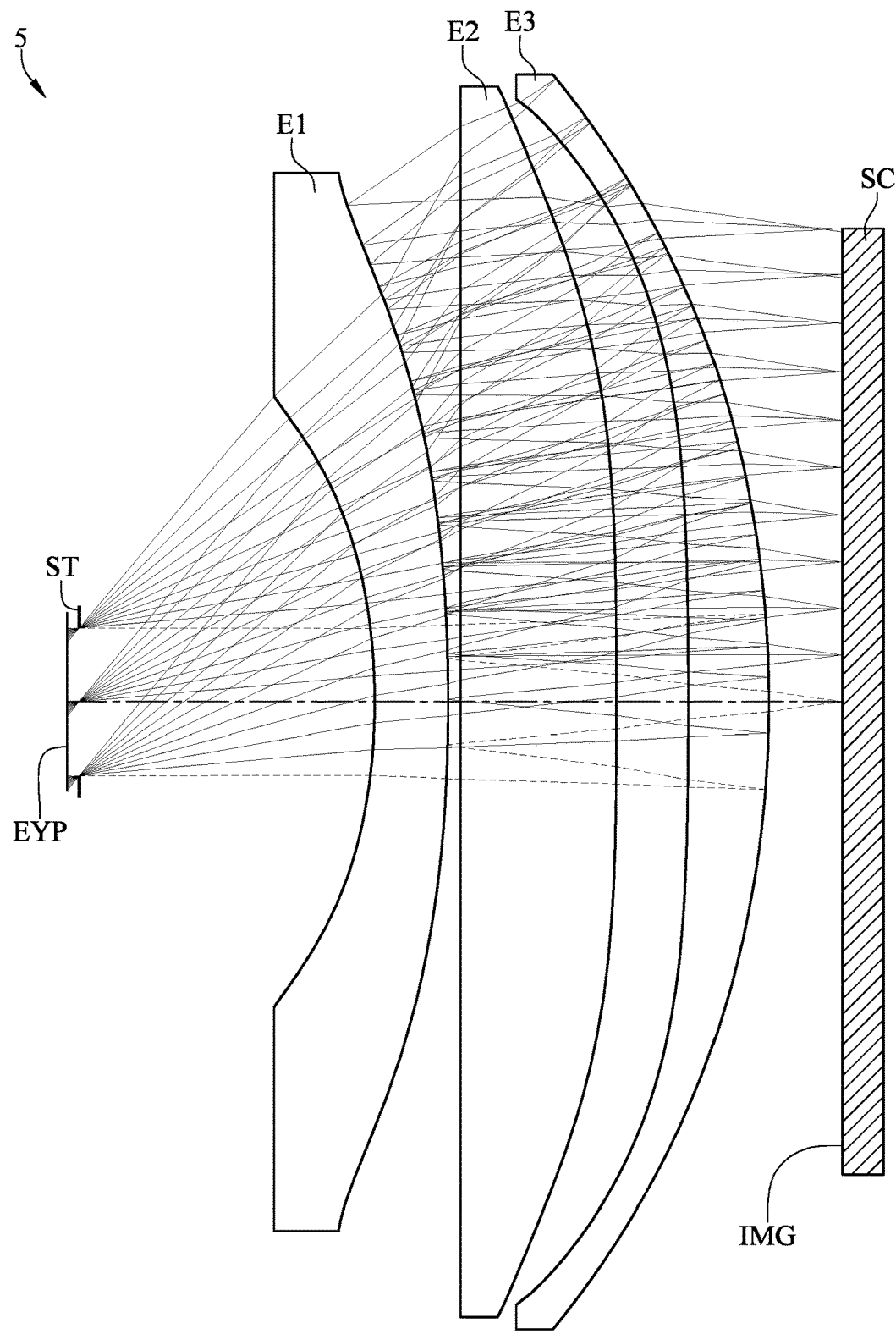
FIG. 7 is a schematic view of an optical system and a display unit according to the 5th embodiment of the present disclosure.

FIG. 7 is a schematic view of an optical system and a display unit according to the 5th embodiment of the present disclosure. The optical system 5 includes, in order from a front side to a rear side, an aperture stop ST, a first optical lens element E1, a reflective polarizer (not shown in figure), a first quarter-wave plate (not shown in figure), a second optical lens element E2, a third optical lens element E3, a partial reflector (not shown in figure), a second quarter-wave plate (not shown in figure) and an image display surface IMG. The display unit SC is disposed on the image display surface IMG. The optical system 5 includes three optical lens elements (E1, E2, and E3) with no additional optical lens element disposed between each of the adjacent three optical lens elements. The reflective polarizer, the first quarter-wave plate, the partial reflector and the second quarter-wave plate of the optical system 5 mentioned above in this embodiment have the same or similar structural features as those of the optical system 1 in the 1st embodiment, so the components are not shown in FIG. 7 for the purpose of clarity and conciseness.

The first optical lens element E1 with negative refractive power has a front-side surface being concave and a rear-side surface being convex. The first optical lens element E1 is made of plastic material and has the front-side surface and the rear-side surface being both aspheric. The rear-side surface of the first optical lens element E1 has at least one inflection point.

The second optical lens element E2 with positive refractive power has a front-side surface being planar and a rear-side surface being convex. The second optical lens element E2 is made of plastic material and has the rear-side surface being aspheric.

The third optical lens element E3 with positive refractive power has a front-side surface being concave and a rear-side surface being convex. The third optical lens element E3 is made of plastic material and has the front-side surface and the rear-side surface being both aspheric.

The reflective polarizer is attached to the rear-side surface of the first optical lens element E1, and the first quarter-wave plate is attached to one side of the reflective polarizer located away from the first optical lens element E1.

The partial reflector is attached to the rear-side surface of the third optical lens element E3.

The second quarter-wave plate is located between the partial reflector and the image display surface IMG.

An imaging light emitted by the display unit SC from the image display surface IMG sequentially passes through the second quarter-wave plate, the partial reflector, the first quarter-wave plate and the reflective polarizer. More specifically, an imaging light in a vertical polarization state is emitted from the image display surface IMG, then the imaging light passes through the second quarter-wave plate and is converted into a circular polarization state by the second quarter-wave plate, and then, the imaging light in the circular polarization state passes through the partial reflector, the third optical lens element E3, the second optical lens element E2 and the first quarter-wave plate, and the polarization state of the imaging light is converted by the first quarter-wave plate for the first time into a horizontal polarization state. Then, the imaging light in the horizontal polarization state is reflected by the reflective polarizer and passes through the first quarter-wave plate again, and the polarization state of the imaging light is converted by the first quarter-wave plate for the second time into a circular polarization state. Then, the imaging light in the circular polarization state passes through the second optical lens element E2 and third optical lens element E3 and is reflected by the partial reflector. Then, the imaging light passes through the third optical lens element E3, the second optical lens element E2 and the first quarter-wave plate, and the polarization state of the imaging light is converted by the first quarter-wave plate for the third time into a vertical polarization state, such that the imaging light in the vertical polarization state can pass through the reflective polarizer. Then, the imaging light sequentially passes through the first optical lens element E1 and the aperture stop ST, and arrives at, for example, a position EYP where a user's eye is located.

The detailed optical data of the 5th embodiment are shown in Table 5A and the aspheric surface data are shown in Table 5B below.

In the 5th embodiment, the equation of the aspheric surface profiles of the aforementioned optical lens elements is the same as the equation of the 1st embodiment. Also, the definitions of these parameters shown in Table 5C below are the same as those stated in the 1st embodiment with corresponding values for the 5th embodiment, so an explanation in this regard will not be provided again.

Moreover, these parameters can be calculated from Table 5A and Table 5B

TABLE 5C

| Values of Conditional Expressions | | | |
|---|---|---|---|
| f [mm] | 21.61 | V2/N2 | 38.42 |
| Fno | 3.60 | V3/N3 | 38.42 |
| HFOV [deg.] | 50.0 | f/ImgH | 1.13 |
| ER [mm] | 12.00 | SL/ImgH | 1.62 |
| EPD [mm] | 6.00 | SL/f | 1.43 |
| ImgH [mm] | 19.20 | EPD/ImgH | 0.31 |
| f1 [mm] | −65.52 | tan(HFOV)/f | 0.06 |
| f2 [mm] | 1279.91 | ER/SL | 0.39 |
| f3 [mm] | 105.43 | TD/SL | 0.52 |
| R6/R5 | 0.12 | (CT1 + CT2 + CT3)/(T12 + T23) | 3.67 |
| |R2/R1| | 2.72 | (CT1 + CT2 + CT3)/SL | 0.41 |
| f/f1 | −0.33 | (T12 + T23)/TD | 0.21 |
| f/f2 | 0.02 | R1/R6 | 0.57 |
| f/f3 | 0.20 | (R1 + R2)/(R1 − R2) | −2.17 |
| V1/N1 | 13.03 | (R5 + R6)/(R5 − R6) | 1.27 |

TABLE 5A

5th Embodiment
f = 21.61 mm, Fno = 3.60, HFOV = 50.0 deg.

| Surface # | | Curvature Radius | | Thickness | Material | Index | Abbe # | Refraction/Reflection |
|---|---|---|---|---|---|---|---|---|
| 0 | | Plano | | −1500.000 | | | | Refraction |
| 1 | ST | Plano | | 12.000 | | | | Refraction |
| 2 | E1 | −26.2367 | (ASP) | 3.000 | Plastic | 1.650 | 21.5 | Refraction |
| 3 | | −71.2575 | (ASP) | 0.499 | | | | Refraction |
| 4 | E2 | Plano | | 6.326 | Plastic | 1.490 | 57.3 | Refraction |
| 5 | | −629.4435 | (ASP) | 2.928 | | | | Refraction |
| 6 | E3 | −381.4527 | (ASP) | 3.259 | Plastic | 1.490 | 57.3 | Refraction |
| 7 | E3 | −45.7746 | (ASP) | −3.259 | Plastic | 1.490 | 57.3 | Reflection |
| 8 | | −381.4527 | (ASP) | −2.928 | | | | Refraction |
| 9 | E2 | −629.4435 | (ASP) | −6.326 | Plastic | 1.490 | 57.3 | Refraction |
| 10 | | Plano | | −0.499 | | | | Refraction |
| 11 | | −71.2575 | (ASP) | 0.499 | | | | Reflection |
| 12 | E2 | Plano | | 6.326 | Plastic | 1.490 | 57.3 | Refraction |
| 13 | | −629.4435 | (ASP) | 2.928 | | | | Refraction |
| 14 | E3 | −381.4527 | (ASP) | 3.259 | Plastic | 1.490 | 57.3 | Refraction |
| 15 | | −45.7746 | (ASP) | 3.000 | | | | Refraction |
| 16 | IMG | Plano | | 0.000 | | | | Refraction |

Note:
Reference wavelength is 587.6 nm (d-line).

TABLE 5B

| Aspheric Coefficients | | | | | | |
|---|---|---|---|---|---|---|
| Surface # | 2 | 3 | 4 | 5 | 6 | 7 |
| k = | 0.00000 | 0.00000 | — | 623.81964 | 240.70393 | −0.92845 |
| A4 = | −4.30917E−05 | −1.59299E−05 | — | −2.22778E−05 | −1.78586E−05 | −3.92471E−06 |
| A6 = | −3.23713E−07 | 3.63194E−08 | — | 1.95092E−08 | 4.23816E−09 | 1.17042E−10 |
| A8 = | 6.43740E−09 | −8.77327E−11 | — | — | — | — |
| A10 = | −5.37459E−11 | 1.13885E−13 | — | — | — | — |
| A12 = | 1.69836E−13 | 2.72794E−17 | — | — | — | — |

6th Embodiment

Figure 8:
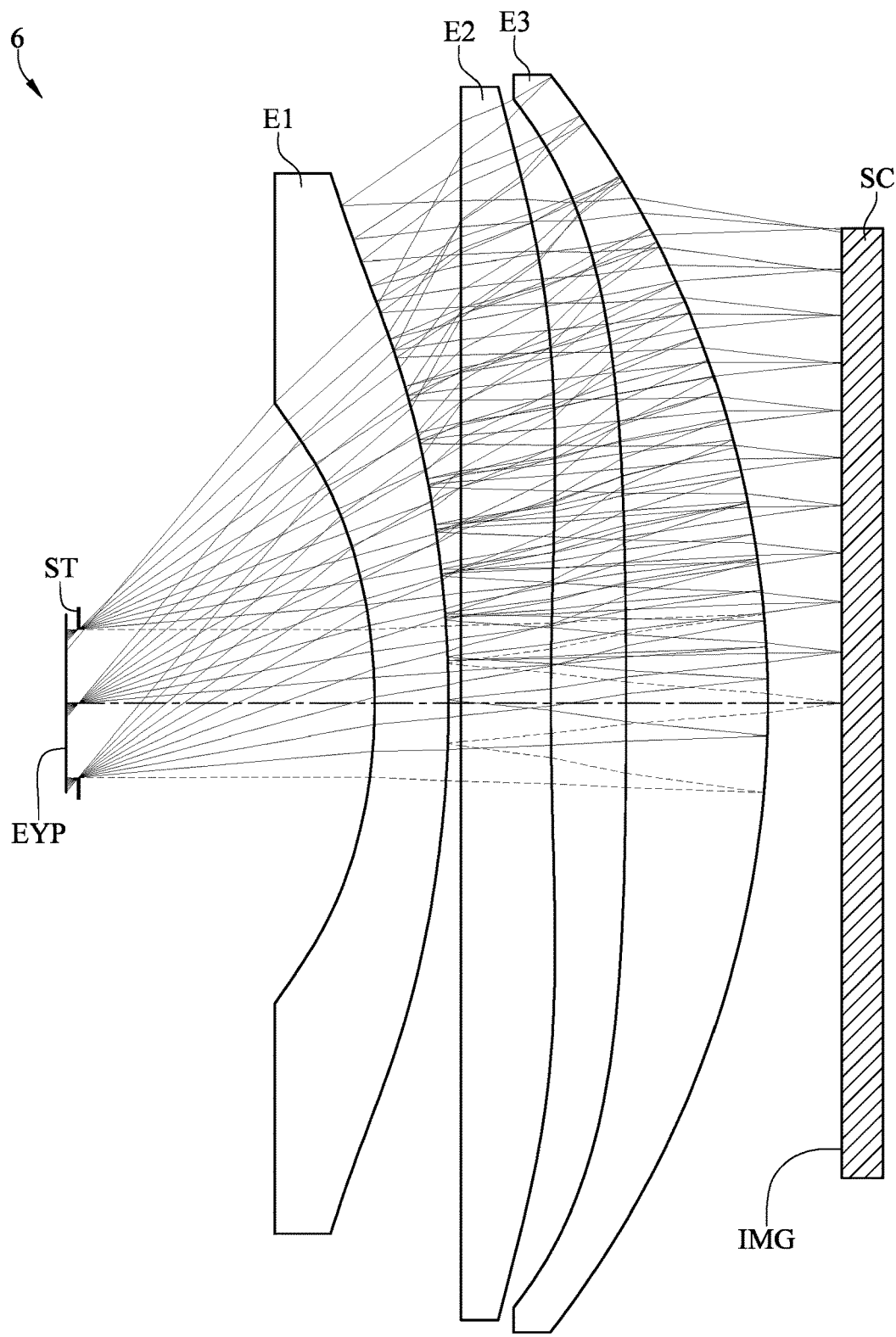
FIG. 8 is a schematic view of an optical system and a display unit according to the 6th embodiment of the present disclosure.

FIG. 8 is a schematic view of an optical system and a display unit according to the 6th embodiment of the present disclosure. The optical system 6 includes, in order from a front side to a rear side, an aperture stop ST, a first optical lens element E1, a reflective polarizer (not shown in figure), a first quarter-wave plate (not shown in figure), a second optical lens element E2, a third optical lens element E3, a partial reflector (not shown in figure), a second quarter-wave plate (not shown in figure) and an image display surface IMG. The display unit SC is disposed on the image display surface IMG. The optical system 6 includes three optical lens elements (E1, E2, and E3) with no additional optical lens element disposed between each of the adjacent three optical lens elements. The reflective polarizer, the first quarter-wave plate, the partial reflector and the second quarter-wave plate of the optical system 6 mentioned above in this embodiment have the same or similar structural features as those of the optical system 1 in the 1st embodiment, so the components are not shown in FIG. 8 for the purpose of clarity and conciseness.

The first optical lens element E1 with negative refractive power has a front-side surface being concave and a rear-side surface being convex. The first optical lens element E1 is made of plastic material and has the front-side surface and the rear-side surface being both aspheric. The rear-side surface of the first optical lens element E1 has at least one inflection point.

The second optical lens element E2 with negative refractive power has a front-side surface being planar and a rear-side surface being concave. The second optical lens element E2 is made of plastic material and has the rear-side surface being aspheric.

The third optical lens element E3 with negative refractive power has a front-side surface being concave and a rear-side surface being convex. The third optical lens element E3 is made of plastic material and has the front-side surface and the rear-side surface being both aspheric.

The reflective polarizer is attached to the rear-side surface of the first optical lens element E1, and the first quarter-wave plate is attached to one side of the reflective polarizer located away from the first optical lens element E1.

The partial reflector is attached to the rear-side surface of the third optical lens element E3.

The second quarter-wave plate is located between the partial reflector and the image display surface IMG.

An imaging light emitted by the display unit SC from the image display surface IMG sequentially passes through the second quarter-wave plate, the partial reflector, the first quarter-wave plate and the reflective polarizer. More specifically, an imaging light in a vertical polarization state is emitted from the image display surface IMG, then the imaging light passes through the second quarter-wave plate and is converted into a circular polarization state by the second quarter-wave plate, and then, the imaging light in the circular polarization state passes through the partial reflector, the third optical lens element E3, the second optical lens element E2 and the first quarter-wave plate, and the polarization state of the imaging light is converted by the first quarter-wave plate for the first time into a horizontal polarization state. Then, the imaging light in the horizontal polarization state is reflected by the reflective polarizer and passes through the first quarter-wave plate again, and the polarization state of the imaging light is converted by the first quarter-wave plate for the second time into a circular polarization state. Then, the imaging light in the circular polarization state passes through the second optical lens element E2 and third optical lens element E3 and is reflected by the partial reflector. Then, the imaging light passes through the third optical lens element E3, the second optical lens element E2 and the first quarter-wave plate, and the polarization state of the imaging light is converted by the first quarter-wave plate for the third time into a vertical polarization state, such that the imaging light in the vertical polarization state can pass through the reflective polarizer. Then, the imaging light sequentially passes through the first optical lens element E1 and the aperture stop ST, and arrives at, for example, a position EYP where a user's eye is located.

The detailed optical data of the 6th embodiment are shown in Table 6A and the aspheric surface data are shown in Table 6B below.

TABLE 6A

6th Embodiment
f = 23.59 mm, Fno = 3.93, HFOV = 50.0 deg.

| Surface # | | Curvature Radius | | Thickness | Material | Index | Abbe # | Refraction/Reflection |
|---|---|---|---|---|---|---|---|---|
| 0 | | Plano | | −1500.000 | | | | Refraction |
| 1 | ST | Plano | | 12.000 | | | | Refraction |
| 2 | E1 | −22.9171 | (ASP) | 2.999 | Plastic | 1.650 | 21.5 | Refraction |
| 3 | | −46.1533 | (ASP) | 0.498 | | | | Refraction |
| 4 | E2 | Plano | | 3.634 | Plastic | 1.490 | 57.3 | Refraction |
| 5 | | 142.9772 | (ASP) | 3.050 | | | | Refraction |
| 6 | E3 | −371.9043 | (ASP) | 5.732 | Plastic | 1.490 | 57.3 | Refraction |
| 7 | E3 | −40.8832 | (ASP) | −5.732 | Plastic | 1.490 | 57.3 | Reflection |
| 8 | | −371.9043 | (ASP) | −3.050 | | | | Refraction |
| 9 | E2 | 142.9772 | (ASP) | −3.634 | Plastic | 1.490 | 57.3 | Refraction |
| 10 | | Plano | | −0.498 | | | | Refraction |
| 11 | | −46.1533 | (ASP) | 0.498 | | | | Reflection |
| 12 | E2 | Plano | | 3.634 | Plastic | 1.490 | 57.3 | Refraction |
| 13 | | 142.9772 | (ASP) | 3.050 | | | | Refraction |
| 14 | E3 | −371.9043 | (ASP) | 5.732 | Plastic | 1.490 | 57.3 | Refraction |
| 15 | | −40.8832 | (ASP) | 3.000 | | | | Refraction |
| 16 | IMG | Plano | | 0.000 | | | | Refraction |

Note:
Reference wavelength is 587.6 nm (d-line).

TABLE 6B

| Aspheric Coefficients | | | | | | |
|---|---|---|---|---|---|---|
| Surface # | 2 | 3 | 4 | 5 | 6 | 7 |
| k = | 0.00000 | 0.00000 | — | −31.99057 | 99.99999 | −5.33738 |
| A4 = | 1.25686E−06 | 1.28172E−05 | — | −1.88423E−05 | −6.36937E−06 | −8.03203E−06 |
| A6 = | −5.55822E−07 | −1.05787E−07 | — | 1.39253E−08 | −6.24175E−09 | 2.25988E−09 |
| A8 = | 2.94174E−09 | 2.70199E−10 | — | — | — | — |
| A10 = | −8.06855E−12 | −1.51369E−13 | — | — | — | — |
| A12 = | 3.59724E−14 | −9.36473E−17 | — | — | — | — |

In the 6th embodiment, the equation of the aspheric surface profiles of the aforementioned optical lens elements is the same as the equation of the 1st embodiment. Also, the definitions of these parameters shown in Table 6C below are the same as those stated in the 1st embodiment with corresponding values for the 6th embodiment, so an explanation in this regard will not be provided again.

Moreover, these parameters can be calculated from Table 6A and Table 6B as the following values and satisfy the following conditions:

TABLE 6C

| Values of Conditional Expressions | | | |
|---|---|---|---|
| f [mm] | 23.59 | V2/N2 | 38.42 |
| Fno | 3.93 | V3/N3 | 38.42 |
| HFOV [deg.] | 50.0 | f/ImgH | 1.23 |
| ER [mm] | 12.00 | SL/ImgH | 1.61 |
| EPD [mm] | 6.00 | SL/f | 1.31 |
| ImgH [mm] | 19.20 | EPD/ImgH | 0.31 |
| f1 [mm] | −73.68 | tan(HFOV)/f | 0.05 |
| f2 [mm] | −290.73 | ER/SL | 0.39 |
| f3 [mm] | −92.87 | TD/SL | 0.51 |
| R6/R5 | 0.11 | (CT1 + CT2 + CT3)/(T12 + T23) | 3.48 |
| |R2/R1| | 2.01 | (CT1 + CT2 + CT3)/SL | 0.40 |
| f/f1 | −0.32 | (T12 + T23)/TD | 0.22 |
| f/f2 | −0.08 | R1/R6 | 0.56 |
| f/f3 | −0.25 | (R1 + R2)/(R1 − R2) | −2.97 |
| V1/N1 | 13.03 | (R5 + R6)/(R5 − R6) | 1.25 |

Figure 9:
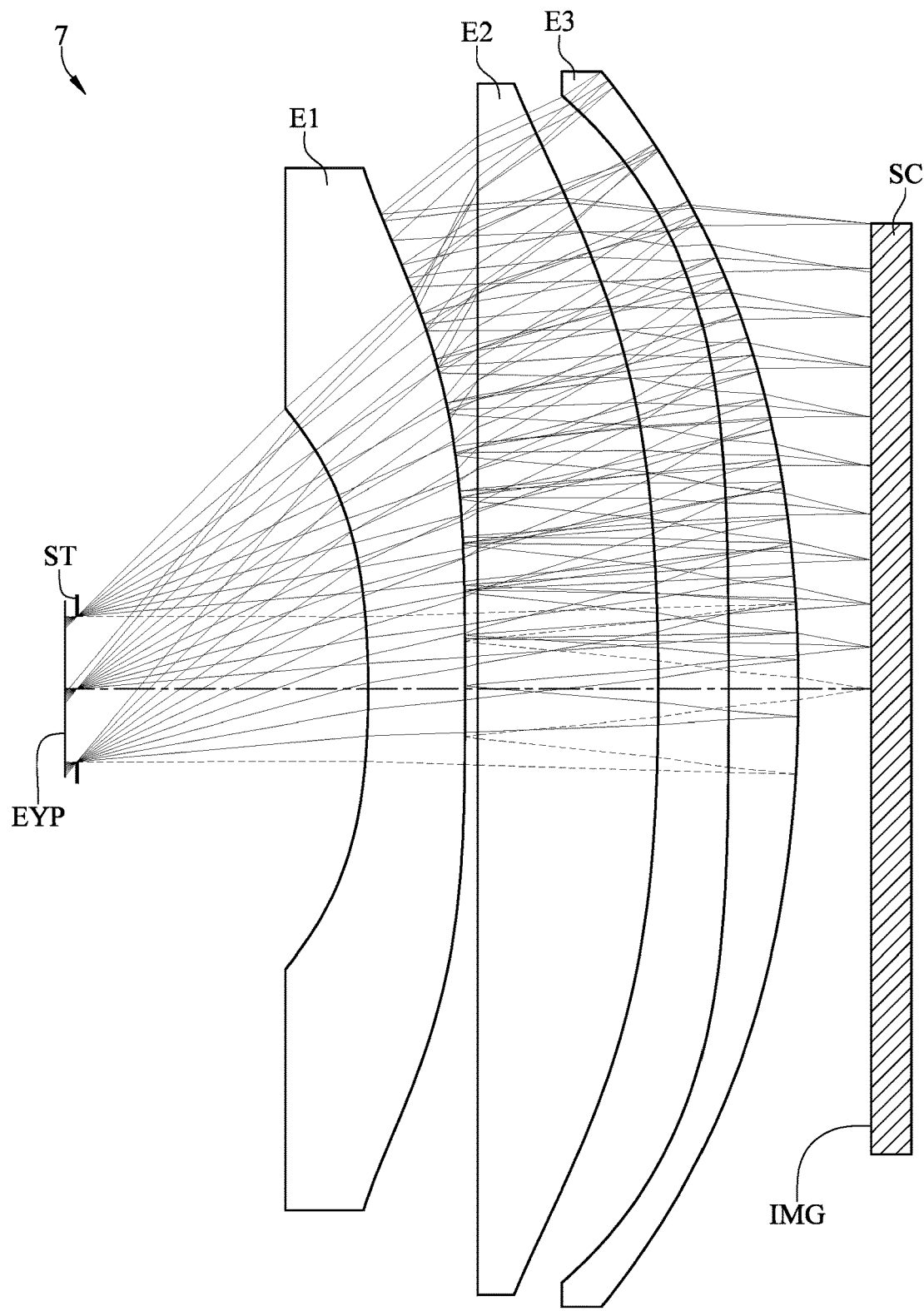
FIG. 9 is a schematic view of an optical system and a display unit according to the 7th embodiment of the present disclosure.

FIG. 9 is a schematic view of an optical system and a display unit according to the 7th embodiment of the present disclosure. The optical system 7 includes, in order from a front side to a rear side, an aperture stop ST, a first optical lens element E1, a reflective polarizer (not shown in figure), a first quarter-wave plate (not shown in figure), a second optical lens element E2, a third optical lens element E3, a partial reflector (not shown in figure), a second quarter-wave plate (not shown in figure) and an image display surface IMG. The display unit SC is disposed on the image display surface IMG. The optical system 7 includes three optical lens elements (E1, E2, and E3) with no additional optical lens element disposed between each of the adjacent three optical lens elements. The reflective polarizer, the first quarter-wave plate, the partial reflector and the second quarter-wave plate of the optical system 7 mentioned above in this embodiment have the same or similar structural features as those of the optical system 1 in the 1st embodiment, so the components are not shown in FIG. 9 for the purpose of clarity and conciseness.

The first optical lens element E1 with negative refractive power has a front-side surface being concave and a rear-side surface being convex. The first optical lens element E1 is made of plastic material and has the front-side surface and the rear-side surface being both aspheric. The rear-side surface of the first optical lens element E1 has at least one inflection point.

The second optical lens element E2 with positive refractive power has a front-side surface being planar and a rear-side surface being convex. The second optical lens element E2 is made of plastic material and has the rear-side surface being aspheric.

The third optical lens element E3 with positive refractive power has a front-side surface being concave and a rear-side surface being convex. The third optical lens element E3 is made of plastic material and has the front-side surface and the rear-side surface being both aspheric.

The reflective polarizer is attached to the rear-side surface of the first optical lens element E1, and the first quarter-wave plate is attached to one side of the reflective polarizer located away from the first optical lens element E1.

The partial reflector is attached to the rear-side surface of the third optical lens element E3.

The second quarter-wave plate is located between the partial reflector and the image display surface IMG.

An imaging light emitted by the display unit SC from the image display surface IMG sequentially passes through the second quarter-wave plate, the partial reflector, the first quarter-wave plate and the reflective polarizer. More specifically, an imaging light in a vertical polarization state is emitted from the image display surface IMG, then the imaging light passes through the second quarter-wave plate and is converted into a circular polarization state by the second quarter-wave plate, and then, the imaging light in the circular polarization state passes through the partial reflector, the third optical lens element E3, the second optical lens element E2 and the first quarter-wave plate, and the polarization state of the imaging light is converted by the first quarter-wave plate for the first time into a horizontal polarization state. Then, the imaging light in the horizontal polarization state is reflected by the reflective polarizer and passes through the first quarter-wave plate again, and the polarization state of the imaging light is converted by the first quarter-wave plate for the second time into a circular polarization state. Then, the imaging light in the circular polarization state passes through the second optical lens element E2 and third optical lens element E3 and is reflected by the partial reflector. Then, the imaging light passes through the third optical lens element E3, the second optical lens element E2 and the first quarter-wave plate, and the polarization state of the imaging light is converted by the first quarter-wave plate for the third time into a vertical polarization state, such that the imaging light in the vertical polarization state can pass through the reflective polarizer. Then, the imaging light sequentially passes through the first optical lens element E1 and the aperture stop ST, and arrives at, for example, a position EYP where a user's eye is located.

The detailed optical data of the 7th embodiment are shown in Table 7A and the aspheric surface data are shown in Table 7B below.

TABLE 7A

7th Embodiment
f = 19.84 mm, Fno = 3.31, HFOV = 50.0 deg.

| Surface # | | Curvature Radius | | Thickness | Material | Index | Abbe # | Refraction/Reflection |
|---|---|---|---|---|---|---|---|---|
| 0 | | Plano | | −1500.000 | | | | Refraction |
| 1 | ST | Plano | | 12.000 | | | | Refraction |
| 2 | E1 | −40.3344 | (ASP) | 3.999 | Plastic | 1.650 | 21.5 | Refraction |
| 3 | | −389.5241 | (ASP) | 0.500 | | | | Refraction |
| 4 | E2 | Plano | | 7.462 | Plastic | 1.490 | 57.3 | Refraction |
| 5 | | −113.8684 | (ASP) | 2.885 | | | | Refraction |
| 6 | E3 | −493.6879 | (ASP) | 2.883 | Plastic | 1.490 | 57.3 | Refraction |
| 7 | E3 | −59.2434 | (ASP) | −2.883 | Plastic | 1.490 | 57.3 | Reflection |
| 8 | | −493.6879 | (ASP) | −2.885 | | | | Refraction |
| 9 | E2 | −113.8684 | (ASP) | −7.462 | Plastic | 1.490 | 57.3 | Refraction |
| 10 | | Plano | | −0.500 | | | | Refraction |
| 11 | | −389.5241 | (ASP) | 0.500 | | | | Reflection |
| 12 | E2 | Plano | | 7.462 | Plastic | 1.490 | 57.3 | Refraction |
| 13 | | −113.8684 | (ASP) | 2.885 | | | | Refraction |
| 14 | E3 | −493.6879 | (ASP) | 2.883 | Plastic | 1.490 | 57.3 | Refraction |
| 15 | | −59.2434 | (ASP) | 3.000 | | | | Refraction |
| 16 | IMG | Plano | | 0.000 | | | | Refraction |

Note:
Reference wavelength is 587.6 nm (d-line).

TABLE 7B

Aspheric Coefficients

| Surface # | 2 | 3 | 4 | 5 | 6 | 7 |
|---|---|---|---|---|---|---|
| k = | 0.00000 | 0.00000 | — | 12.34520 | 372.89524 | 1.99203 |
| A4 = | −9.03225E−05 | −3.22516E−05 | — | −1.79587E−05 | −1.59580E−05 | −6.01132E−06 |
| A6 = | −7.45439E−07 | −1.94670E−08 | — | 1.83889E−08 | −7.90390E−10 | 3.66545E−09 |
| A8 = | 1.20685E−08 | 3.04625E−10 | — | — | — | — |
| A10 = | −8.14334E−11 | −6.36939E−13 | — | — | — | — |
| A12 = | 2.26712E−13 | 4.86600E−16 | — | — | — | — |

In the 7th embodiment, the equation of the aspheric surface profiles of the aforementioned optical lens elements is the same as the equation of the 1st embodiment. Also, the definitions of these parameters shown in Table 7C below are the same as those stated in the 1st embodiment with corresponding values for the 7th embodiment, so an explanation in this regard will not be provided again.

Moreover, these parameters can be calculated from Table 7A and Table 7B

TABLE 7C

Values of Conditional Expressions

| f [mm] | 19.84 | V2/N2 | 38.42 |
|---|---|---|---|
| Fno | 3.31 | V3/N3 | 38.42 |
| HFOV [deg.] | 50.0 | f/ImgH | 1.03 |
| ER [mm] | 12.00 | SL/ImgH | 1.70 |
| EPD [mm] | 6.00 | SL/f | 1.65 |
| ImgH [mm] | 19.20 | EPD/ImgH | 0.31 |
| f1 [mm] | −69.43 | tan(HFOV)/f | 0.06 |
| f2 [mm] | 231.54 | ER/SL | 0.37 |
| f3 [mm] | 136.59 | TD/SL | 0.54 |
| R6/R5 | 0.12 | (CT1 + CT2 + CT3)/(T12 + T23) | 4.24 |
| |R2/R1| | 9.66 | (CT1 + CT2 + CT3)/SL | 0.44 |
| f/f1 | −0.29 | (T12 + T23)/TD | 0.19 |
| f/f2 | 0.09 | R1/R6 | 0.68 |
| f/f3 | 0.15 | (R1 + R2)/(R1 − R2) | −1.23 |
| V1/N1 | 13.03 | (R5 + R6)/(R5 − R6) | 1.27 |

8th Embodiment

Figure 10:
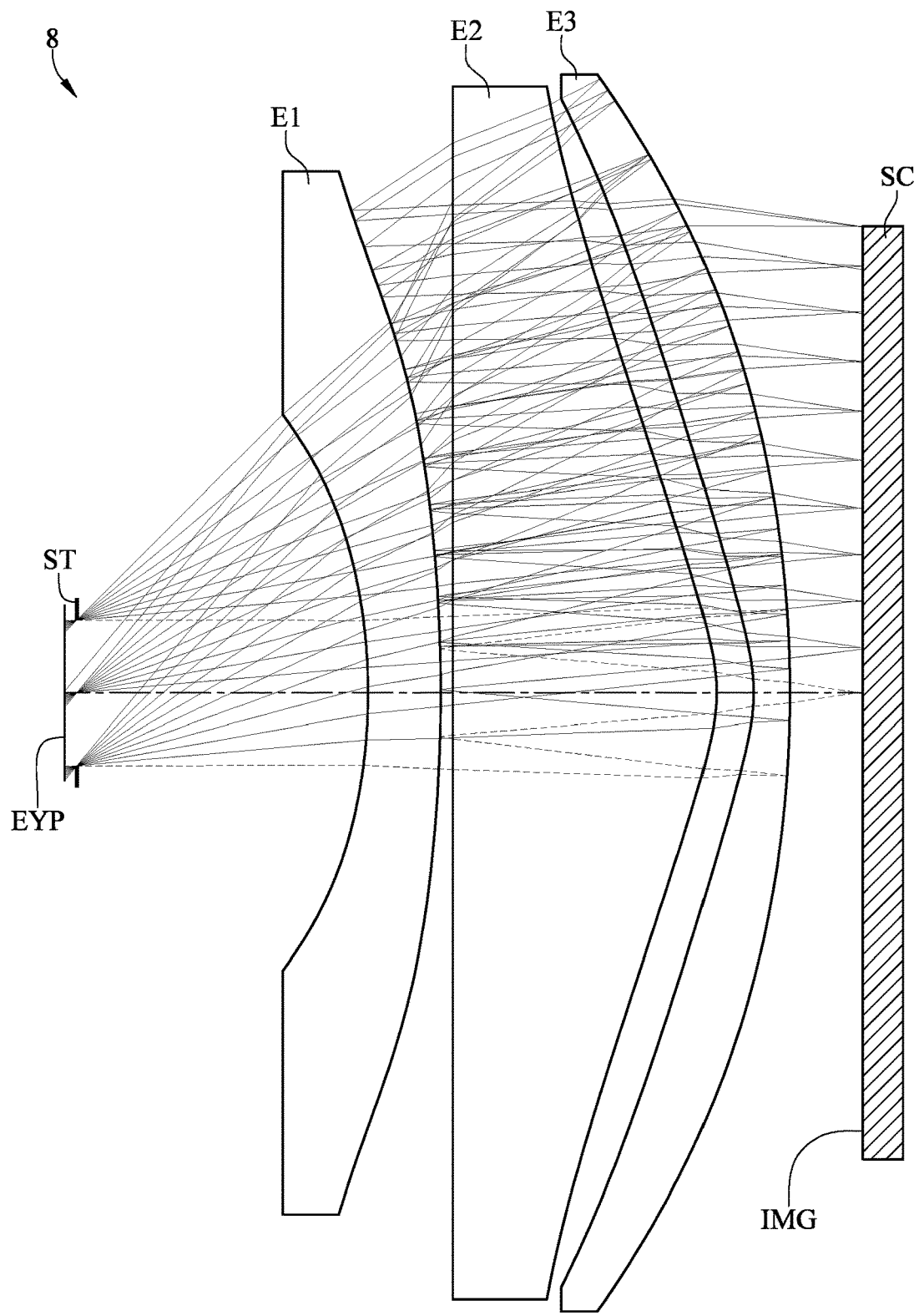
FIG. 10 is a schematic view of an optical system and a display unit according to the 8th embodiment of the present disclosure.

FIG. 10 is a schematic view of an optical system and a display unit according to the 8th embodiment of the present disclosure. The optical system 8 includes, in order from a front side to a rear side, an aperture stop ST, a first optical lens element E1, a reflective polarizer (not shown in figure), a first quarter-wave plate (not shown in figure), a second optical lens element E2, a third optical lens element E3, a partial reflector (not shown in figure), a second quarter-wave plate (not shown in figure) and an image display surface IMG. The display unit SC is disposed on the image display surface IMG. The optical system 8 includes three optical lens elements (E1, E2, and E3) with no additional optical lens element disposed between each of the adjacent three optical lens elements. The reflective polarizer, the first quarter-wave plate, the partial reflector and the second quarter-wave plate of the optical system 8 mentioned above in this embodiment have the same or similar structural features as those of the optical system 1 in the 1st embodiment, so the components are not shown in FIG. 10 for the purpose of clarity and conciseness.

The first optical lens element E1 with negative refractive power has a front-side surface being concave and a rear-side surface being convex. The first optical lens element E1 is made of plastic material and has the front-side surface and the rear-side surface being both aspheric. The rear-side surface of the first optical lens element E1 has at least one inflection point.

The second optical lens element E2 with positive refractive power has a front-side surface being planar and a rear-side surface being convex. The second optical lens element E2 is made of plastic material and has the rear-side surface being aspheric.

The third optical lens element E3 with negative refractive power has a front-side surface being concave and a rear-side surface being convex. The third optical lens element E3 is made of plastic material and has the front-side surface and the rear-side surface being both aspheric.

The reflective polarizer is attached to the rear-side surface of the first optical lens element E1, and the first quarter-wave plate is attached to one side of the reflective polarizer located away from the first optical lens element E1.

The partial reflector is attached to the rear-side surface of the third optical lens element E3.

The second quarter-wave plate is located between the partial reflector and the image display surface IMG.

An imaging light emitted by the display unit SC from the image display surface IMG sequentially passes through the second quarter-wave plate, the partial reflector, the first quarter-wave plate and the reflective polarizer. More specifically, an imaging light in a vertical polarization state is emitted from the image display surface IMG, then the imaging light passes through the second quarter-wave plate and is converted into a circular polarization state by the second quarter-wave plate, and then, the imaging light in the circular polarization state passes through the partial reflector, the third optical lens element E3, the second optical lens element E2 and the first quarter-wave plate, and the polarization state of the imaging light is converted by the first quarter-wave plate for the first time into a horizontal polarization state. Then, the imaging light in the horizontal polarization state is reflected by the reflective polarizer and passes through the first quarter-wave plate again, and the polarization state of the imaging light is converted by the first quarter-wave plate for the second time into a circular polarization state. Then, the imaging light in the circular polarization state passes through the second optical lens element E2 and third optical lens element E3 and is reflected by the partial reflector. Then, the imaging light passes through the third optical lens element E3, the second optical lens element E2 and the first quarter-wave plate, and the polarization state of the imaging light is converted by the first quarter-wave plate for the third time into a vertical polarization state, such that the imaging light in the vertical polarization state can pass through the reflective polarizer. Then, the imaging light sequentially passes through the first optical lens element E1 and the aperture stop ST, and arrives at, for example, a position EYP where a user's eye is located.

The detailed optical data of the 8th embodiment are shown in Table 8A and the aspheric surface data are shown in Table 8B below.

TABLE 8A

8th Embodiment
f = 20.57 mm, Fno = 3.43, HFOV = 50.0 deg.

| Surface # | | Curvature Radius | | Thickness | Material | Index | Abbe # | Refraction/Reflection |
|---|---|---|---|---|---|---|---|---|
| 0 | | Plano | | −1500.000 | | | | Refraction |
| 1 | ST | Plano | | 12.000 | | | | Refraction |
| 2 | E1 | −23.7333 | (ASP) | 2.999 | Plastic | 1.650 | 21.5 | Refraction |
| 3 | | −65.2660 | (ASP) | 0.499 | | | | Refraction |
| 4 | E2 | Plano | | 10.854 | Plastic | 1.490 | 57.3 | Refraction |
| 5 | | −6.9711 | (ASP) | 1.527 | | | | Refraction |
| 6 | E3 | −7.0005 | (ASP) | 1.500 | Plastic | 1.490 | 57.3 | Refraction |
| 7 | E3 | −48.9475 | (ASP) | −1.500 | Plastic | 1.490 | 57.3 | Reflection |
| 8 | | −7.0005 | (ASP) | −1.527 | | | | Refraction |
| 9 | E2 | −6.9711 | (ASP) | −10.854 | Plastic | 1.490 | 57.3 | Refraction |
| 10 | | Plano | | −0.499 | | | | Refraction |
| 11 | | −65.2660 | (ASP) | 0.499 | | | | Reflection |
| 12 | E2 | Plano | | 10.854 | Plastic | 1.490 | 57.3 | Refraction |
| 13 | | −6.9711 | (ASP) | 1.527 | | | | Refraction |
| 14 | E3 | −7.0005 | (ASP) | 1.500 | Plastic | 1.490 | 57.3 | Refraction |
| 15 | | −48.9475 | (ASP) | 3.000 | | | | Refraction |
| 16 | IMG | Plano | | 0.000 | | | | Refraction |

Note:
Reference wavelength is 587.6 nm (d-line).

TABLE 8B

| Aspheric Coefficients | | | | | | |
|---|---|---|---|---|---|---|
| Surface # | 2 | 3 | 4 | 5 | 6 | 7 |
| k = | 0.00000 | 0.00000 | — | −9.67187 | −11.65598 | −6.92639 |
| A4 = | −1.75373E−05 | 7.43767E−06 | — | 5.24227E−07 | −1.86807E−06 | −8.84550E−06 |
| A6 = | −5.23072E−08 | −1.02447E−07 | — | 2.15468E−09 | −1.74998E−09 | 3.24386E−09 |
| A8 = | −3.62548E−09 | 2.33540E−10 | — | — | — | — |
| A10 = | 2.93293E−11 | −4.98635E−14 | — | — | — | — |
| A12 = | −4.08022E−14 | −1.68685E−16 | — | — | — | — |

In the 8th embodiment, the equation of the aspheric surface profiles of the aforementioned optical lens elements is the same as the equation of the 1st embodiment. Also, the definitions of these parameters shown in Table 8C below are the same as those stated in the 1st embodiment with corresponding values for the 8th embodiment, so an explanation in this regard will not be provided again.

Moreover, these parameters can be calculated from Table 8A and Table 8B as the following values and satisfy the following conditions:

TABLE 8C

Values of Conditional Expressions

| | | | |
|---|---|---|---|
| f [mm] | 20.57 | V2/N2 | 38.42 |
| Fno | 3.43 | V3/N3 | 38.42 |
| HFOV [deg.] | 50.0 | f/ImgH | 1.07 |
| ER [mm] | 12.00 | SL/ImgH | 1.69 |
| EPD [mm] | 6.00 | SL/f | 1.57 |
| ImgH [mm] | 19.20 | EPD/ImgH | 0.31 |
| f1 [mm] | −58.97 | tan(HFOV)/f | 0.06 |
| f2 [mm] | 14.17 | ER/SL | 0.37 |
| f3 [mm] | −16.81 | TD/SL | 0.54 |
| R6/R5 | 6.99 | (CT1 + CT2 + CT3)/(T12 + T23) | 7.58 |
| |R2/R1| | 2.75 | (CT1 + CT2 + CT3)/SL | 0.47 |
| f/f1 | −0.35 | (T12 + T23)/TD | 0.12 |
| f/f2 | 1.45 | R1/R6 | 0.48 |
| f/f3 | −1.22 | (R1 + R2)/(R1 − R2) | −2.14 |
| V1/N1 | 13.03 | (R5 + R6)/(R5 − R6) | −1.33 |

Figure 11:
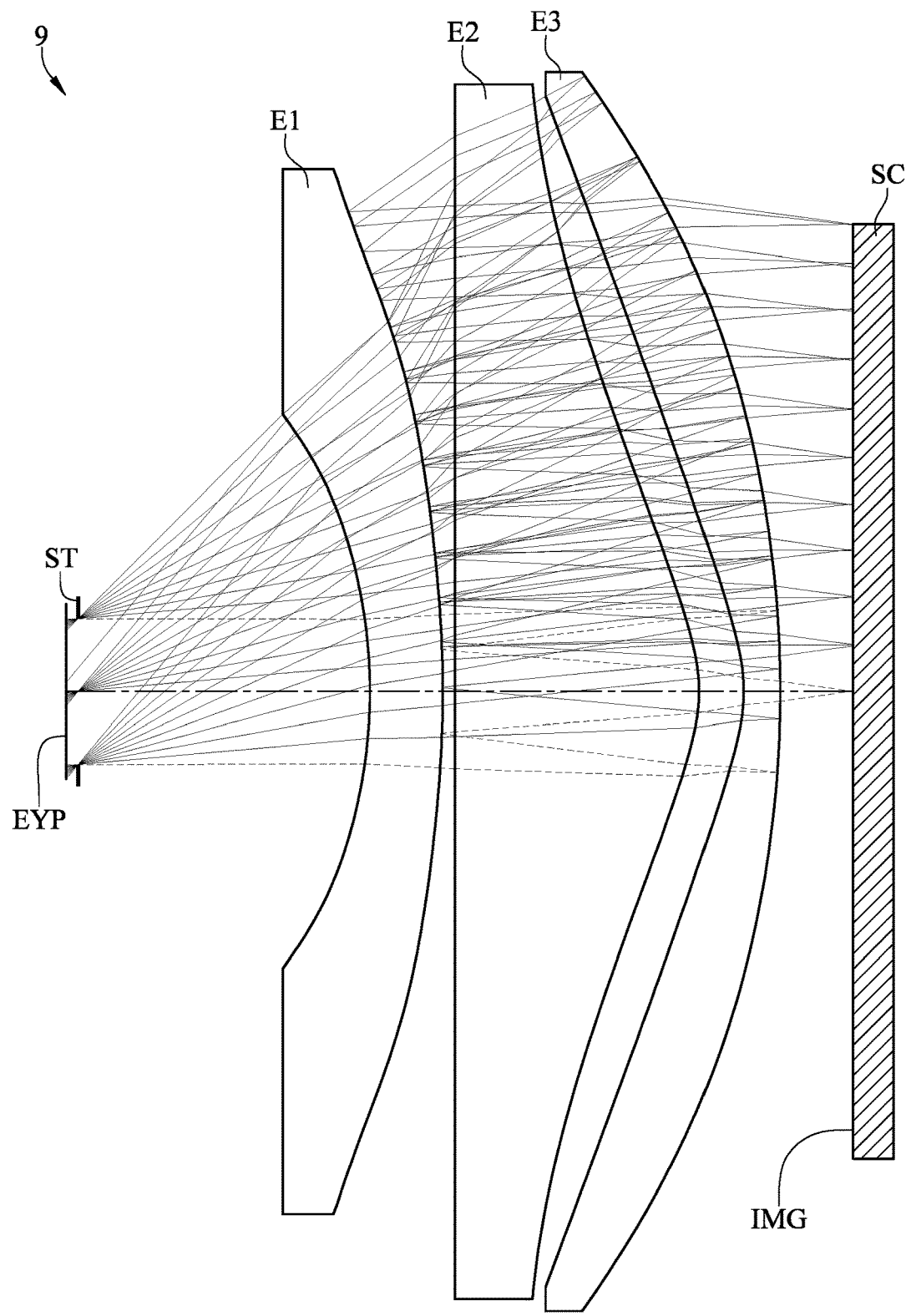
FIG. 11 is a schematic view of an optical system and a display unit according to the 9th embodiment of the present disclosure.

FIG. 11 is a schematic view of an optical system and a display unit according to the 9th embodiment of the present disclosure. The optical system 9 includes, in order from a front side to a rear side, an aperture stop ST, a first optical lens element E1, a reflective polarizer (not shown in figure), a first quarter-wave plate (not shown in figure), a second optical lens element E2, a third optical lens element E3, a partial reflector (not shown in figure), a second quarter-wave plate (not shown in figure) and an image display surface IMG. The display unit SC is disposed on the image display surface IMG. The optical system 9 includes three optical lens elements (E1, E2, and E3) with no additional optical lens element disposed between each of the adjacent three optical lens elements. The reflective polarizer, the first quarter-wave plate, the partial reflector and the second quarter-wave plate of the optical system 9 mentioned above in this embodiment have the same or similar structural features as those of the optical system 1 in the 1st embodiment, so the components are not shown in FIG. 11 for the purpose of clarity and conciseness.

The first optical lens element E1 with negative refractive power has a front-side surface being concave and a rear-side surface being convex. The first optical lens element E1 is made of plastic material and has the front-side surface and the rear-side surface being both aspheric. The rear-side surface of the first optical lens element E1 has at least one inflection point.

The second optical lens element E2 with positive refractive power has a front-side surface being planar and a rear-side surface being convex. The second optical lens element E2 is made of plastic material and has the rear-side surface being aspheric.

The third optical lens element E3 with negative refractive power has a front-side surface being concave and a rear-side surface being convex. The third optical lens element E3 is made of plastic material and has the front-side surface and the rear-side surface being both aspheric.

The reflective polarizer is attached to the rear-side surface of the first optical lens element E1, and the first quarter-wave plate is attached to one side of the reflective polarizer located away from the first optical lens element E1.

The partial reflector is attached to the rear-side surface of the third optical lens element E3.

The second quarter-wave plate is located between the partial reflector and the image display surface IMG.

An imaging light emitted by the display unit SC from the image display surface IMG sequentially passes through the second quarter-wave plate, the partial reflector, the first quarter-wave plate and the reflective polarizer. More specifically, an imaging light in a vertical polarization state is emitted from the image display surface IMG, then the imaging light passes through the second quarter-wave plate and is converted into a circular polarization state by the second quarter-wave plate, and then, the imaging light in the circular polarization state passes through the partial reflector, the third optical lens element E3, the second optical lens element E2 and the first quarter-wave plate, and the polarization state of the imaging light is converted by the first quarter-wave plate for the first time into a horizontal polarization state. Then, the imaging light in the horizontal polarization state is reflected by the reflective polarizer and passes through the first quarter-wave plate again, and the polarization state of the imaging light is converted by the first quarter-wave plate for the second time into a circular polarization state. Then, the imaging light in the circular polarization state passes through the second optical lens element E2 and third optical lens element E3 and is reflected by the partial reflector. Then, the imaging light passes through the third optical lens element E3, the second optical lens element E2 and the first quarter-wave plate, and the polarization state of the imaging light is converted by the first quarter-wave plate for the third time into a vertical polarization state, such that the imaging light in the vertical polarization state can pass through the reflective polarizer. Then, the imaging light sequentially passes through the first optical lens element E1 and the aperture stop ST, and arrives at, for example, a position EYP where a user's eye is located.

The detailed optical data of the 9th embodiment are shown in Table 9A and the aspheric surface data are shown in Table 9B below.

TABLE 9A

9th Embodiment
f = 20.76 mm, Fno = 3.46, HFOV = 50.0 deg.

| Surface # | | Curvature Radius | Thickness | Material | Index | Abbe # | Refraction/ Reflection |
|---|---|---|---|---|---|---|---|
| 0 | | Plano | −1500.000 | | | | Refraction |
| 1 | ST | Plano | 12.000 | | | | Refraction |
| 2 | E1 | −20.4554 (ASP) | 2.999 | Plastic | 1.650 | 21.5 | Refraction |
| 3 | | −45.5000 (ASP) | 0.499 | | | | Refraction |
| 4 | E2 | Plano | 10.045 | Plastic | 1.490 | 57.3 | Refraction |
| 5 | | −6.5509 (ASP) | 1.827 | | | | Refraction |
| 6 | E3 | −6.5288 (ASP) | 1.499 | Plastic | 1.490 | 57.3 | Refraction |

TABLE 9A-continued

9th Embodiment
f = 20.76 mm, Fno = 3.46, HFOV = 50.0 deg.

| Surface # | | Curvature Radius | | Thickness | Material | Index | Abbe # | Refraction/Reflection |
|---|---|---|---|---|---|---|---|---|
| 7 | E3 | −45.7008 | (ASP) | −1.499 | Plastic | 1.490 | 57.3 | Reflection |
| 8 | | −6.5288 | (ASP) | −1.827 | | | | Refraction |
| 9 | E2 | −6.5509 | (ASP) | 10.045 | Plastic | 1.490 | 57.3 | Refraction |
| 10 | | Plano | | −0.499 | | | | Refraction |
| 11 | | −45.5000 | (ASP) | 0.499 | | | | Reflection |
| 12 | E2 | Plano | | 10.045 | Plastic | 1.490 | 57.3 | Refraction |
| 13 | | −6.5509 | (ASP) | 1.827 | | | | Refraction |
| 14 | E3 | −6.5288 | (ASP) | 1.499 | Plastic | 1.490 | 57.3 | Refraction |
| 15 | | −45.7008 | (ASP) | 3.000 | | | | Refraction |
| 16 | IMG | Plano | | 0.000 | | | | Refraction |

Note:
Reference wavelength is 587.6 nm (d-line).

TABLE 9A

| | | | Aspheric Coefficients | | | |
|---|---|---|---|---|---|---|
| Surface # | 2 | 3 | 4 | 5 | 6 | 7 |
| k = | 0.00000 | 0.00000 | — | −7.34374 | −8.84997 | −12.03931 |
| A4 = | 4.27091E−05 | 3.92512E−05 | — | 6.24135E−06 | −1.10051E−06 | −1.20828E−05 |
| A6 = | −3.65761E−07 | −2.48948E−07 | — | −1.46504E−09 | 9.27979E−10 | 5.60762E−09 |
| A8 = | −4.42365E−09 | 5.64884E−10 | — | — | — | — |
| A10 = | 4.17634E−11 | −3.71308E−13 | — | — | — | — |
| A12 = | −6.72564E−14 | −8.73737E−17 | — | — | — | — |

In the 9th embodiment, the equation of the aspheric surface profiles of the aforementioned optical lens elements is the same as the equation of the 1st embodiment. Also, the definitions of these parameters shown in Table 9C below are the same as those stated in the 1st embodiment with corresponding values for the 9th embodiment, so an explanation in this regard will not be provided again.

Moreover, these parameters can be calculated from Table 9A and Table 9B

TABLE 9C

| Values of Conditional Expressions | | | |
|---|---|---|---|
| f [mm] | 20.76 | V2/N2 | 38.42 |
| Fno | 3.46 | V3/N3 | 38.42 |
| HFOV [deg.] | 50.0 | f/ImgH | 1.08 |
| ER [mm] | 12.00 | SL/ImgH | 1.66 |
| EPD [mm] | 6.00 | SL/f | 1.54 |
| ImgH [mm] | 19.20 | EPD/ImgH | 0.31 |
| f1 [mm] | −59.92 | tan(HFOV)/f | 0.06 |
| f2 [mm] | 13.32 | ER/SL | 0.38 |
| f3 [mm] | −15.69 | TD/SL | 0.53 |
| R6/R5 | 7.00 | (CT1 + CT2 + CT3)/(T12 + T23) | 6.25 |
| |R2/R1| | 2.22 | (CT1 + CT2 + CT3)/SL | 0.46 |
| f/f1 | −0.35 | (T12 + T23)/TD | 0.14 |
| f/f2 | 1.56 | R1/R6 | 0.45 |
| f/f3 | −1.32 | (R1 + R2)/(R1 − R2) | −2.63 |
| V1/N1 | 13.03 | (R5 + R6)/(R5 − R6) | −1.33 |

10th Embodiment

Figure 12:
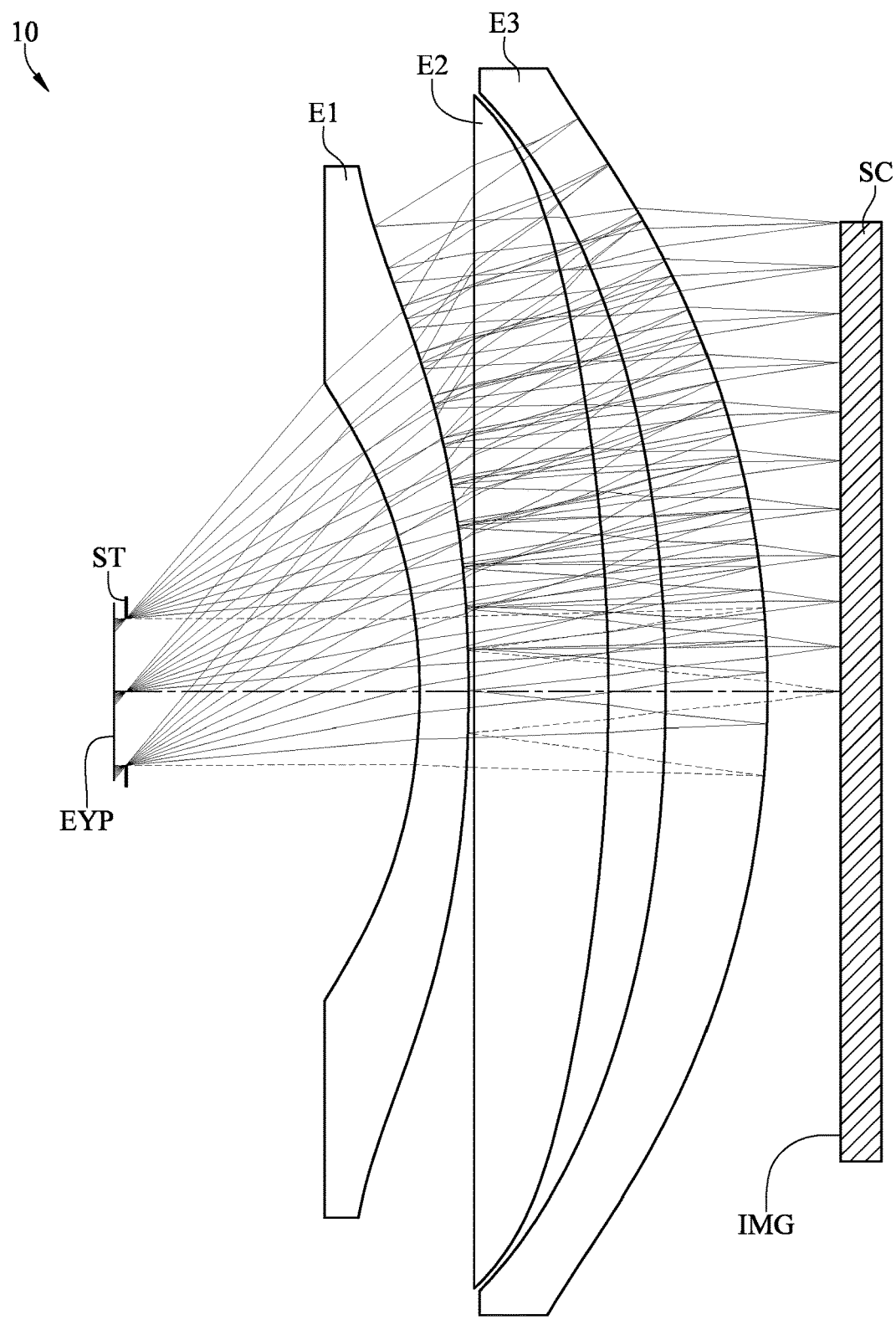
FIG. 12 is a schematic view of an optical system and a display unit according to the 10th embodiment of the present disclosure.

FIG. 12 is a schematic view of an optical system and a display unit according to the 10th embodiment of the present disclosure. The optical system 10 includes, in order from a front side to a rear side, an aperture stop ST, a first optical lens element E1, a reflective polarizer (not shown in figure), a first quarter-wave plate (not shown in figure), a second optical lens element E2, a third optical lens element E3, a partial reflector (not shown in figure), a second quarter-wave plate (not shown in figure) and an image display surface IMG. The display unit SC is disposed on the image display surface IMG. The optical system 10 includes three optical lens elements (E1, E2, and E3) with no additional optical lens element disposed between each of the adjacent three optical lens elements. The reflective polarizer, the first quarter-wave plate, the partial reflector and the second quarter-wave plate of the optical system 10 mentioned above in this embodiment have the same or similar structural features as those of the optical system 1 in the 1st embodiment, so the components are not shown in FIG. 12 for the purpose of clarity and conciseness.

The first optical lens element E1 with negative refractive power has a front-side surface being concave and a rear-side surface being convex. The first optical lens element E1 is made of plastic material and has the front-side surface and the rear-side surface being both aspheric. The rear-side surface of the first optical lens element E1 has at least one inflection point.

The second optical lens element E2 with positive refractive power has a front-side surface being planar and a rear-side surface being convex. The second optical lens element E2 is made of plastic material and has the rear-side surface being aspheric.

The third optical lens element E3 with positive refractive power has a front-side surface being concave and a rear-side surface being convex. The third optical lens element E3 is made of plastic material and has the front-side surface and the rear-side surface being both aspheric.

The reflective polarizer is attached to the rear-side surface of the first optical lens element E1, and the first quarter-wave plate is attached to one side of the reflective polarizer located away from the first optical lens element E1.

The partial reflector is attached to the rear-side surface of the third optical lens element E3.

The second quarter-wave plate is located between the partial reflector and the image display surface IMG.

An imaging light emitted by the display unit SC from the image display surface IMG sequentially passes through the second quarter-wave plate, the partial reflector, the first quarter-wave plate and the reflective polarizer. More specifically, an imaging light in a vertical polarization state is emitted from the image display surface IMG, then the imaging light passes through the second quarter-wave plate and is converted into a circular polarization state by the second quarter-wave plate, and then, the imaging light in the circular polarization state passes through the partial reflector, the third optical lens element E3, the second optical lens element E2 and the first quarter-wave plate, and the polarization state of the imaging light is converted by the first quarter-wave plate for the first time into a horizontal polarization state. Then, the imaging light in the horizontal polarization state is reflected by the reflective polarizer and passes through the first quarter-wave plate again, and the polarization state of the imaging light is converted by the first quarter-wave plate for the second time into a circular polarization state. Then, the imaging light in the circular polarization state passes through the second optical lens element E2 and third optical lens element E3 and is reflected by the partial reflector. Then, the imaging light passes through the third optical lens element E3, the second optical lens element E2 and the first quarter-wave plate, and the polarization state of the imaging light is converted by the first quarter-wave plate for the third time into a vertical polarization state, such that the imaging light in the vertical polarization state can pass through the reflective polarizer. Then, the imaging light sequentially passes through the first optical lens element E1 and the aperture stop ST, and arrives at, for example, a position EYP where a user's eye is located.

The detailed optical data of the 10th embodiment are shown in Table 10A and the aspheric surface data are shown in Table 10B below.

TABLE 10A

10th Embodiment
f = 21.11 mm, Fno = 3.52, HFOV = 50.0 deg.

| Surface # | | Curvature Radius | Thickness | Material | Index | Abbe # | Refraction/Reflection |
|---|---|---|---|---|---|---|---|
| 0 | | Plano | −1500.000 | | | | Refraction |
| 1 | ST | Plano | 12.000 | | | | Refraction |
| 2 | E1 | −24.2161 (ASP) | 2.013 | Plastic | 1.650 | 21.5 | Refraction |
| 3 | | −55.8088 (ASP) | 0.200 | | | | Refraction |
| 4 | E2 | Plano | 5.505 | Plastic | 1.490 | 57.3 | Refraction |
| 5 | | −72.9594 (ASP) | 2.342 | | | | Refraction |
| 6 | E3 | −59.5144 (ASP) | 4.157 | Plastic | 1.490 | 57.3 | Refraction |
| 7 | E3 | −40.6935 (ASP) | −4.157 | Plastic | 1.490 | 57.3 | Reflection |
| 8 | | −59.5144 (ASP) | −2.342 | | | | Refraction |
| 9 | E2 | −72.9594 (ASP) | −5.505 | Plastic | 1.490 | 57.3 | Refraction |
| 10 | | Plano | −0.200 | | | | Refraction |
| 11 | | −55.8088 (ASP) | 0.200 | | | | Reflection |
| 12 | E2 | Plano | 5.505 | Plastic | 1.490 | 57.3 | Refraction |
| 13 | | −72.9594 (ASP) | 2.342 | | | | Refraction |
| 14 | E3 | −59.5144 (ASP) | 4.157 | Plastic | 1.490 | 57.3 | Refraction |
| 15 | | −40.6935 (ASP) | 3.000 | | | | Refraction |
| 16 | IMG | Plano | 0.000 | | | | Refraction |

Note:
Reference wavelength is 587.6 nm (d-line).

TABLE 10B

Aspheric Coefficients

| Surface # | 2 | 3 | 4 | 5 | 6 | 7 |
|---|---|---|---|---|---|---|
| k = | −1.42359 | −1.13436 | — | −0.61962 | 0.98651 | −0.51826 |
| A4 = | −3.68242E−05 | −1.21964E−05 | — | 5.81373E−07 | −4.97494E−06 | −3.10183E−06 |
| A6 = | 1.50200E−07 | −2.17351E−09 | — | 4.75275E−09 | 7.81120E−10 | 6.21457E−10 |
| A8 = | −2.52922E−09 | 8.66147E−11 | — | −1.04628E−11 | −5.09920E−13 | −5.60859E−13 |
| A10 = | 1.63741E−11 | −6.64305E−14 | — | −9.09150E−15 | 3.07134E−15 | −2.19297E−15 |
| A12 = | −2.49596E−14 | −1.32320E−17 | — | −1.32217E−17 | −1.30176E−17 | 1.19244E−17 |

In the 10th embodiment, the equation of the aspheric surface profiles of the aforementioned optical lens elements is the same as the equation of the 1st embodiment. Also, the definitions of these parameters shown in Table 10C below are the same as those stated in the 1st embodiment with corresponding values for the 10th embodiment, so an explanation in this regard will not be provided again.

Moreover, these parameters can be calculated from Table 10A and Table 10B as the following values and satisfy the following conditions:

TABLE 10C

Values of Conditional Expressions

| f [mm] | 21.11 | V2/N2 | 38.42 |
|---|---|---|---|
| Fno | 3.52 | V3/N3 | 38.42 |
| HFOV [deg.] | 50.0 | f/ImgH | 1.10 |
| ER [mm] | 12.00 | SL/ImgH | 1.52 |
| EPD [mm] | 6.00 | SL/f | 1.38 |
| ImgH [mm] | 19.20 | EPD/ImgH | 0.31 |
| f1 [mm] | −67.41 | tan(HFOV)/f | 0.06 |
| f2 [mm] | 148.36 | ER/SL | 0.41 |
| f3 [mm] | 243.90 | TD/SL | 0.49 |
| R6/R5 | 0.68 | (CT1 + CT2 + CT3)/(T12 + T23) | 4.59 |
| |R2/R1| | 2.30 | (CT1 + CT2 + CT3)/SL | 0.40 |
| f/f1 | −0.31 | (T12 + T23)/TD | 0.18 |
| f/f2 | 0.14 | R1/R6 | 0.60 |
| f/f3 | 0.09 | (R1 + R2)/(R1 − R2) | −2.53 |
| V1/N1 | 13.03 | (R5 + R6)/(R5 − R6) | 5.32 |

Figure 13:
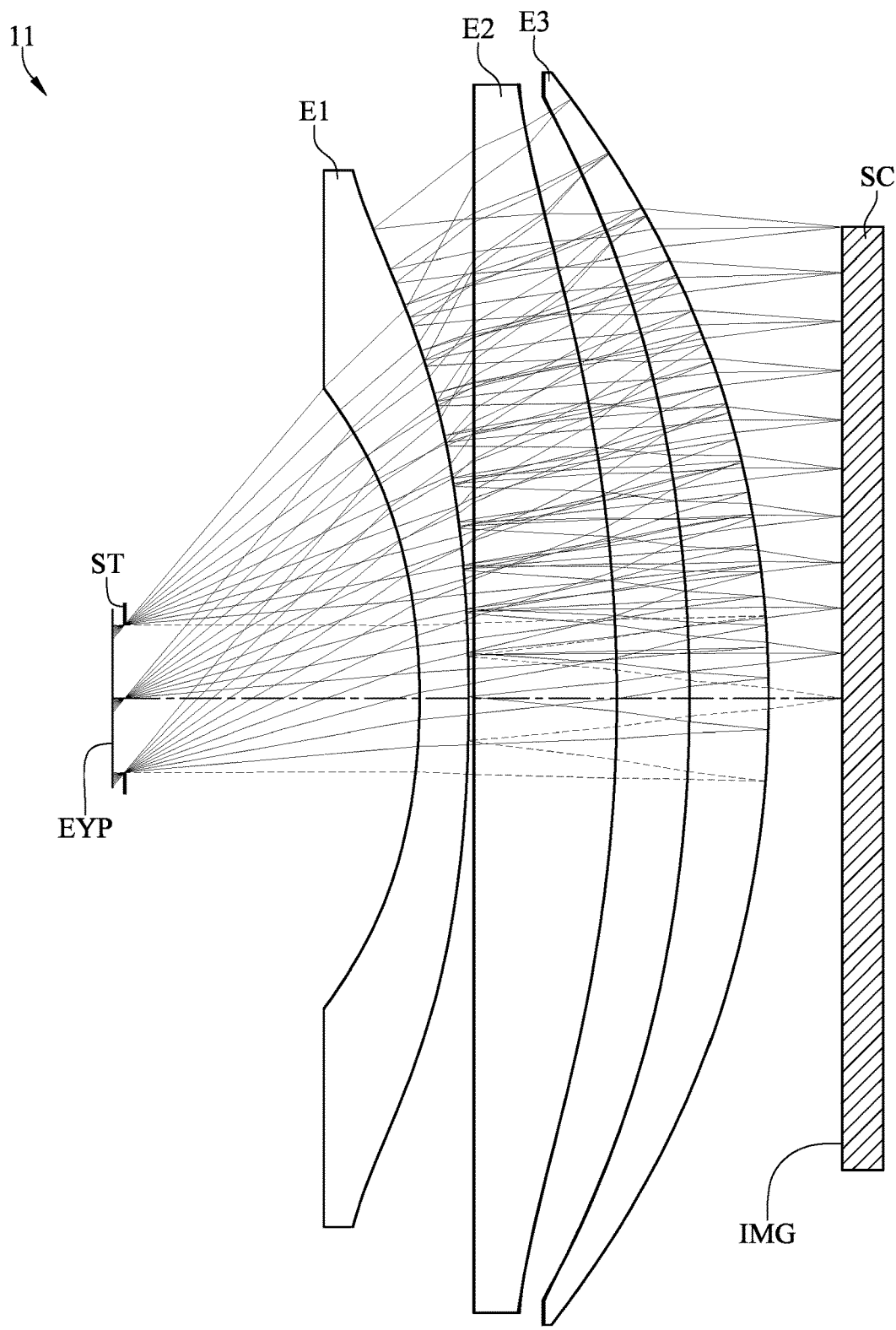
FIG. 13 is a schematic view of an optical system and a display unit according to the 11th embodiment of the present disclosure.

FIG. 13 is a schematic view of an optical system and a display unit according to the 11th embodiment of the present disclosure. The optical system 11 includes, in order from a front side to a rear side, an aperture stop ST, a first optical lens element E1, a reflective polarizer (not shown in figure), a first quarter-wave plate (not shown in figure), a second optical lens element E2, a third optical lens element E3, a partial reflector (not shown in figure), a second quarter-wave plate (not shown in figure) and an image display surface IMG. The display unit SC is disposed on the image display surface IMG. The optical system 11 includes three optical lens elements (E1, E2, and E3) with no additional optical lens element disposed between each of the adjacent three optical lens elements. The reflective polarizer, the first quarter-wave plate, the partial reflector and the second quarter-wave plate of the optical system 11 mentioned above in this embodiment have the same or similar structural features as those of the optical system 1 in the 1st embodiment, so the components are not shown in FIG. 13 for the purpose of clarity and conciseness.

The first optical lens element E1 with negative refractive power has a front-side surface being concave and a rear-side surface being convex. The first optical lens element E1 is made of plastic material and has the front-side surface and the rear-side surface being both aspheric. The rear-side surface of the first optical lens element E1 has at least one inflection point.

The second optical lens element E2 with positive refractive power has a front-side surface being planar and a rear-side surface being convex. The second optical lens element E2 is made of plastic material and has the rear-side surface being aspheric.

The third optical lens element E3 with positive refractive power has a front-side surface being concave and a rear-side surface being convex. The third optical lens element E3 is made of plastic material and has the front-side surface and the rear-side surface being both aspheric.

The reflective polarizer is attached to the rear-side surface of the first optical lens element E1, and the first quarter-wave plate is attached to one side of the reflective polarizer located away from the first optical lens element E1.

The partial reflector is attached to the rear-side surface of the third optical lens element E3.

The second quarter-wave plate is located between the partial reflector and the image display surface IMG.

An imaging light emitted by the display unit SC from the image display surface IMG sequentially passes through the second quarter-wave plate, the partial reflector, the first quarter-wave plate and the reflective polarizer. More specifically, an imaging light in a vertical polarization state is emitted from the image display surface IMG, then the imaging light passes through the second quarter-wave plate and is converted into a circular polarization state by the second quarter-wave plate, and then, the imaging light in the circular polarization state passes through the partial reflector, the third optical lens element E3, the second optical lens element E2 and the first quarter-wave plate, and the polarization state of the imaging light is converted by the first quarter-wave plate for the first time into a horizontal polarization state. Then, the imaging light in the horizontal polarization state is reflected by the reflective polarizer and passes through the first quarter-wave plate again, and the polarization state of the imaging light is converted by the first quarter-wave plate for the second time into a circular polarization state. Then, the imaging light in the circular polarization state passes through the second optical lens element E2 and third optical lens element E3 and is reflected by the partial reflector. Then, the imaging light passes through the third optical lens element E3, the second optical lens element E2 and the first quarter-wave plate, and the polarization state of the imaging light is converted by the first quarter-wave plate for the third time into a vertical polarization state, such that the imaging light in the vertical polarization state can pass through the reflective polarizer. Then, the imaging light sequentially passes through the first optical lens element E1 and the aperture stop ST, and arrives at, for example, a position EYP where a user's eye is located.

The detailed optical data of the 11th embodiment are shown in Table 11A and the aspheric surface data are shown in Table 11B below.

TABLE 11A

11th Embodiment
f = 21.01 mm, Fno = 3.50, HFOV = 50.0 deg.

| Surface # | | Curvature Radius | | Thickness | Material | Index | Abbe # | Refraction/Reflection |
|---|---|---|---|---|---|---|---|---|
| 0 | | Plano | | −1500.000 | | | | Refraction |
| 1 | ST | Plano | | 12.000 | | | | |
| 2 | E1 | −27.9314 | (ASP) | 2.000 | Plastic | 1.650 | 21.5 | Refraction |
| 3 | | −69.3076 | (ASP) | 0.200 | | | | Refraction |
| 4 | E2 | Plano | | 5.821 | Plastic | 1.490 | 57.3 | Refraction |

TABLE 11A-continued

11th Embodiment
f = 21.01 mm, Fno = 3.50, HFOV = 50.0 deg.

| Surface # | | Curvature Radius | | Thickness | Material | Index | Abbe # | Refraction/ Reflection |
|---|---|---|---|---|---|---|---|---|
| 5 | | −62.7758 | (ASP) | 2.965 | | | | Refraction |
| 6 | E3 | −60.8242 | (ASP) | 3.204 | Plastic | 1.490 | 57.3 | Refraction |
| 7 | E3 | −43.7252 | (ASP) | −3.204 | Plastic | 1.490 | 57.3 | Reflection |
| 8 | | −60.8242 | (ASP) | −2.965 | | | | Refraction |
| 9 | E2 | −62.7758 | (ASP) | −5.821 | Plastic | 1.490 | 57.3 | Refraction |
| 10 | | Plano | | −0.200 | | | | Refraction |
| 11 | | −69.3076 | (ASP) | 0.200 | | | | Reflection |
| 12 | E2 | Plano | | 5.821 | Plastic | 1.490 | 57.3 | Refraction |
| 13 | | −62.7758 | (ASP) | 2.965 | | | | Refraction |
| 14 | E3 | −60.8242 | (ASP) | 3.204 | Plastic | 1.490 | 57.3 | Refraction |
| 15 | | −43.7252 | (ASP) | 3.000 | | | | Refraction |
| 16 | IMG | Plano | | 0.000 | | | | Refraction |

Note:
Reference wavelength is 587.6 nm (d-line).

TABLE 11B

Aspheric Coefficients

| Surface # | 2 | 3 | 4 | 5 | 6 | 7 |
|---|---|---|---|---|---|---|
| k = | −0.65310 | −0.00632 | — | 0.99952 | 0.99068 | −0.52637 |
| A4 = | −4.41520E−05 | −1.19917E−05 | — | −2.63433E−07 | −2.40469E−06 | −3.25427E−06 |
| A6 = | 1.54506E−07 | −1.24901E−08 | — | 6.25230E−09 | 1.32403E−09 | 7.13196E−10 |
| A8 = | −2.37272E−09 | 6.26502E−11 | — | −7.14888E−13 | −1.51674E−12 | 2.07286E−13 |
| A10 = | 1.18642E−11 | −1.89063E−14 | — | −2.08754E−15 | −1.07676E−15 | 3.39545E−16 |
| A12 = | −1.15522E−14 | 2.93132E−18 | — | 6.11448E−18 | 7.28818E−18 | 3.66917E−19 |

In the 11th embodiment, the equation of the aspheric surface profiles of the aforementioned optical lens elements is the same as the equation of the 1st embodiment. Also, the definitions of these parameters shown in Table 11C below are the same as those stated in the 1st embodiment with corresponding values for the 11th embodiment, so an explanation in this regard will not be provided again.

Moreover, these parameters can be calculated from Table 11A and Table 11 B as the following values and satisfy the following conditions:

TABLE 11C

Values of Conditional Expressions

| f [mm] | 21.01 | V2/N2 | 38.42 |
|---|---|---|---|
| Fnc | 3.50 | V3/N3 | 38.42 |
| HFOV [deg.] | 50.0 | f/ImgH | 1.09 |
| ER [mm] | 12.00 | SL/ImgH | 1.52 |
| EPD [mm] | 6.00 | SL/f | 1.39 |
| ImgH [mm] | 19.20 | EPD/ImgH | 0.31 |
| f1 [mm] | −73.27 | tan(HFOV)/f | 0.06 |
| f2 [mm] | 127.65 | ER/SL | 0.41 |
| f3 [mm] | 297.87 | TD/SL | 0.49 |
| R6/R5 | 0.72 | (CT1 + CT2 + CT3)/(T12 + T23) | 3.48 |
| |R2/R1| | 2.48 | (CT1 + CT2 + CT3)/SL | 0.38 |
| f/f1 | −0.29 | (T12 + T23)/TD | 0.22 |
| f/f2 | 0.16 | R1/R6 | 0.64 |
| f/f3 | 0.07 | (R1 + R2)/(R1 − R2) | −2.35 |
| V1/N1 | 13.03 | (R5 + R6)/(R5 − R6) | 6.12 |

12th Embodiment

Figure 14:
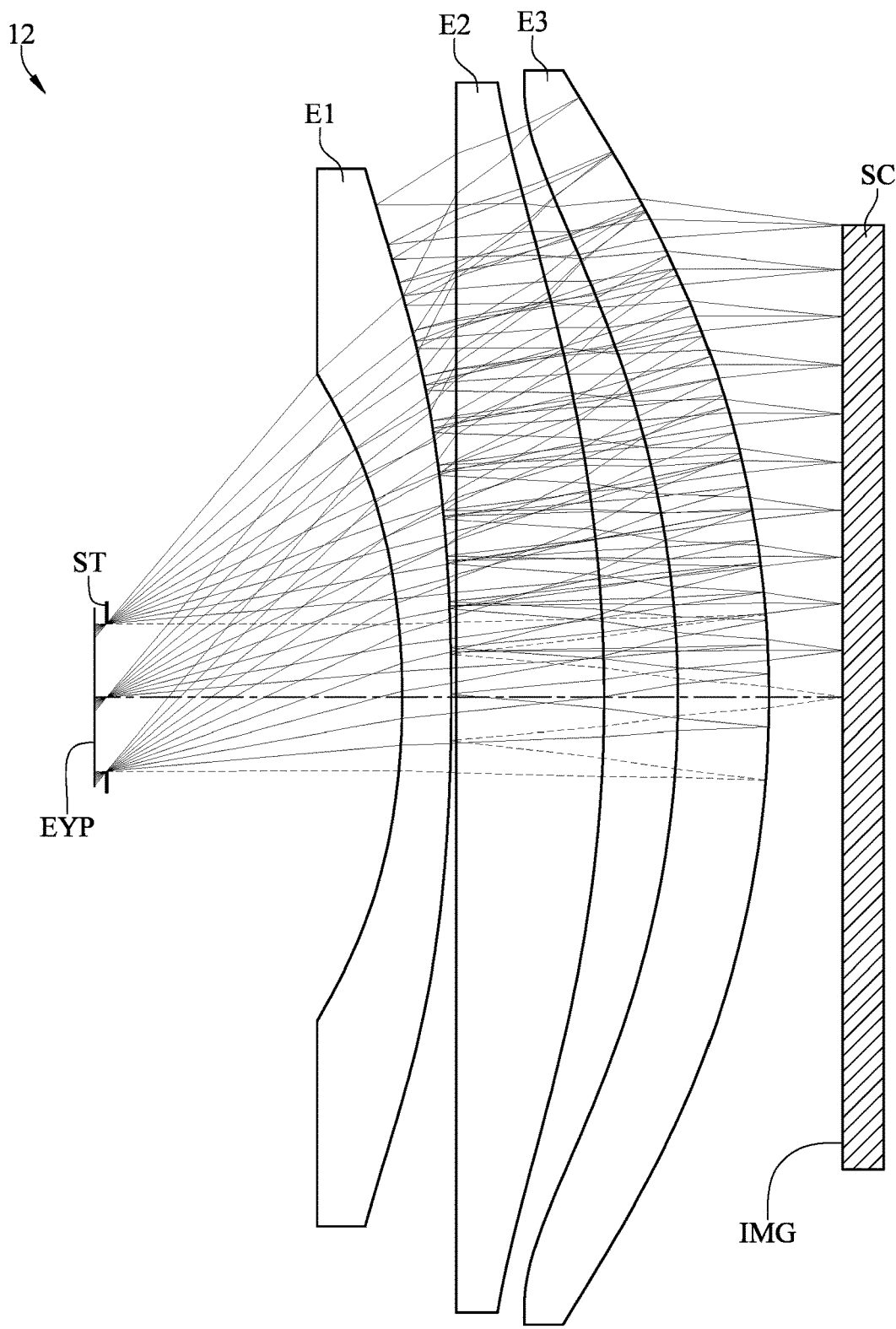
FIG. 14 is a schematic view of an optical system and a display unit according to the 12th embodiment of the present disclosure.

FIG. 14 is a schematic view of an optical system and a display unit according to the 12th embodiment of the present disclosure. The optical system 12 includes, in order from a front side to a rear side, an aperture stop ST, a first optical lens element E1, a reflective polarizer (not shown in figure), a first quarter-wave plate (not shown in figure), a second optical lens element E2, a third optical lens element E3, a partial reflector (not shown in figure), a second quarter-wave plate (not shown in figure) and an image display surface IMG. The display unit SC is disposed on the image display surface IMG. The optical system 12 includes three optical lens elements (E1, E2, and E3) with no additional optical lens element disposed between each of the adjacent three optical lens elements. The reflective polarizer, the first quarter-wave plate, the partial reflector and the second quarter-wave plate of the optical system 12 mentioned above in this embodiment have the same or similar structural features as those of the optical system 1 in the 1st embodiment, so the components are not shown in FIG. 14 for the purpose of clarity and conciseness.

The first optical lens element E1 with negative refractive power has a front-side surface being concave and a rear-side surface being convex. The first optical lens element E1 is made of plastic material and has the front-side surface and the rear-side surface being both aspheric. The rear-side surface of the first optical lens element E1 has at least one inflection point.

The second optical lens element E2 with positive refractive power has a front-side surface being planar and a rear-side surface being convex. The second optical lens element E2 is made of plastic material and has the rear-side surface being aspheric.

The third optical lens element E3 with negative refractive power has a front-side surface being concave and a rear-side surface being convex. The third optical lens element E3 is made of plastic material and has the front-side surface and the rear-side surface being both aspheric.

The reflective polarizer is attached to the rear-side surface of the first optical lens element E1, and the first quarter-wave plate is attached to one side of the reflective polarizer located away from the first optical lens element E1.

The partial reflector is attached to the rear-side surface of the third optical lens element E3.

The second quarter-wave plate is located between the partial reflector and the image display surface IMG.

An imaging light emitted by the display unit SC from the image display surface IMG sequentially passes through the second quarter-wave plate, the partial reflector, the first quarter-wave plate and the reflective polarizer. More specifically, an imaging light in a vertical polarization state is emitted from the image display surface IMG, then the imaging light passes through the second quarter-wave plate and is converted into a circular polarization state by the second quarter-wave plate, and then, the imaging light in the circular polarization state passes through the partial reflector, the third optical lens element E3, the second optical lens element E2 and the first quarter-wave plate, and the polarization state of the imaging light is converted by the first quarter-wave plate for the first time into a horizontal polarization state. Then, the imaging light in the horizontal polarization state is reflected by the reflective polarizer and passes through the first quarter-wave plate again, and the polarization state of the imaging light is converted by the first quarter-wave plate for the second time into a circular polarization state. Then, the imaging light in the circular polarization state passes through the second optical lens element E2 and third optical lens element E3 and is reflected by the partial reflector. Then, the imaging light passes through the third optical lens element E3, the second optical lens element E2 and the first quarter-wave plate, and the polarization state of the imaging light is converted by the first quarter-wave plate for the third time into a vertical polarization state, such that the imaging light in the vertical polarization state can pass through the reflective polarizer. Then, the imaging light sequentially passes through the first optical lens element E1 and the aperture stop ST, and arrives at, for example, a position EYP where a user's eye is located.

The detailed optical data of the 12th embodiment are shown in Table 12A and the aspheric surface data are shown in Table 12B below.

TABLE 12A

12th Embodiment
f = 21.73 mm, Fno = 3.62, HFOV = 50.0 deg.

| Surface # | | Curvature Radius | | Thickness | Material | Index | Abbe # | Refraction/ Reflection |
|---|---|---|---|---|---|---|---|---|
| 0 | | Plano | | −1500.000 | | | | Refraction |
| 1 | ST | Plano | | 12.000 | | | | Refraction |
| 2 | E1 | −33.4504 | (ASP) | 2.000 | Plastic | 1.650 | 21.5 | Refraction |
| 3 | | −95.3395 | (ASP) | 0.200 | | | | Refraction |
| 4 | E2 | Plano | | 6.000 | Plastic | 1.490 | 57.3 | Refraction |
| 5 | | −59.3906 | (ASP) | 3.000 | | | | Refraction |
| 6 | E3 | −41.2090 | (ASP) | 3.688 | Plastic | 1.490 | 57.3 | Refraction |
| 7 | E3 | −43.2695 | (ASP) | −3.688 | Plastic | 1.490 | 57.3 | Reflection |
| 8 | | −41.2090 | (ASP) | −3.000 | | | | Refraction |
| 9 | E2 | −59.3906 | (ASP) | −6.000 | Plastic | 1.490 | 57.3 | Refraction |
| 10 | | Plano | | −0.200 | | | | Refraction |
| 11 | | −95.3395 | (ASP) | 0.200 | | | | Reflection |
| 12 | E2 | Plano | | 6.000 | Plastic | 1.490 | 57.3 | Refraction |
| 13 | | −59.3906 | (ASP) | 3.000 | | | | Refraction |
| 14 | E3 | −41.2090 | (ASP) | 3.688 | Plastic | 1.490 | 57.3 | Refraction |
| 15 | | −43.2695 | (ASP) | 3.000 | | | | Refraction |
| 16 | IMG | Plano | | 0.000 | | | | Refraction |

Note:
Reference wavelength is 587.6 nm (d-line).

TABLE 12B

Aspheric Coefficients

| Surface # | 2 | 3 | 4 | 5 | 6 | 7 |
|---|---|---|---|---|---|---|
| k = | −0.80978 | −9.11128 | — | 0.66850 | −0.01948 | −0.59227 |
| A4 = | −4.31986E−05 | −9.70034E−06 | — | −3.37989E−07 | −8.72240E−07 | −3.15162E−06 |
| A6 = | 1.96963E−07 | −1.19788E−08 | — | 6.20973E−09 | 2.48361E−09 | 1.08609E−09 |
| A8 = | −2.09755E−09 | 6.08423E−11 | — | −5.91800E−12 | 5.52628E−12 | 1.01266E−12 |
| A10 = | 1.21943E−11 | −2.44742E−14 | — | −1.13442E−14 | 7.36921E−15 | 1.40430E−15 |
| A12 = | −2.23203E−14 | −3.05512E−17 | — | 2.49347E−17 | 6.17823E−18 | 1.76645E−18 |

In the 12th embodiment, the equation of the aspheric surface profiles of the aforementioned optical lens elements is the same as the equation of the 1st embodiment. Also, the definitions of these parameters shown in Table 12C below are the same as those stated in the 1st embodiment with corresponding values for the 12th embodiment, so an explanation in this regard will not be provided again.

Moreover, these parameters can be calculated from Table 12A and Table 12B as the following values and satisfy the following conditions:

TABLE 12C

Values of Conditional Expressions

| f [mm] | 21.73 | V2/N2 | 38.42 |
|---|---|---|---|
| Fno | 3.62 | V3/N3 | 38.42 |

TABLE 12C-continued

Values of Conditional Expressions

| | | | |
|---|---|---|---|
| HFOV [deg.] | 50.0 | f/ImgH | 1.13 |
| ER [mm] | 12.00 | SL/ImgH | 1.56 |
| EPD [mm] | 6.00 | SL/f | 1.38 |
| ImgH [mm] | 19.20 | EPD/ImgH | 0.31 |
| f1 [mm] | −80.19 | tan(HFOV)/f | 0.05 |
| f2 [mm] | 120.77 | ER/SL | 0.40 |
| f3 [mm] | 4293.17 | TD/SL | 0.50 |
| R6/R5 | 1.05 | (CT1 + CT2 + CT3)/(T12 + T23) | 3.65 |
| |R2/R1| | 2.85 | (CT1 + CT2 + CT3)/SL | 0.39 |
| f/f1 | −0.27 | (T12 + T23)/TD | 0.21 |
| f/f2 | 0.18 | R1/R6 | 0.77 |
| f/f3 | −0.01 | (R1 + R2)/(R1 − R2) | −2.08 |
| V1/N1 | 13.03 | (R5 + R6)/(R5 − R6) | −41.01 |

Figure 15:
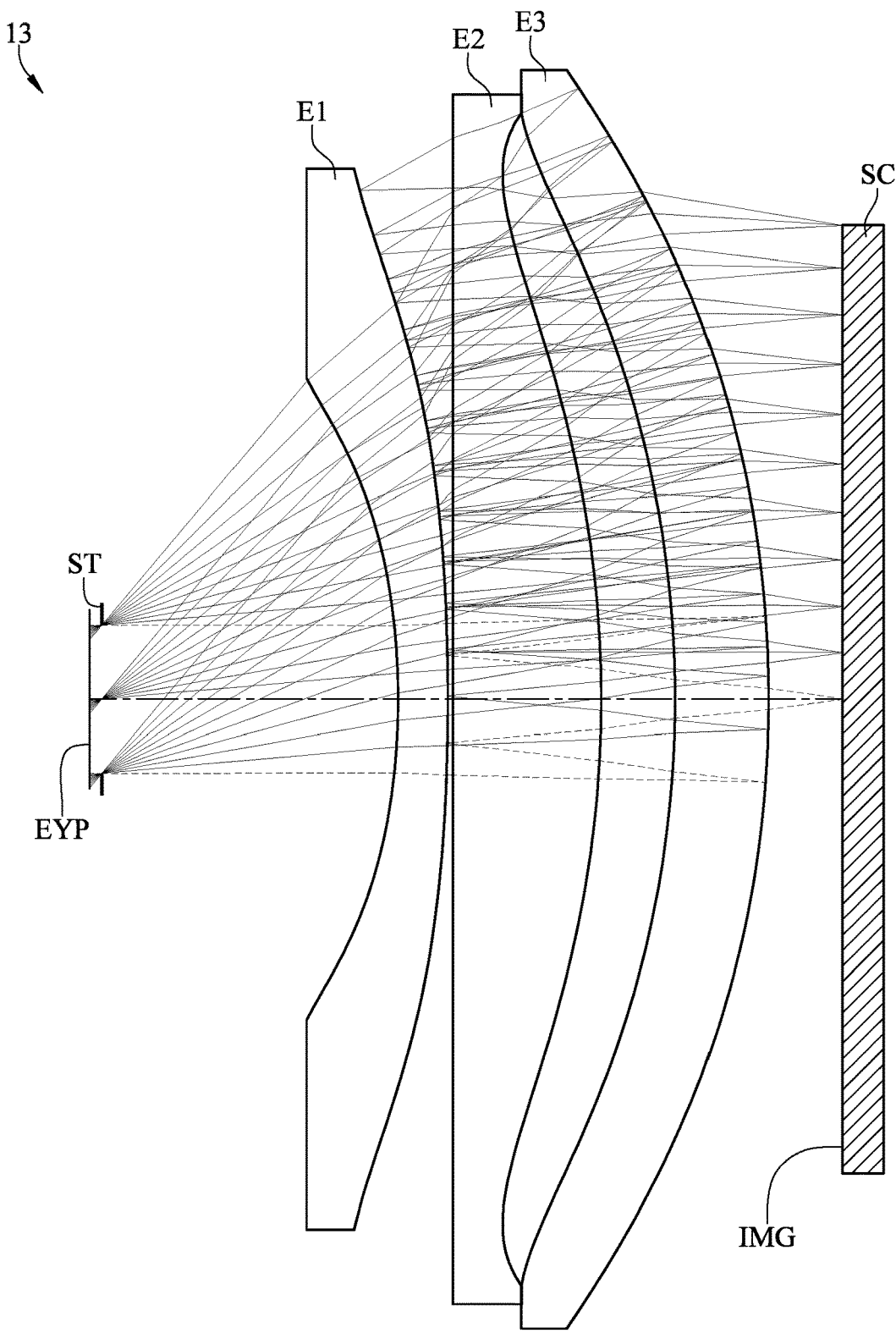
FIG. 15 is a schematic view of an optical system and a display unit according to the 13th embodiment of the present disclosure.

FIG. 15 is a schematic view of an optical system and a display unit according to the 13th embodiment of the present disclosure. The optical system 13 includes, in order from a front side to a rear side, an aperture stop ST, a first optical lens element E1, a reflective polarizer (not shown in figure), a first quarter-wave plate (not shown in figure), a second optical lens element E2, a third optical lens element E3, a partial reflector (not shown in figure), a second quarter-wave plate (not shown in figure) and an image display surface IMG. The display unit SC is disposed on the image display surface IMG. The optical system 13 includes three optical lens elements (E1, E2, and E3) with no additional optical lens element disposed between each of the adjacent three optical lens elements. The reflective polarizer, the first quarter-wave plate, the partial reflector and the second quarter-wave plate of the optical system 13 mentioned above in this embodiment have the same or similar structural features as those of the optical system 1 in the 1st embodiment, so the components are not shown in FIG. 15 for the purpose of clarity and conciseness.

The first optical lens element E1 with negative refractive power has a front-side surface being concave and a rear-side surface being convex. The third optical lens element E3 is made of plastic material and has the front-side surface and the rear-side surface being both aspheric.

The second optical lens element E2 with positive refractive power has a front-side surface being planar and a rear-side surface being convex. The second optical lens element E2 is made of plastic material and has the rear-side surface being aspheric.

The third optical lens element E3 with negative refractive power has a front-side surface being concave and a rear-side surface being convex. The third optical lens element E3 is made of plastic material and has the front-side surface and the rear-side surface being both aspheric.

The reflective polarizer is attached to the rear-side surface of the first optical lens element E1, and the first quarter-wave plate is attached to one side of the reflective polarizer located away from the first optical lens element E1.

The partial reflector is attached to the rear-side surface of the third optical lens element E3.

The second quarter-wave plate is located between the partial reflector and the image display surface IMG.

An imaging light emitted by the display unit SC from the image display surface IMG sequentially passes through the second quarter-wave plate, the partial reflector, the first quarter-wave plate and the reflective polarizer. More specifically, an imaging light in a vertical polarization state is emitted from the image display surface IMG, then the imaging light passes through the second quarter-wave plate and is converted into a circular polarization state by the second quarter-wave plate, and then, the imaging light in the circular polarization state passes through the partial reflector, the third optical lens element E3, the second optical lens element E2 and the first quarter-wave plate, and the polarization state of the imaging light is converted by the first quarter-wave plate for the first time into a horizontal polarization state. Then, the imaging light in the horizontal polarization state is reflected by the reflective polarizer and passes through the first quarter-wave plate again, and the polarization state of the imaging light is converted by the first quarter-wave plate for the second time into a circular polarization state. Then, the imaging light in the circular polarization state passes through the second optical lens element E2 and third optical lens element E3 and is reflected by the partial reflector. Then, the imaging light passes through the third optical lens element E3, the second optical lens element E2 and the first quarter-wave plate, and the polarization state of the imaging light is converted by the first quarter-wave plate for the third time into a vertical polarization state, such that the imaging light in the vertical polarization state can pass through the reflective polarizer. Then, the imaging light sequentially passes through the first optical lens element E1 and the aperture stop ST, and arrives at, for example, a position EYP where a user's eye is located.

The detailed optical data of the 13th embodiment are shown in Table 13A and the aspheric surface data are shown in Table 13B below.

TABLE 13A

13th Embodiment
f = 21.42 mm, Fno = 3.57, HFOV = 50.0 deg.

| Surface # | | Curvature Radius | | Thickness | Material | Index | Abbe # | Refraction/ Reflection |
|---|---|---|---|---|---|---|---|---|
| 0 | | Plano | | −1500.000 | | | | Refraction |
| 1 | ST | Plano | | 12.000 | | | | Refraction |
| 2 | E1 | −30.3273 | (ASP) | 2.025 | Plastic | 1.650 | 21.5 | Refraction |
| 3 | | −89.0836 | (ASP) | 0.200 | | | | Refraction |
| 4 | E2 | Plano | | 6.000 | Plastic | 1.490 | 57.3 | Refraction |
| 5 | | −45.2222 | (ASP) | 2.997 | | | | Refraction |
| 6 | E3 | −43.7437 | (ASP) | 3.778 | Plastic | 1.490 | 57.3 | Refraction |
| 7 | E3 | −45.9309 | (ASP) | −3.778 | Plastic | 1.490 | 57.3 | Reflection |
| 8 | | −43.7437 | (ASP) | −2.997 | | | | Refraction |
| 9 | E2 | −45.2222 | (ASP) | −6.000 | Plastic | 1.490 | 57.3 | Refraction |
| 10 | | Plano | | −0.200 | | | | Refraction |
| 11 | | −89.0836 | (ASP) | 0.200 | | | | Reflection |
| 12 | E2 | Plano | | 6.000 | Plastic | 1.490 | 57.3 | Refraction |

TABLE 13A-continued

13th Embodiment
f = 21.42 mm, Fno = 3.57, HFOV = 50.0 deg.

| Surface # | | Curvature Radius | | Thickness | Material | Index | Abbe # | Refraction/Reflection |
|---|---|---|---|---|---|---|---|---|
| 13 | | −45.2222 | (ASP) | 2.997 | | | | Refraction |
| 14 | E3 | −43.7437 | (ASP) | 3.778 | Plastic | 1.490 | 57.3 | Refraction |
| 15 | | −45.9309 | (ASP) | 3.000 | | | | Refraction |
| 16 | IMG | Plano | | 0.000 | | | | Refraction |

Note:
Reference wavelength is 587.6 nm (d-line).

TABLE 13B

Aspheric Coefficients

| Surface # | 2 | 3 | 4 | 5 | 6 | 7 |
|---|---|---|---|---|---|---|
| k = | −0.10191 | −3.39557 | — | 0.99261 | 0.97733 | −0.59883 |
| A4 = | −4.70657E−05 | −1.22523E−05 | — | 7.57993E−07 | 6.64685E−07 | −3.21273E−06 |
| A6 = | 1.86268E−07 | −8.46643E−09 | — | 7.57275E−09 | 1.65560E−09 | 1.22229E−09 |
| A8 = | −1.79123E−09 | 6.33346E−11 | — | 8.89989E−12 | −1.84214E−12 | 9.46015E−13 |
| A10 = | 7.84395E−12 | −2.47652E−14 | — | 9.97687E−15 | 4.06204E−15 | 4.67035E−16 |
| A12 = | 1.08260E−15 | −2.22220E−17 | — | 3.56034E−17 | 3.25636E−17 | −7.73429E−19 |

In the 13th embodiment, the equation of the aspheric surface profiles of the aforementioned optical lens elements is the same as the equation of the 1st embodiment. Also, the definitions of these parameters shown in Table 13C below are the same as those stated in the 1st embodiment with corresponding values for the 13th embodiment, so an explanation in this regard will not be provided again.

Moreover, these parameters can be calculated from Table 13A and Table 13B as the following values and satisfy the following conditions:

TABLE 13C

Values of Conditional Expressions

| | | | |
|---|---|---|---|
| f [mm] | 21.42 | V2/N2 | 38.42 |
| Fno | 3.57 | V3/N3 | 38.42 |
| HFOV [deg.] | 50.0 | f/ImgH | 1.12 |
| ER [mm] | 12.00 | SL/ImgH | 1.56 |
| EPD [mm] | 6.00 | SL/f | 1.40 |
| ImgH [mm] | 19.20 | EPD/ImgH | 0.31 |
| f1 [mm] | −71.61 | tan(HFOV)/f | 0.06 |
| f2 [mm] | 91.96 | ER/SL | 0.40 |
| f3 [mm] | −4338.54 | TD/SL | 0.50 |
| R6/R5 | 1.05 | (CT1 + CT2 + CT3)/(T12 + T23) | 3.69 |
| |R2/R1| | 2.94 | (CT1 + CT2 + CT3)/SL | 0.39 |
| f/f1 | −0.30 | (T12 + T23)/TD | 0.21 |
| f/f2 | 0.23 | R1/R6 | 0.66 |
| f/f3 | −0.005 | (R1 + R2)/(R1 − R2) | −2.03 |
| V1/N1 | 13.03 | (R5 + R6)/(R5 − R6) | −40.95 |

14th Embodiment

Figure 16:
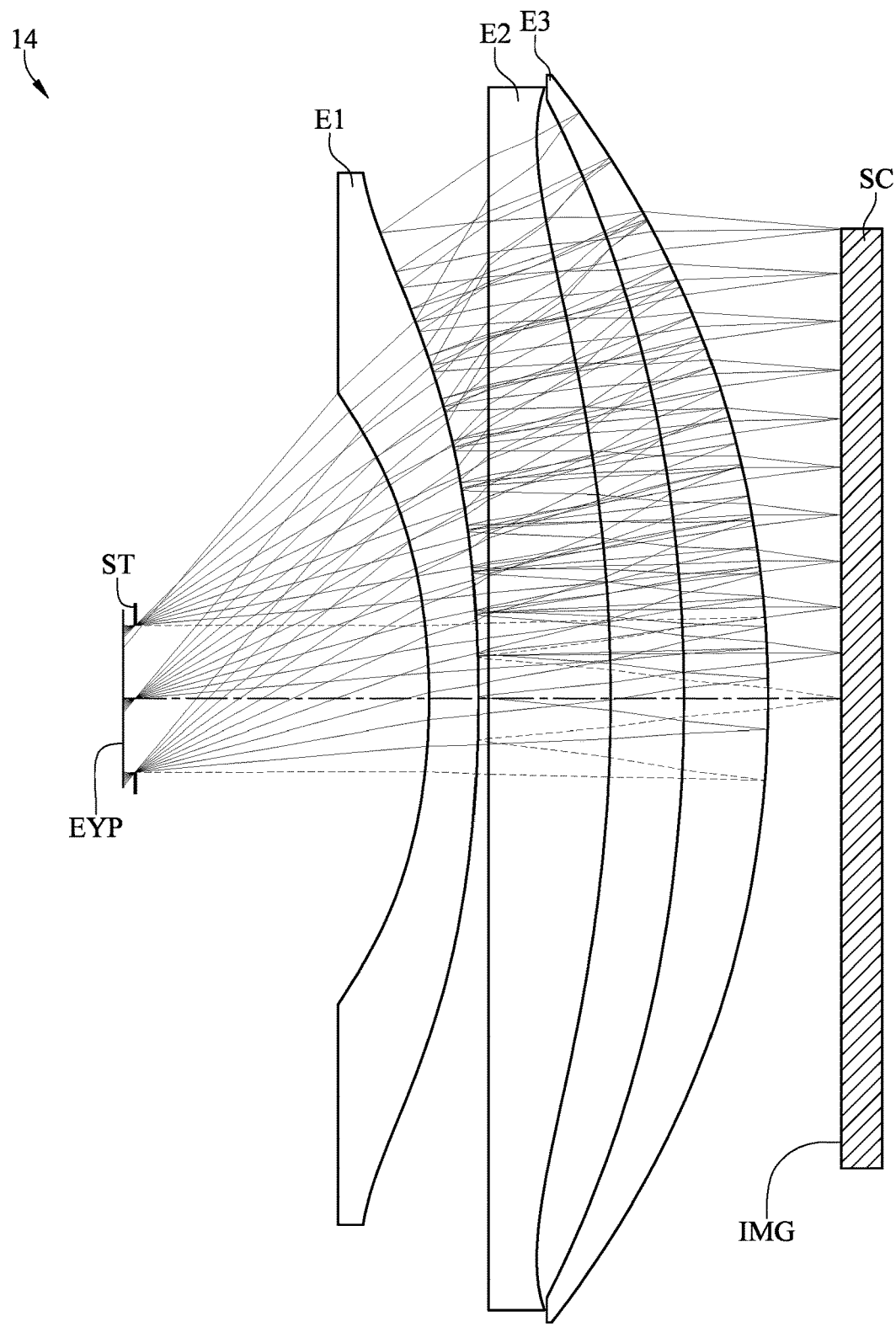
FIG. 16 is a schematic view of an optical system and a display unit according to the 14th embodiment of the present disclosure.

FIG. 16 is a schematic view of an optical system and a display unit according to the 14th embodiment of the present disclosure. The optical system 14 includes, in order from a front side to a rear side, an aperture stop ST, a first optical lens element E1, a reflective polarizer (not shown in figure), a first quarter-wave plate (not shown in figure), a second optical lens element E2, a third optical lens element E3, a partial reflector (not shown in figure), a second quarter-wave plate (not shown in figure) and an image display surface IMG. The display unit SC is disposed on the image display surface IMG. The optical system 14 includes three optical lens elements (E1, E2, and E3) with no additional optical lens element disposed between each of the adjacent three optical lens elements. The reflective polarizer, the first quarter-wave plate, the partial reflector and the second quarter-wave plate of the optical system 14 mentioned above in this embodiment have the same or similar structural features as those of the optical system 1 in the 1st embodiment, so the components are not shown in FIG. 16 for the purpose of clarity and conciseness.

The first optical lens element E1 with negative refractive power has a front-side surface being concave and a rear-side surface being convex. The first optical lens element E1 is made of plastic material and has the front-side surface and the rear-side surface being both aspheric. The rear-side surface of the first optical lens element E1 has at least one inflection point.

The second optical lens element E2 with positive refractive power has a front-side surface being planar and a rear-side surface being convex. The second optical lens element E2 is made of plastic material and has the rear-side surface being aspheric.

The third optical lens element E3 with positive refractive power has a front-side surface being concave and a rear-side surface being convex. The third optical lens element E3 is made of plastic material and has the front-side surface and the rear-side surface being both aspheric.

The reflective polarizer is attached to the rear-side surface of the first optical lens element E1, and the first quarter-wave plate is attached to one side of the reflective polarizer located away from the first optical lens element E1.

The partial reflector is attached to the rear-side surface of the third optical lens element E3.

The second quarter-wave plate is located between the partial reflector and the image display surface IMG.

An imaging light emitted by the display unit SC from the image display surface IMG sequentially passes through the second quarter-wave plate, the partial reflector, the first quarter-wave plate and the reflective polarizer. More specifically, an imaging light in a vertical polarization state is emitted from the image display surface IMG, then the imaging light passes through the second quarter-wave plate and is converted into a circular polarization state by the second quarter-wave plate, and then, the imaging light in the circular polarization state passes through the partial reflector, the third optical lens element E3, the second optical lens element E2 and the first quarter-wave plate, and the polarization state of the imaging light is converted by the first quarter-wave plate for the first time into a horizontal polarization state. Then, the imaging light in the horizontal polarization state is reflected by the reflective polarizer and passes through the first quarter-wave plate again, and the polarization state of the imaging light is converted by the first quarter-wave plate for the second time into a circular polarization state. Then, the imaging light in the circular polarization state passes through the second optical lens element E2 and third optical lens element E3 and is reflected by the partial reflector. Then, the imaging light passes through the third optical lens element E3, the second optical lens element E2 and the first quarter-wave plate, and the polarization state of the imaging light is converted by the first quarter-wave plate for the third time into a vertical polarization state, such that the imaging light in the vertical polarization state can pass through the reflective polarizer. Then, the imaging light sequentially passes through the first optical lens element E1 and the aperture stop ST, and arrives at, for example, a position EYP where a user's eye is located.

The detailed optical data of the 14th embodiment are shown in Table 14A and the aspheric surface data are shown in Table 14B below.

In the 14th embodiment, the equation of the aspheric surface profiles of the aforementioned optical lens elements is the same as the equation of the 1st embodiment. Also, the definitions of these parameters shown in Table 14C below are the same as those stated in the 1st embodiment with corresponding values for the 14th embodiment, so an explanation in this regard will not be provided again.

Moreover, these parameters can be calculated from Table 14A and Table 14B as the following values and satisfy the following conditions:

TABLE 14C

Values of Conditional Expressions

| | | | |
|---|---|---|---|
| f [mm] | 21.34 | V2/N2 | 38.42 |
| Fno | 3.56 | V3/N3 | 38.42 |
| HFOV [deg.] | 50.0 | f/ImgH | 1.11 |
| ER [mm] | 12.00 | SL/ImgH | 1.50 |
| EPD [mm] | 6.00 | SL/f | 1.35 |
| ImgH [mm] | 19.20 | EPD/ImgH | 0.31 |
| f1 [mm] | −79.82 | tan(HFOV)/f | 0.06 |
| f2 [mm] | 132.81 | ER/SL | 0.42 |
| f3 [mm] | 271.72 | TD/SL | 0.48 |
| R6/R5 | 0.69 | (CT1 + CT2 + CT3)/(T12 + T23) | 3.05 |
| |R2/R1| | 2.21 | (CT1 + CT2 + CT3)/SL | 0.36 |
| f/f1 | −0.27 | (T12 + T23)/TD | 0.25 |
| f/f2 | 0.16 | R1/R6 | 0.64 |
| f/f3 | 0.08 | (R1 + R2)/(R1 − R2) | −2.65 |
| V1/N1 | 13.03 | (R5 + R6)/(R5 − R6) | 5.55 |

TABLE 14A

14th Embodiment
f = 21.34 mm, Fno = 3.56, HFOV = 50.0 deg.

| Surface # | | Curvature Radius | | Thickness | Material | Index | Abbe # | Refraction/ Reflection |
|---|---|---|---|---|---|---|---|---|
| 0 | | Plano | | −1500.000 | | | | Refraction |
| 1 | ST | Plano | | 12.000 | | | | Refraction |
| 2 | E1 | −27.7993 | (ASP) | 2.000 | Plastic | 1.650 | 21.5 | Refraction |
| 3 | | −61.4840 | (ASP) | 0.411 | | | | Refraction |
| 4 | E2 | Plano | | 5.000 | Plastic | 1.490 | 57.3 | Refraction |
| 5 | | −65.3132 | (ASP) | 3.000 | | | | Refraction |
| 6 | E3 | −62.2257 | (ASP) | 3.422 | Plastic | 1.490 | 57.3 | Refraction |
| 7 | E3 | −43.2251 | (ASP) | −3.422 | Plastic | 1.490 | 57.3 | Reflection |
| 8 | | −62.2257 | (ASP) | −3.000 | | | | Refraction |
| 9 | E2 | −65.3132 | (ASP) | −5.000 | Plastic | 1.490 | 57.3 | Refraction |
| 10 | | Plano | | −0.411 | | | | Refraction |
| 11 | | −61.4840 | (ASP) | 0.411 | | | | Reflection |
| 12 | E2 | Plano | | 5.000 | Plastic | 1.490 | 57.3 | Refraction |
| 13 | | −65.3132 | (ASP) | 3.000 | | | | Refraction |
| 14 | E3 | −62.2257 | (ASP) | 3.422 | Plastic | 1.490 | 57.3 | Refraction |
| 15 | | −43.2251 | (ASP) | 3.000 | | | | Refraction |
| 16 | IMG | Plano | | 0.000 | | | | Refraction |

Note:
Reference wavelength is 587.6 nm (d-line).

TABLE 14B

Aspheric Coefficients

| Surface # | 2 | 3 | 4 | 5 | 6 | 7 |
|---|---|---|---|---|---|---|
| k = | −0.78057 | 0.25709 | — | 0.99561 | 1.00000 | −0.57893 |
| A4 = | −4.61522E−05 | −1.17830E−05 | — | 1.13327E−07 | −1.79597E−06 | −3.19268E−06 |
| A6 = | 1.90422E−07 | −7.98422E−09 | — | 6.47788E−09 | 1.38991E−09 | 8.95899E−10 |
| A8 = | −2.76306E−09 | 6.21684E−11 | — | 4.83968E−13 | −7.98411E−13 | 6.91030E−13 |
| A10 = | 1.53401E−11 | −2.16682E−14 | — | −8.09662E−16 | 1.14198E−15 | 3.06292E−16 |
| A12 = | −1.85108E−14 | 1.45921E−17 | — | 1.44486E−17 | 6.37473E−18 | −8.97685E−19 |

Figure 17:
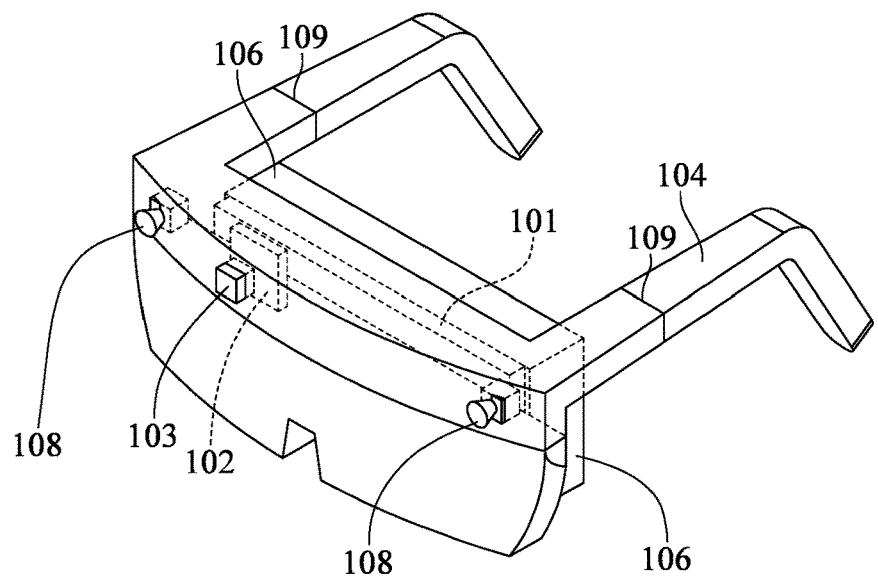
FIG. 17 is a perspective view of a head-mounted device according to the 15th embodiment of the present disclosure.
Figure 18:
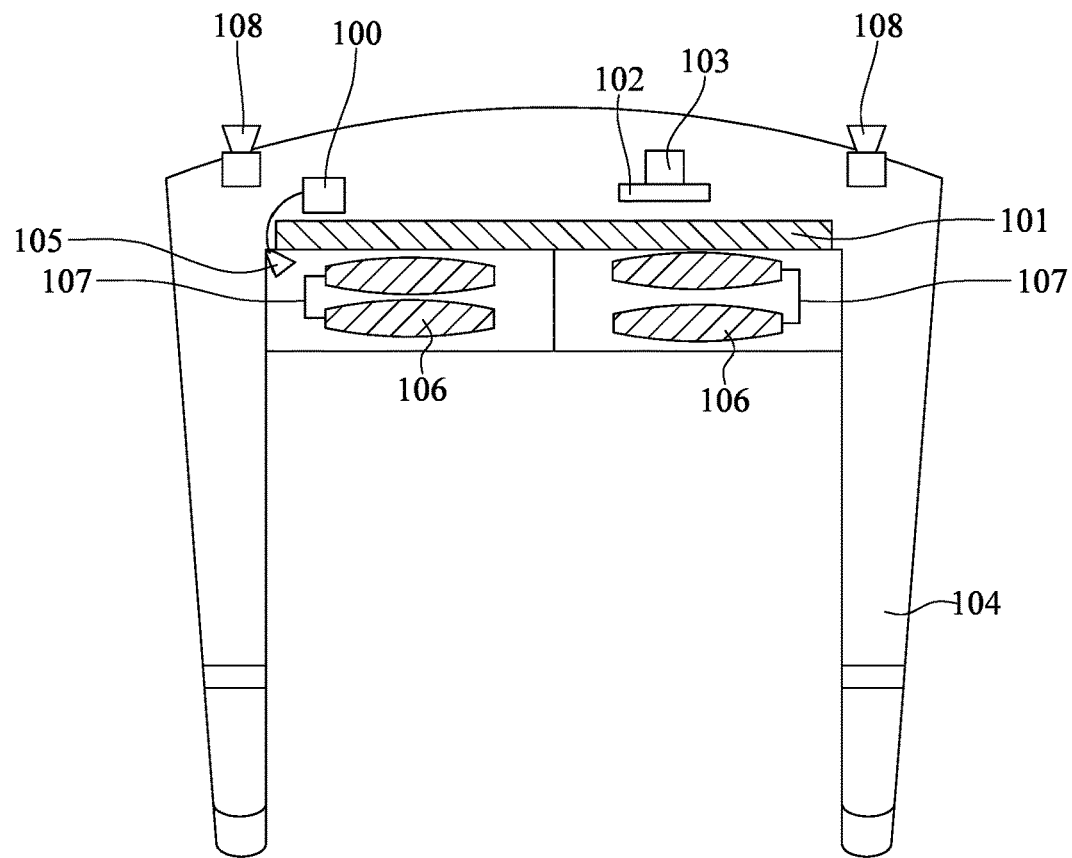
FIG. 18 is a top view of the head-mounted device in FIG. 17.

FIG. 17 is a perspective view of a head-mounted device according to the 15th embodiment of the present disclosure, and FIG. 18 is a top view of the head-mounted device in FIG. 17.

In this embodiment, the head-mounted device 10 is applicable to AR, VR, MR or projection glasses, and the head-mounted device 10 includes a display unit 101, a digital signal processor 102, an inertial measurement unit 103, a support structure 104, an eye tracking unit 105, two optical systems 106, two auto focus units 107, two cameras 108, a folding mechanism 109 and an iris recognition module 100. In addition, each of the optical systems 106 can be one of the optical systems of the aforementioned embodiments, and the present disclosure is not limited thereto.

The display unit 101 is configured to face the user's eyes to display an image. The inertial measurement unit 103 is configured to measure the angular velocity and acceleration of the head-mounted device 10 in the three-dimensional space so as to obtain the orientation of the head-mounted device 10. The support structure 104 may be at least one band or at least one structure similar to glasses temples for stabilizing the head-mounted device 10 on the user's head. The eye tracking unit 105 is configured to face the user's eyes so as to track the gaze position of the eyes for providing the user with data analysis of various usage scenarios and adjusting the clarity of each area of an image according to the gaze area of the eyes. The two optical systems 106 are located on one side of the display unit 101 and respectively correspond to the user's two eyes. The two auto focus units 107 are respectively disposed corresponding to the two optical systems 106, and the auto focus units 107 are configured to move the optical lens elements of the optical systems 106, so that the focal length is adjustable according to the vision of various users so as to provide the optical systems 106 with a focus function. The cameras 108 and the display unit 101 are respectively in signal communication with the digital signal processor 102, and the cameras 108 are configured to capture images of external environment for displaying on the display unit 101 via the digital signal processor 102. The images of external environment captured by the cameras 108 can be instantly displayed on the display unit 101, so that the user wearing the head-mounted device 10 is able to recognize the environment. Therefore, with the arrangement of the cameras, the captured images of external environment can be instantly displayed on the display unit, and thus, the head-mounted device can be provided with virtual reality, augmented reality and mixed reality features, and the users can view their surroundings using the real-time output function showing images of external environment without taking off the head-mounted device. Furthermore, with the arrangement of at least two cameras, the head-mounted device 10 can have various magnification ratios so as to meet the requirement of optical zoom functionality, or the head-mounted device 10 can have a recognition function by using a computer vision method. In addition, the multiple-camera configuration may include a LIDAR module, such as a structured light module or a time-of-flight module, for providing various functionalities. The folding mechanism 109 is configured such that the dimensions of the head-mounted device 10 can be reduced (e.g., folding the head-mounted device 10) when the head-mounted device 10 is not in use. The iris recognition module 100 is in signal communication with the digital signal processor 102, and the iris recognition module 100 is configured to recognize the user's iris.

In some configurations, the head-mounted device may be provided with Bluetooth or wireless network functions so as to be in signal communication with at least one external device.

In some configurations, the head-mounted device may include at least one speaker, at least one earphone, or at least one noise-cancelling earphone so as to provide the user with sound. Moreover, in some configurations, the head-mounted device may include at least one microphone so as to receive the user's voice.

In some configurations, the head-mounted device may be paired with at least one controller, such as a game joystick, a game pad or a gaming handheld unit, so that the user is able to interact with the virtual reality, augmented reality and mixed reality functions of the head-mounted device.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical system comprising:
   an aperture stop located at a front side of the optical system;
   an image display surface located at a rear side of the optical system;
   a reflective polarizer located between the aperture stop and the image display surface;
   a partial reflector located between the reflective polarizer and the image display surface;
   a first quarter-wave plate located between the reflective polarizer and the partial reflector;
   a second quarter-wave plate located between the partial reflector and the image display surface;
   a first optical lens element located between the aperture stop and the image display surface;
   a second optical lens element located between the first optical lens element and the image display surface; and
   a third optical lens element located between the second optical lens element and the image display surface;
   wherein the first optical lens element has negative refractive power, the third optical lens element has positive refractive power, and the second optical lens element has a front-side surface being planar;
   wherein a curvature radius of a front-side surface of the third optical lens element is R5, a curvature radius of a rear-side surface of the third optical lens element is R6, and the following condition is satisfied:

$0.13 < R6/R5$.

2. The optical system of claim 1, wherein the curvature radius of the front-side surface of the third optical lens element is R5, the curvature radius of the rear-side surface of the third optical lens element is R6, and the following condition is satisfied:

$0.15 < R6/R5$.

3. The optical system of claim 1, wherein at least one optical lens element of the optical system has an inflection point.

4. The optical system of claim 3, wherein a rear-side surface of the first optical lens element has at least one inflection point.

5. The optical system of claim 1, wherein an Abbe number of the first optical lens element is V1, an Abbe number of the second optical lens element is V2, an Abbe number of the third optical lens element is V3, an Abbe number of the i-th optical lens element is Vi, a refractive index of the first optical lens element is N1, a refractive index of the second optical lens element is N2, a refractive index of the third optical lens element is N3, a refractive index of the i-th optical lens element is Ni, and at least one optical lens element of the optical system satisfies the following condition:

$10<Vi/Ni<50$, wherein $i=1$, 2 or 3.

6. The optical system of claim 1, wherein a focal length of the optical system is f, an image height on the image display surface is ImgH, and the following condition is satisfied:

$1.00<f/ImgH<1.50$.

7. The optical system of claim 1, wherein an axial distance between the aperture stop and the image display surface is SL, an image height on the image display surface is ImgH, and the following condition is satisfied:

$1.2<SL/ImgH<2.0$.

8. The optical system of claim 1, wherein an axial distance between the aperture stop and the image display surface is SL, a focal length of the optical system is f, and the following condition is satisfied:

$1.2<SL/f<2.0$.

9. The optical system of claim 1, wherein an axial distance between the aperture stop and a front-side surface of the first optical lens element is ER, an axial distance between the aperture stop and the image display surface is SL, and the following condition is satisfied:

$0.30<ER/SL<0.50$.

10. The optical system of claim 1, wherein an axial distance between a front-side surface of the first optical lens element and the rear-side surface of the third optical lens element is TD, an axial distance between the aperture stop and the image display surface is SL, and the following condition is satisfied:

$0.40<TD/SL<0.60$.

11. The optical system of claim 1, wherein a central thickness of the first optical lens element is CT1, a central thickness of the second optical lens element is CT2, a central thickness of the third optical lens element is CT3, an axial distance between a rear-side surface of the first optical lens element and the front-side surface of the second optical lens element is T12, an axial distance between a rear-side surface of the second optical lens element and the front-side surface of the third optical lens element is T23, and the following condition is satisfied:

$1<(CT1+CT2+CT3)/(T12+T23)<20$.

12. The optical system of claim 1, wherein a central thickness of the first optical lens element is CT1, a central thickness of the second optical lens element is CT2, a central thickness of the third optical lens element is CT3, an axial distance between the aperture stop and the image display surface is SL, and the following condition is satisfied:

$0.20<(CT1+CT2+CT3)/SL<1.00$.

13. The optical system of claim 1, wherein an imaging light is emitted from the image display surface, and the imaging light sequentially passes through the second quarter-wave plate, the partial reflector, the first quarter-wave plate and the reflective polarizer.

14. A head-mounted device comprising:
the optical system of claim 1.

15. An optical system comprising:
an aperture stop located at a front side of the optical system;
an image display surface located at a rear side of the optical system;
a reflective polarizer located between the aperture stop and the image display surface;
a partial reflector located between the reflective polarizer and the image display surface;
a first quarter-wave plate located between the reflective polarizer and the partial reflector;
a second quarter-wave plate located between the partial reflector and the image display surface;
a first optical lens element located between the aperture stop and the image display surface;
a second optical lens element located between the first optical lens element and the image display surface; and
a third optical lens element located between the second optical lens element and the image display surface;
wherein the first optical lens element has negative refractive power, and the second optical lens element has a front-side surface being planar;
wherein a curvature radius of a front-side surface of the first optical lens element is R1, a curvature radius of a rear-side surface of the first optical lens element is R2, and the following condition is satisfied:

$|R2/R1|<1000$.

16. The optical system of claim 15, wherein the curvature radius of the front-side surface of the first optical lens element is R1, the curvature radius of the rear-side surface of the first optical lens element is R2, and the following condition is satisfied:

$|R2/R1|<500$.

17. The optical system of claim 15, wherein at least one optical lens element of the optical system has an inflection point.

18. The optical system of claim 17, wherein the rear-side surface of the first optical lens element has at least one inflection point.

19. The optical system of claim 15, wherein an Abbe number of the first optical lens element is V1, an Abbe number of the second optical lens element is V2, an Abbe number of the third optical lens element is V3, an Abbe number of the i-th optical lens element is Vi, a refractive index of the first optical lens element is N1, a refractive index of the second optical lens element is N2, a refractive index of the third optical lens element is N3, a refractive index of the i-th optical lens element is Ni, and at least one optical lens element of the optical system satisfies the following condition:

$10<Vi/Ni<50$, wherein $i=1$, 2 or 3.

20. The optical system of claim 15, wherein a focal length of the optical system is f, an image height on the image display surface is ImgH, and the following condition is satisfied:

$1.00 < f/ImgH < 1.50$.

21. The optical system of claim 15, wherein an axial distance between the aperture stop and the image display surface is SL, an image height on the image display surface is ImgH, and the following condition is satisfied:

$1.2 < SL/ImgH < 2.0$.

22. The optical system of claim 15, wherein an axial distance between the aperture stop and the image display surface is SL, a focal length of the optical system is f, and the following condition is satisfied:

$1.2 < SL/f < 2.0$.

23. The optical system of claim 15, wherein an axial distance between the aperture stop and the front-side surface of the first optical lens element is ER, an axial distance between the aperture stop and the image display surface is SL, and the following condition is satisfied:

$0.30 < ER/SL < 0.50$.

24. The optical system of claim 15, wherein an axial distance between the front-side surface of the first optical lens element and a rear-side surface of the third optical lens element is TD, an axial distance between the aperture stop and the image display surface is SL, and the following condition is satisfied:

$0.40 < TD/SL < 0.60$.

25. The optical system of claim 15, wherein a central thickness of the first optical lens element is CT1, a central thickness of the second optical lens element is CT2, a central thickness of the third optical lens element is CT3, an axial distance between the rear-side surface of the first optical lens element and the front-side surface of the second optical lens element is T12, an axial distance between a rear-side surface of the second optical lens element and a front-side surface of the third optical lens element is T23, and the following condition is satisfied:

$1 < (CT1+CT2+CT3)/(T12+T23) < 20$.

26. The optical system of claim 15, wherein a central thickness of the first optical lens element is CT1, a central thickness of the second optical lens element is CT2, a central thickness of the third optical lens element is CT3, an axial distance between the aperture stop and the image display surface is SL, and the following condition is satisfied:

$0.20 < (CT1+CT2+CT3)/SL < 1.00$.

27. The optical system of claim 15, wherein an imaging light is emitted from the image display surface, and the imaging light sequentially passes through the second quarter-wave plate, the partial reflector, the first quarter-wave plate and the reflective polarizer.

28. A head-mounted device comprising:
the optical system of claim 15.

* * * * *